(12) United States Patent
Ahlfeld et al.

(10) Patent No.: US 8,529,713 B2
(45) Date of Patent: Sep. 10, 2013

(54) SYSTEM AND METHOD FOR ANNEALING NUCLEAR FISSION REACTOR MATERIALS

(75) Inventors: Charles E. Ahlfeld, LaJolla, CA (US); John Rogers Gilleland, Kirkland, WA (US); Roderick A. Hyde, Redmond, WA (US); David G. McAlees, Bellevue, WA (US); Jon David McWhirter, Newcastle, WA (US); Ashok Odedra, Bellevue, WA (US); Clarence T. Tegreene, Bellevue, WA (US); Joshua C. Walter, Kirkland, WA (US); Kevan D. Weaver, Redmond, WA (US); Charles Whitmer, North Bend, WA (US); Lowell L. Wood, Jr., Bellevue, WA (US); George B. Zimmerman, Lafayette, CA (US)

(73) Assignee: The Invention Science Fund I, LLC, Bellevue, WA (US)

(*) Notice: Subject to any disclaimer, the term of this patent is extended or adjusted under 35 U.S.C. 154(b) by 817 days.

(21) Appl. No.: 12/284,338

(22) Filed: Sep. 18, 2008

(65) Prior Publication Data

US 2010/0065164 A1    Mar. 18, 2010

(51) Int. Cl.
*C21D 11/00* (2006.01)

(52) U.S. Cl.
USPC .......................................... 148/559; 376/260

(58) Field of Classification Search
USPC ................... 148/559, 672; 376/260
See application file for complete search history.

(56) References Cited

U.S. PATENT DOCUMENTS

| | | | |
|---|---|---|---|
| 3,322,636 A | 5/1967 | Benson | |
| 3,755,004 A | 8/1973 | Miller | |
| 3,809,608 A | 5/1974 | Katz et al. | |
| 4,010,068 A | 3/1977 | Cooper | |
| 4,075,010 A | 2/1978 | Fischer | |
| 4,576,641 A | 3/1986 | Bates et al. | |
| 4,609,522 A | 9/1986 | Davidson et al. | |
| 4,717,428 A | 1/1988 | Comstock et al. | |
| 4,778,651 A | 10/1988 | Dubuisson et al. | |
| 4,818,485 A | 4/1989 | Maziasz et al. | |
| 4,820,359 A * | 4/1989 | Bevilacqua et al. | 148/511 |
| 4,878,962 A | 11/1989 | Jacobs et al. | |
| 4,885,128 A | 12/1989 | Megusar et al. | |
| 5,025,129 A | 6/1991 | Miller et al. | |
| 5,064,605 A | 11/1991 | Ruddy et al. | |
| 5,116,026 A | 5/1992 | Bauer et al. | |
| 5,185,123 A | 2/1993 | Porowski et al. | |
| 5,225,154 A * | 7/1993 | Kanno et al. | 376/416 |
| 5,264,056 A | 11/1993 | Lapides | |
| 5,745,735 A | 4/1998 | Cohn et al. | |
| 6,174,385 B1 | 1/2001 | Morinaga et al. | |
| 6,315,838 B1 | 11/2001 | Dunand et al. | |
| 2004/0028168 A1* | 2/2004 | Suvorov et al. | 376/260 |
| 2006/0104402 A1 | 5/2006 | Dahlback et al. | |
| 2006/0144484 A1* | 7/2006 | Dahlback | 148/672 |
| 2008/0080660 A1 | 4/2008 | Barberis et al. | |

OTHER PUBLICATIONS

PCT International Search Report; International App. No. PCT/US2009/05191; Nov. 13, 2009; pp. 1-2.

(Continued)

*Primary Examiner* — Scott Kastler

(57) ABSTRACT

Illustrative embodiments provide systems, methods, apparatuses, and applications related to annealing nuclear fission reactor materials.

22 Claims, 78 Drawing Sheets

(56) References Cited

OTHER PUBLICATIONS

Busby, J. T., Was, G. S., and Kenik, E. A.; "Isolating the Effect of Radiation-Induced Segregation in Irradiation-Assisted Stress Corrosion Cracking of Austenitic Stainless Steels"; Journal of Nuclear Materials; 2002; pp. 20-40; vol. 302; Elsevier Science B.V.

Edwards, D. J., Simonen, E. P., Garner, F. A., Greenwood, L. R., Oliver, B. M., and Bruemmer, S. M.; "Influence of Irradiation Temperature and Dose Gradients on the Microstructural Evolution in Neutron-Irradiated 316SS"; Journal of Nuclear Materials; 2003; pp. 32-45; vol. 317; Elsevier Science B.V.

Fukuya, K., Nakano, M., Fujii, K., Torimaru, T., and Kitsunai, Y.; "Separation of Microstructural and Microchemical Effects in Irradiation Assisted Stress Corrosion Cracking using Post-Irradiation Annealing"; Journal of Nuclear Science and Technology; Dec. 2004; pp. 1218-1227; vol. 41; Issue No. 12.

Jacobs, A. J., Wozadlo, G. P., and Gordon, G. M.; "Low Temperature Annealing: A Process to Mitigate Irradiation-Assisted Stress Corrosion Cracking"; Corrosion; 1995; pp. 731-737; vol. 51; Issue 10; NACE International.

Katsura, R., Ishiyama, Y., Yokota, N., Kato, T., Nakata, K., Fukuya, K., Sakamoto, H., and Asano, K.; "Post-Irradiation Annealing Effects of Austenitic Stainless Steel in IASCC"; Proc. Corrosion 98 Conference; 1998; Paper 132; NACE International, Houston, TX.

Was, Gary S.; "Recent Developments in Understanding Irradiation Assisted Stress Corrosion Cracking"; Proc. 11$^{th}$ International Conference Environmental Degradation of Materials in Nuclear Power Systems—Water Reactors; 2004; pp. 965-985; American Nuclear Society, La Grange Park, IL.

Was, G. S., Busby, J. T., Allen, T., Kenik, E. A., Jenssen, A., Bruemmer, S. M., Gan, J., Edwards, A. D., Scott, P. M., Andresen, P. L.; "Emulation of Neutron Irradiation Effects with Protons: Validation of Principle"; Journal of Nuclear Materials; 2002; pp. 198-216; vol. 300; Elsevier Science B.V.

U.S. Appl. No. 12/290,883, filed Nov. 3, 2008, Charles E. Ahlfeld et al.

U.S. Appl. No. 12/290,894, filed Nov. 3, 2008, Charles E. Ahlfeld et al.

Extended/Supplementary European Search Report; App. No. EP 09 81 4895; May 3, 2012, pp. 1-7.

European Patent Office; Communication Pursuant to Article 94(3) EPC; Application No. 09 814 895.0; Jan. 31, 2013; pp. 1-4.

Busby et al.; "Candidate Developmental Alloys for Improved Structural Materials for Advanced Fast Reactors"; Oak Ridge National Laboratory; Mar. 2008; pp. 1-50 + cover page, Table of Contents, etc. for a total of (62 pages); ORNL/TM-2008/040, ORNL/GNEP/LTR-2008-023; UT-Battelle for the Department of Energy.

"Recovery (Annealing) of Radiation Damage"; MONO3-EB; Jun. 2001; pp. 205-207; Chapter 17; ASTM Int'l.

Zvezdin et al.; "Radiation Embrittlement and Recovery Annealing Regularities of ITER Blanket 9Cr Steel"; Journal of Nuclear Materials; 1992; pp. 855-857; Nos. 191-194; Elsevier Science Publishers B.V.

\* cited by examiner

SYSTEM AND METHOD FOR ANNEALING NUCLEAR FISSION REACTOR MATERIALS

BACKGROUND

The present application relates to nuclear fission materials, and systems, methods, apparatuses, and applications related thereto.

SUMMARY

Illustrative embodiments provide systems, methods, apparatuses, and applications related to annealing nuclear fission reactor materials. The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 1B through 1AE are flowcharts of details of portions of the method of FIG. 1A.

FIGS. 2B through 2AE are flowcharts of details of portions of the method of FIG. 2A.

FIGS. 3B through 3AE are flowcharts of details of portions of the method of FIG. 3A.

FIGS. 8A-8K are functional block diagrams of illustrative annealing apparatuses.

DETAILED DESCRIPTION

Figure 1A:
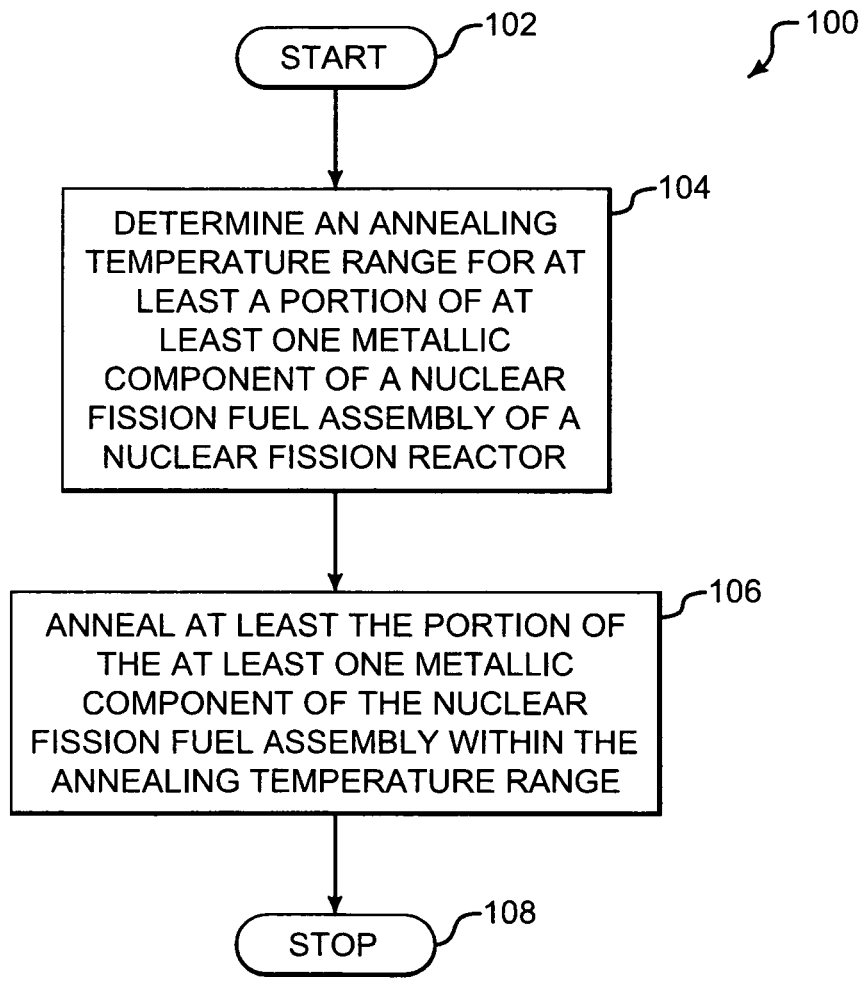
FIG. 1A is a flow chart of an illustrative method for annealing at least a portion of at least one metallic component of a nuclear fission fuel assembly of a nuclear fission reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

First, an overview will be set forth regarding illustrative embodiments, non-limiting examples of components that may be annealed, and annealing effects on components of nuclear fission reactors. Next, illustrative methods will be explained. Then, illustrative apparatuses will be explained.

Overview

Illustrative embodiments provide systems, methods, apparatuses, and applications related to annealing nuclear fission reactor materials.

Figure 2A:
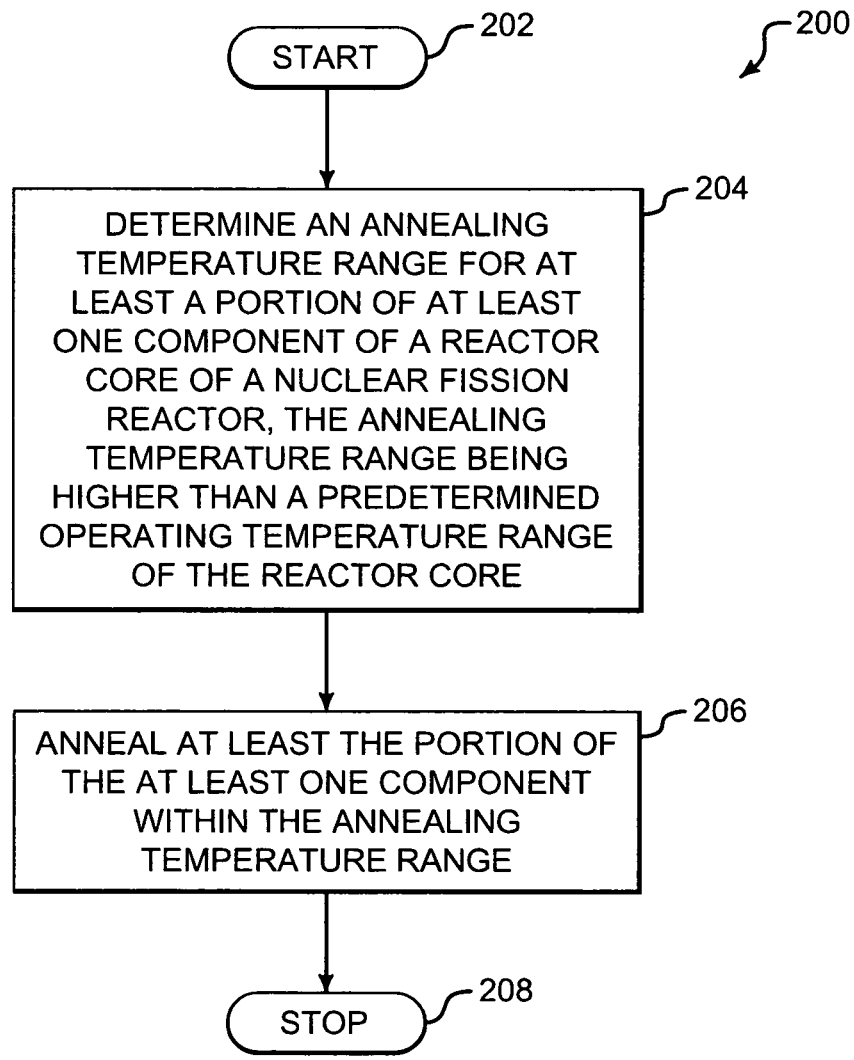
FIG. 2A is a flow chart of an illustrative method for annealing at least a portion of at least one component of a reactor core of a nuclear fission reactor.
Figure 3A:
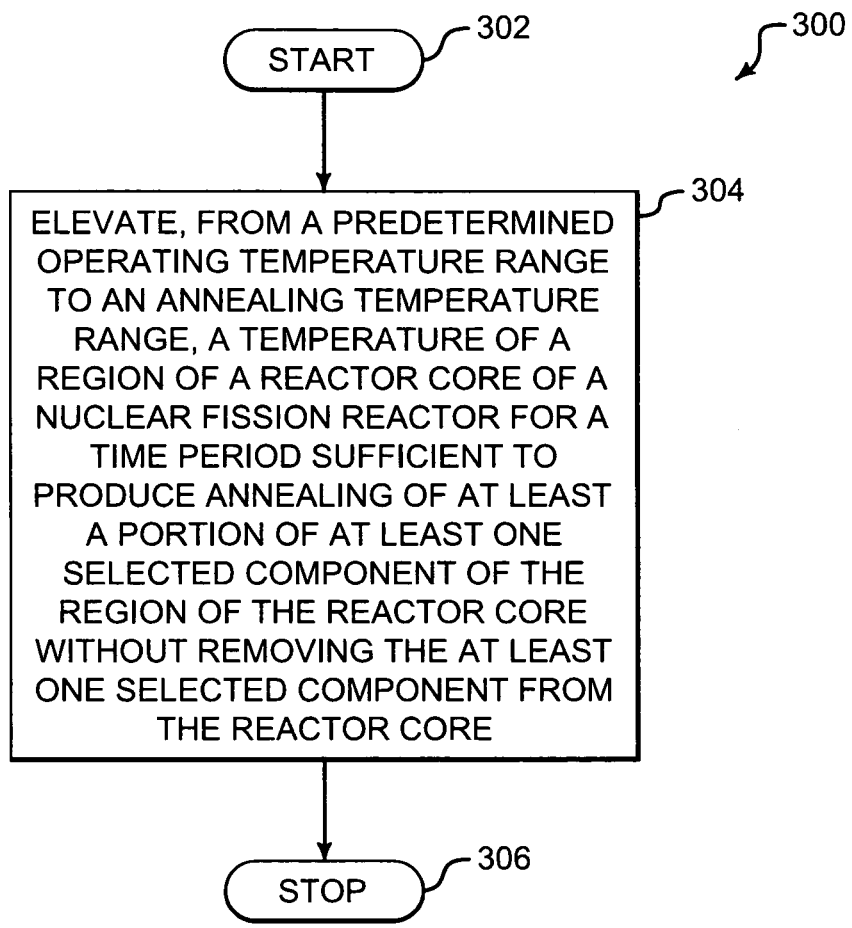
FIG. 3A is a flow chart of an illustrative method for treating at least a portion of at least one component of a reactor core of a nuclear fission reactor.
Figure 4A:
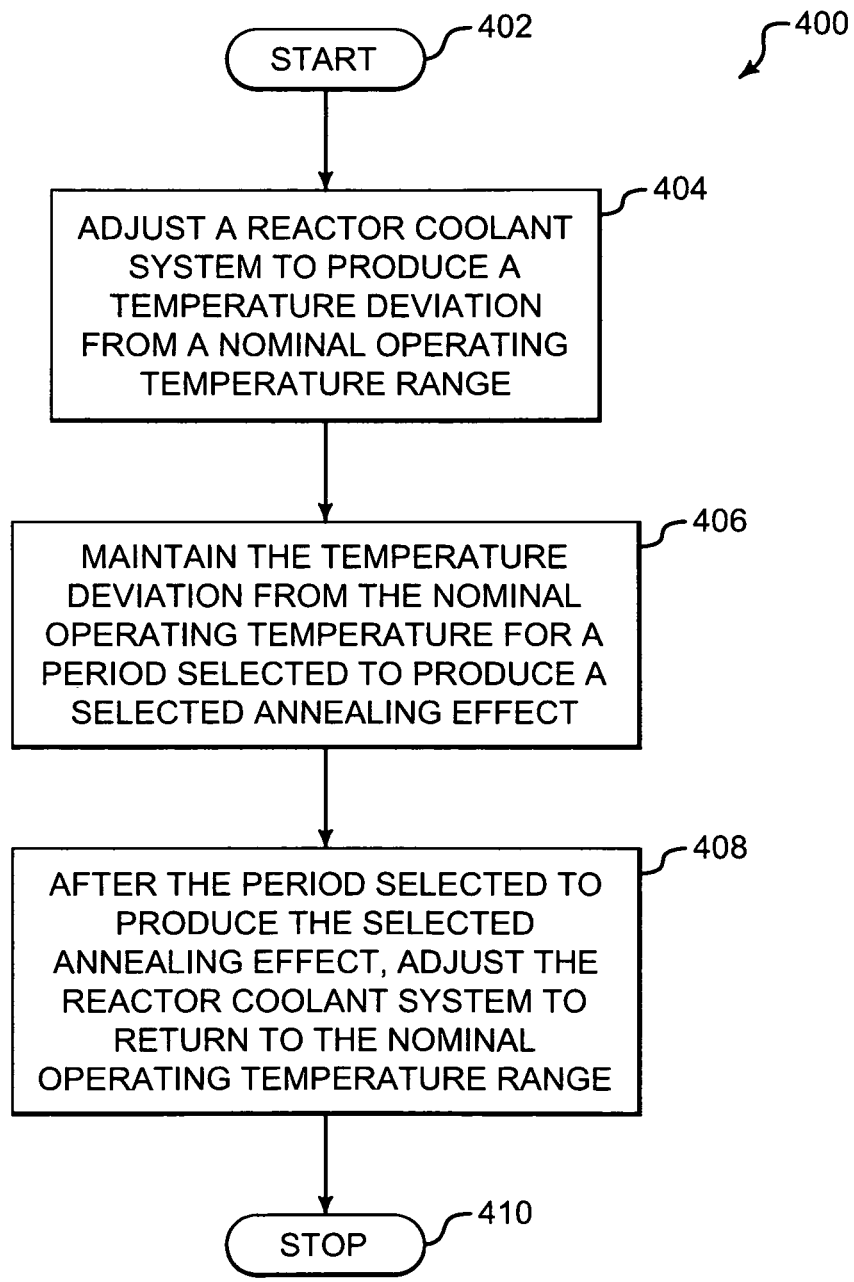
FIG. 4A is a flow chart of an illustrative method for producing an annealing effect.
Figure 5A:
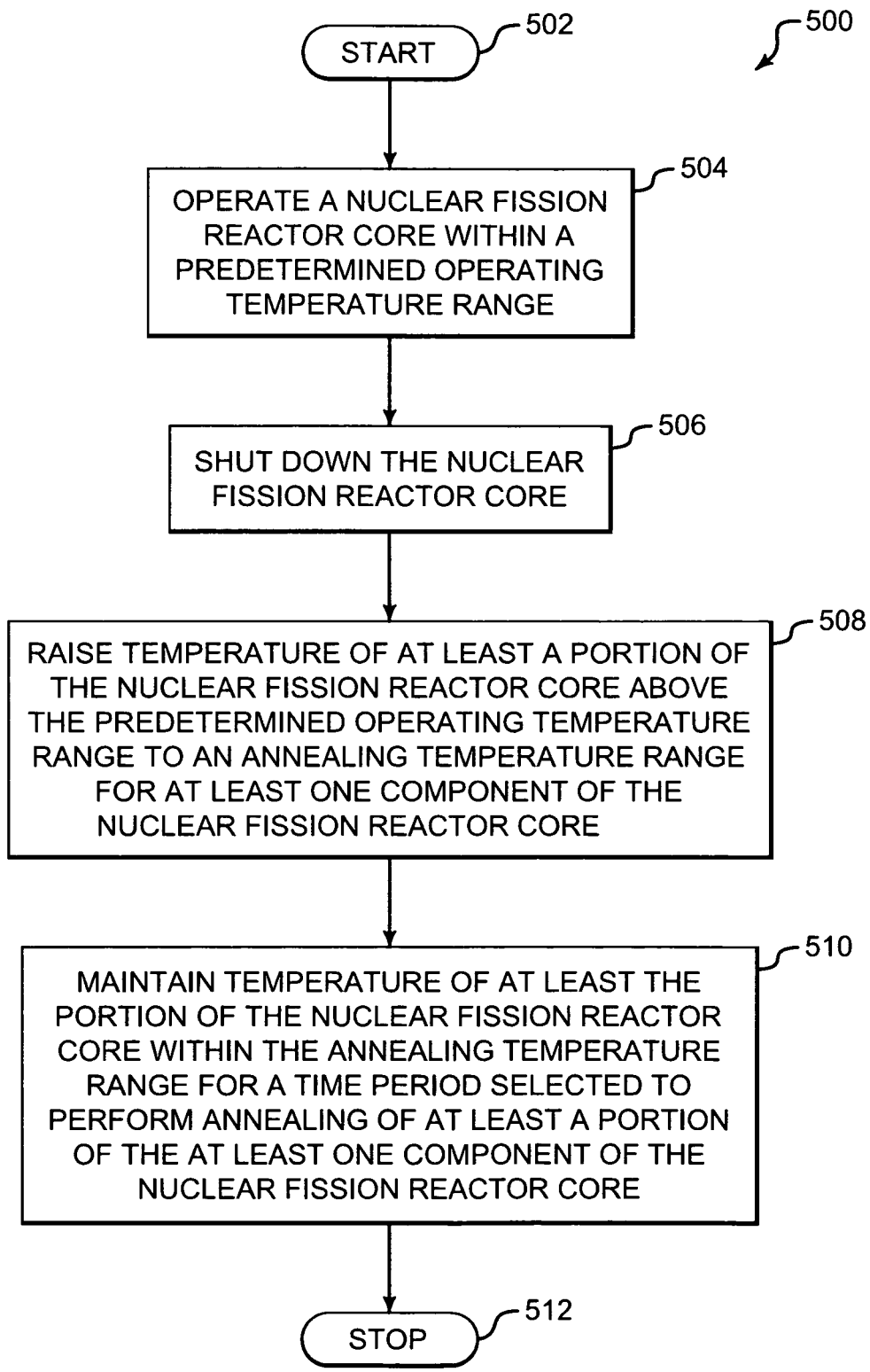
FIG. 5A is a flow chart of an illustrative method for annealing at least a portion of at least one component of a nuclear fission reactor core.

In some embodiments, illustrative methods are provided for annealing nuclear fission reactor materials, such as without limitation a nuclear fission reactor core or fuel assembly or components thereof. For example, referring to FIG. 1A an illustrative method 100 is provided for annealing at least a portion of at least one metallic component of a nuclear fission fuel assembly of a nuclear fission reactor. Referring to FIG. 2A, an illustrative method 200 is provided for annealing at least a portion of at least one component of a reactor core of a nuclear fission reactor. Referring to FIG. 3A, an illustrative method 300 is provided for treating at least a portion of at least one component of a reactor core of a nuclear fission reactor. Referring to FIG. 4A, a method 400 is provided for producing an annealing effect. Referring now to FIG. 5A, a method 500 is provided annealing at least a portion of at least one component of a nuclear fission reactor core. Details will be set forth further below.

The illustrative methods, systems, and apparatuses described herein may be used for annealing any irradiated component of a core of any type of nuclear fission reactor as desired and without limitation. A brief overview of illustrative reactor core components that may be annealed will now be set forth by way of non-limiting examples. It will be understood that the following examples of components that may be annealed are described by way of illustration only and not limitation.

Figure 6A:
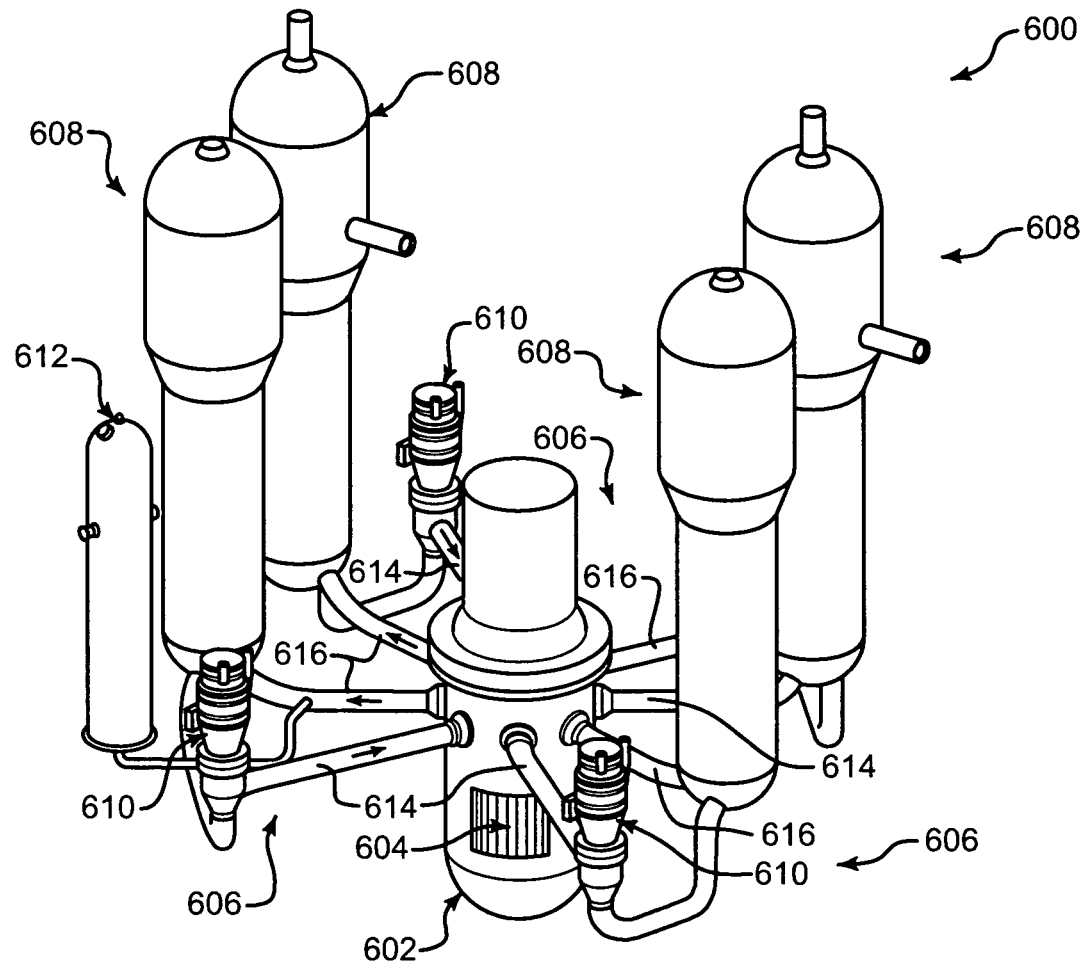
FIG. 6A is a partial cutaway perspective view of a primary system of an illustrative pressurized water reactor.

For example, components of a reactor core assembly of a pressurized water reactor may be annealed. Referring now to FIG. 6A, an illustrative pressurized water reactor 600, given by way of non-limiting example, includes a reactor pressure vessel 602 that contains a reactor core assembly 604 in which nuclear fission occurs within the thermal spectrum. Each primary reactor coolant loop 606 includes its own heat exchanger 608, such as a steam generator, and reactor coolant pump 610. A pressurizer 612 is connected to one of the primary reactor coolant loops 610 and controls reactor coolant pressure, typically through use of heaters (not shown) that control temperature of the reactor coolant in the pressurizer 612. The pressurizer 612 helps maintain pressure of the reactor coolant sufficiently high, such as around 2250 psig or so, to help prevent formation of steam in the primary system. The reactor coolant pumps 610 pump reactor coolant through cold legs 614 into the reactor pressure vessel 602. The reactor coolant is heated by heat from nuclear fission occurring in the reactor core assembly 604. Reactor coolant exits the reactor pressure vessel 602 through hot legs 616 and enters the steam generators 608. Heat is transferred from the reactor coolant to secondary coolant in U-tubes (not shown) in the steam generators, thereby generating steam that can be used to drive turbines (not shown), such as electrical turbine generators, engines, or the like.

Figure 6B:
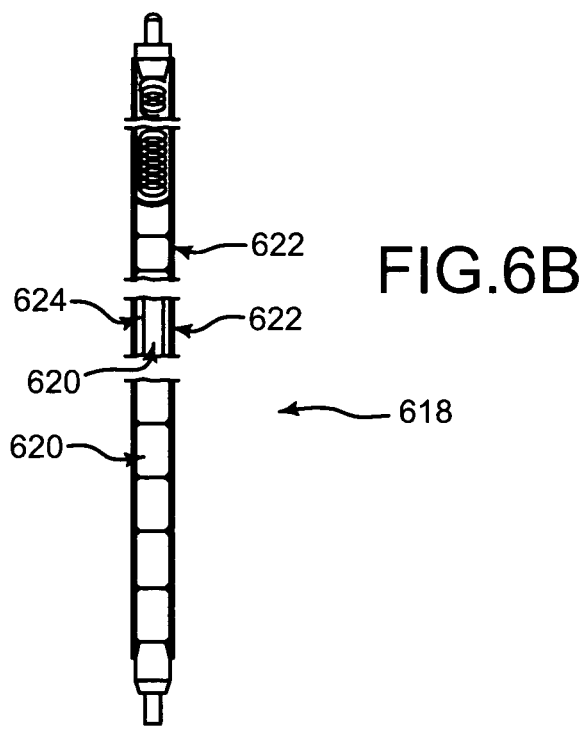
FIG. 6B is a cutaway side plan view in partial schematic form of an illustrative fuel element for the pressurized water reactor of FIG. 6A.

Referring additionally to FIG. 6B, a basic unit of the reactor core assembly 604 is a nuclear fission fuel element 618, such as a fuel rod or fuel pin. Nuclear fission fuel material, such as uranium dioxide, is pressed into cylindrical pellets 620 that are sintered, ground to desired dimensions, and sealed, such as by welding shut, in cladding 622, such as an alloy of zirconium (like zircalloy). Flow of reactor coolant, at typical operating temperatures of around 600° F., through the fuel assemblies 626 helps maintain temperature of the zircalloy cladding 622 nominally below around 700° F. An annular space 624 typically is provided between the pellets 620 and the cladding 622.

Figure 6C:
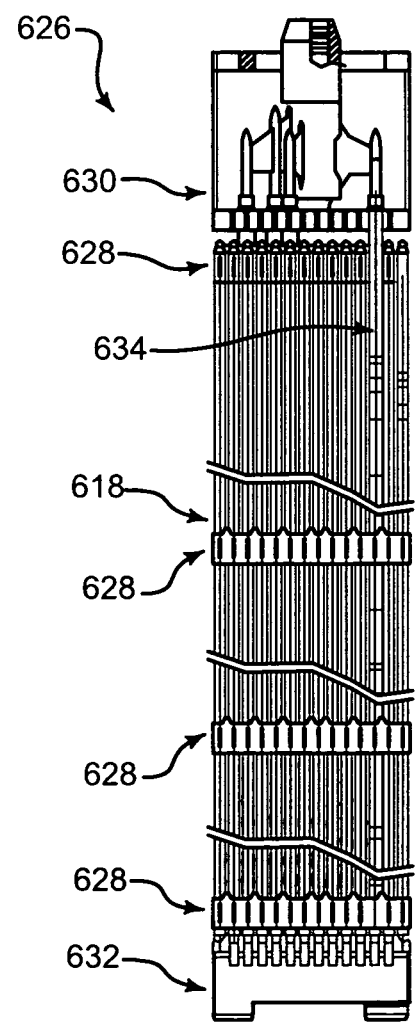
FIG. 6C is a side plan view of an illustrative fuel assembly for the pressurized water reactor of FIG. 6A.

Referring additionally to FIG. 6C, nuclear fission fuel elements 618 are assembled into a fuel assembly 626. In a typical fuel assembly 626, the nuclear fission fuel elements 618 are assembled into a square array that is held together by spring clip grid assemblies 628 and by nozzles 630 and 632 at the top and bottom, respectively, of the nuclear fission fuel assembly 626. An open structure of the nuclear fission fuel assembly 626 defines reactor coolant channels that permit flow of reactor coolant (vertically and horizontally). The nuclear fission fuel assembly 626 may also include provision for passage of one or more control rods 634 that contain neutron absorbing material.

Figure 6D:
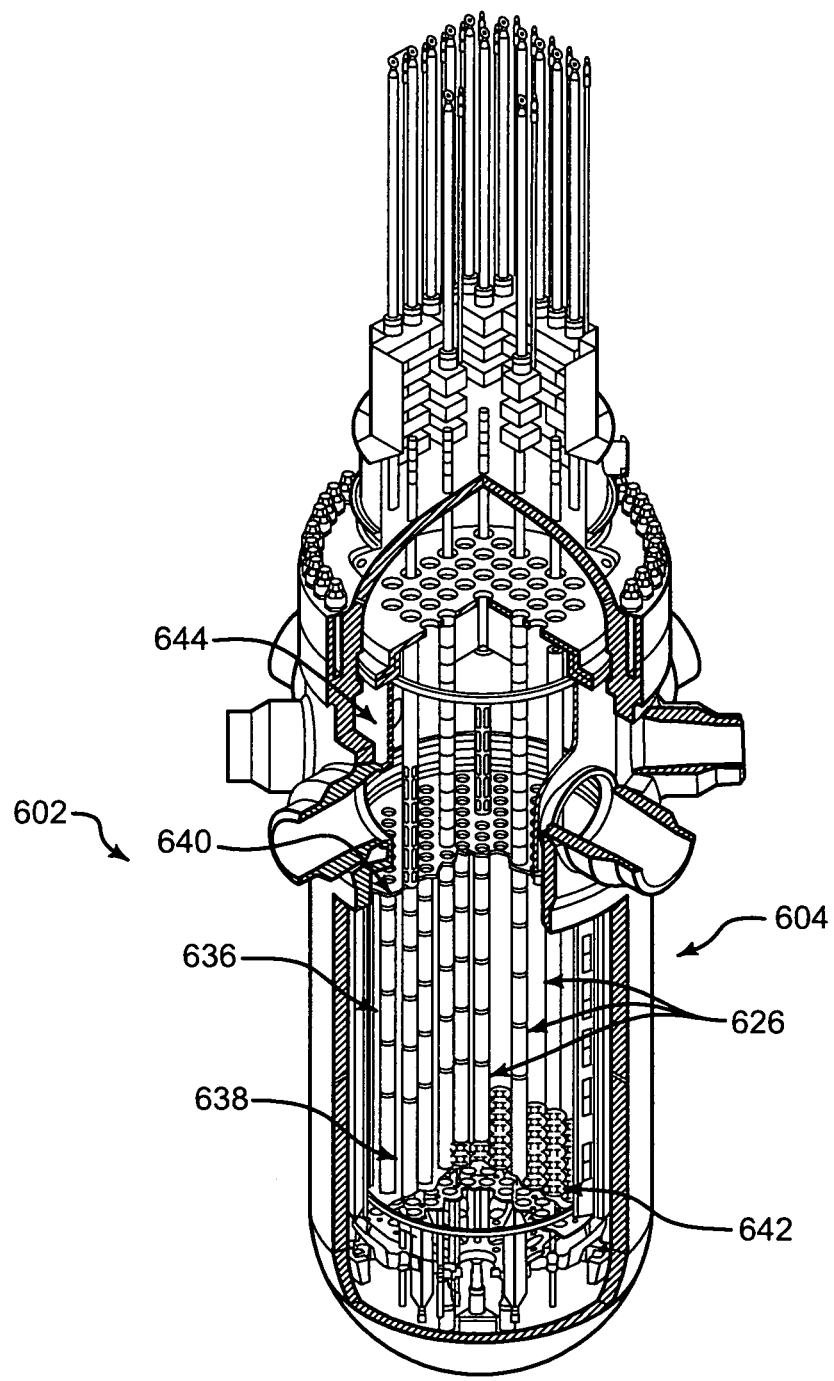
FIG. 6D is a cutaway perspective view of an illustrative pressurized water reactor vessel of the pressurized water reactor of FIG. 6A.

Referring additionally to FIG. 6D, the reactor core assembly 604 includes several fuel assemblies 626. The reactor core assembly 604 also includes cooling components, such as baffles 636 and the reactor coolant channels that direct reactor coolant to, through, and from the fuel assemblies 626. The reactor core assembly 604 also includes structural members that form the fuel assemblies 626 into the reactor core assembly 604, such as core support columns 638, an upper core plate 640, a lower core plate 642, a core barrel 644, and the like.

Figure 7A:
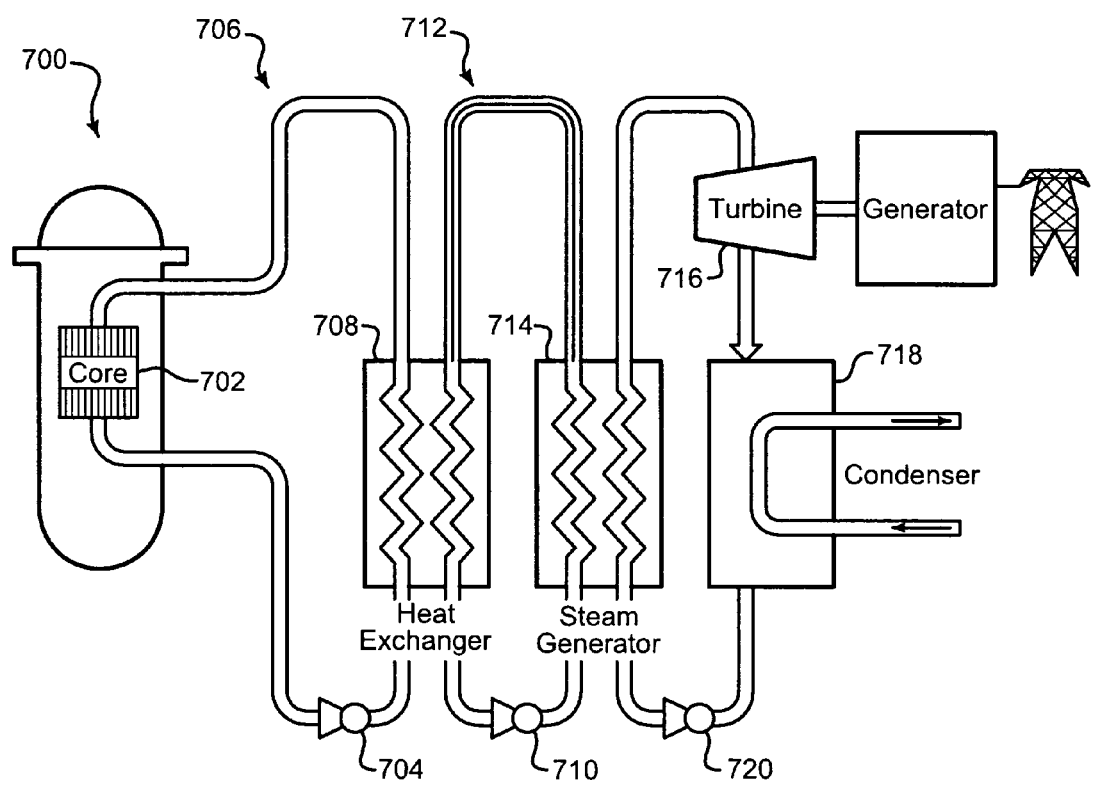
FIG. 7A is a schematic illustration of an illustrative liquid metal fast breeder reactor.

By way of further examples, components of a reactor core assembly of a fast breeder reactor may be annealed. Referring now to FIG. 7A, a liquid metal fast breeder reactor 700 uses a liquid metallic reactor coolant, such as sodium, lead, lead-bismuth, or the like, to cool a reactor core assembly 702. The reactor coolant is pumped by a reactor coolant pump 704 in a primary reactor coolant loop 706. A heat exchanger 708 transfers heat from the reactor coolant to intermediate loop coolant (which may be the same fluid as the reactor coolant in the primary reactor coolant loop 706) that is pumped by an intermediate coolant pump 710 in an intermediate coolant loop 712. A heat exchanger 714, such as a steam generator, generates steam that can be used to drive one or more turbines 716, such as electrical turbine generators, engines, or the like. A condenser 718 condenses steam that is exhausted by the turbine 716. Condensate from the condenser 718 is pumped by a feedwater pump 720 to the heat exchanger 714.

Figure 7B:
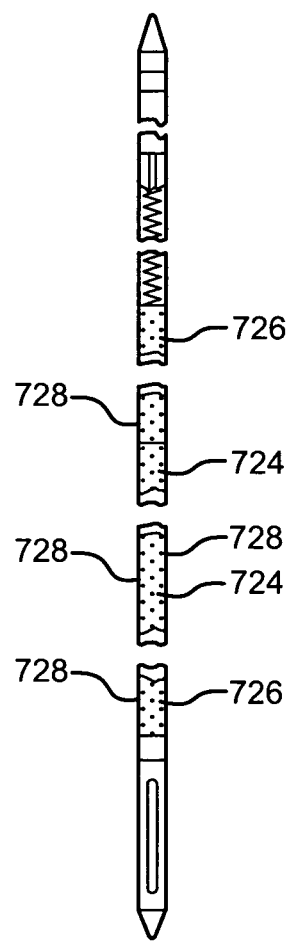
FIG. 7B is a cutaway side plan view in partial schematic form of an illustrative nuclear fission fuel element for the liquid metal fast breeder reactor of FIG. 7A.

Referring additionally to FIG. 7B, a basic unit of the reactor core assembly 702 is a nuclear fission fuel element 722, such as a fuel rod or fuel pin. A portion of the nuclear fission fuel element 722 includes fissile material 724, such as $^{239}$Pu, $^{233}$U, or $^{235}$U. Because the liquid metal fast breeder reactor 700 is a breeder reactor, the reactor core assembly 702 typically produces as much or more fissile material than it consumes. To that end, the nuclear fission fuel element 722 also includes portions of fertile material 726, such as $^{238}$U or $^{232}$Th. In one approach, the fissile material 724 and the fertile material 726 typically are pressed into oxide pellets that are sealed, such as by welding shut, in cladding 728, such as stainless steel.

Figure 7C:
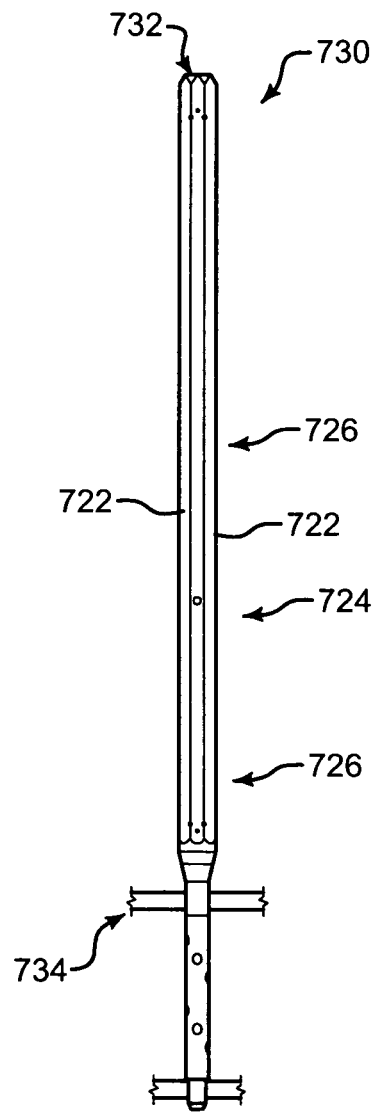
FIG. 7C is a side plan view in partial schematic form of an illustrative fuel assembly for the liquid metal fast breeder reactor of FIG. 7A.

Referring additionally to FIG. 7C, nuclear fission fuel elements 722 are assembled into a fuel assembly 730. In a typical fuel assembly 730, the nuclear fission fuel elements 722 are assembled into an assembly that is held together by a handling fixture 732 and by a grid plate 734. An open structure of the nuclear fission fuel assembly 730 defines reactor coolant channels that permit flow of reactor coolant.

Figure 7D:
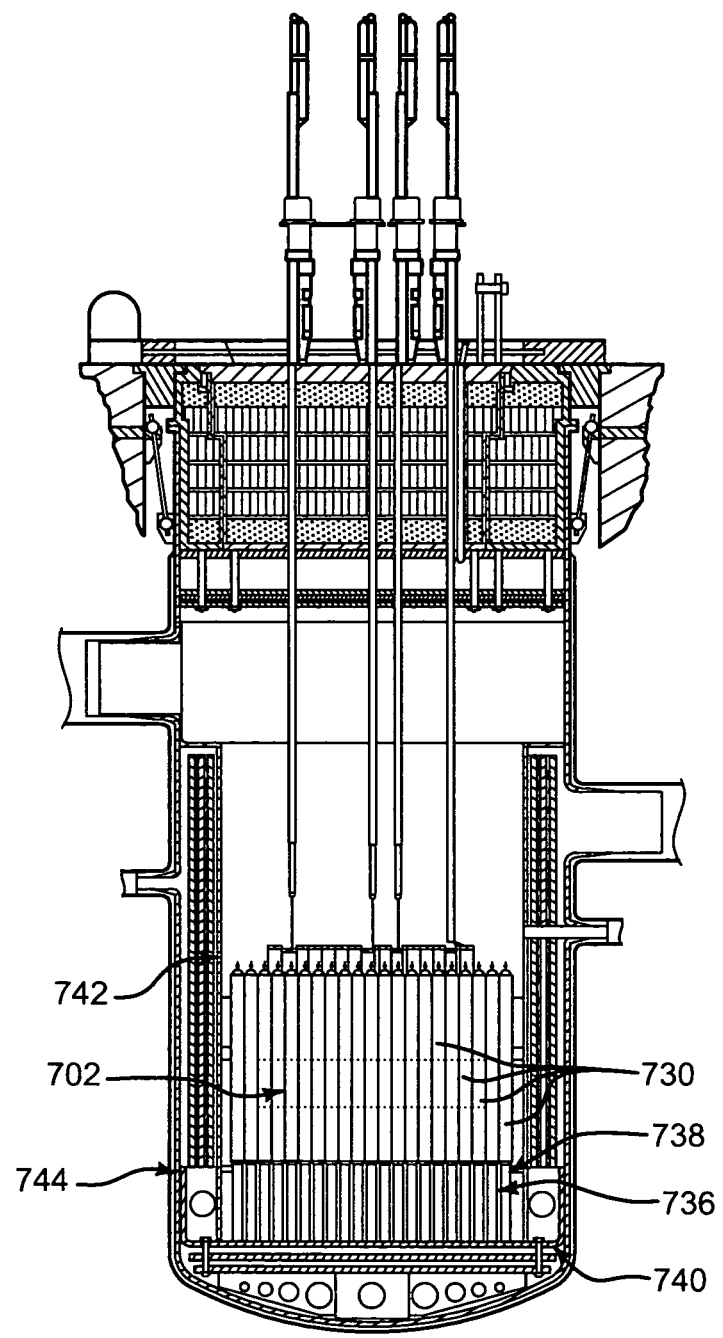
FIG. 7D is a cutaway side plan view in partial schematic form of an illustrative reactor pressure vessel for the liquid metal fast breeder reactor of FIG. 7A.

Referring additionally to FIG. 7D, the reactor core assembly 702 includes several fuel assemblies 730. The reactor core assembly 702 also includes cooling components, such as throttling inserts that can throttle reactor coolant to the fuel assemblies 730. The reactor core assembly 702 also includes structural members that form the fuel assemblies 730 into the reactor core assembly 702, such as an upper core support plate 738, a lower core support plate 740, a core barrel 742, and the like. The reactor core assembly 702 is contained within a reactor pressure vessel 744.

Figure 7E:
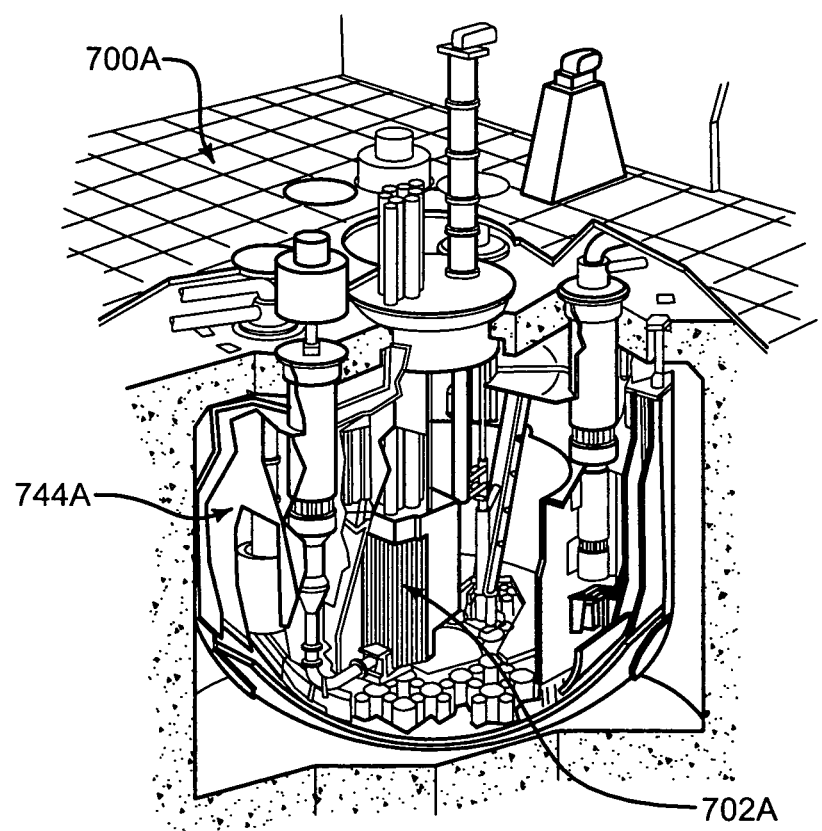
FIG. 7E is a partial cutaway perspective view of an illustrative pool-type liquid metal fast breeder reactor.

In some other arrangements and referring additionally to FIG. 7E, a pool-type liquid metal fast breeder reactor 700A uses a pool of liquid metallic reactor coolant, such as sodium, lead, lead-bismuth, or the like, in a reactor pressure vessel 744A to cool a reactor core assembly 702A. The reactor pressure vessel 744A contains the pool of reactor coolant, the reactor core assembly 702A, the reactor coolant pump 704, and the heat exchanger 708.

Figure 7F:
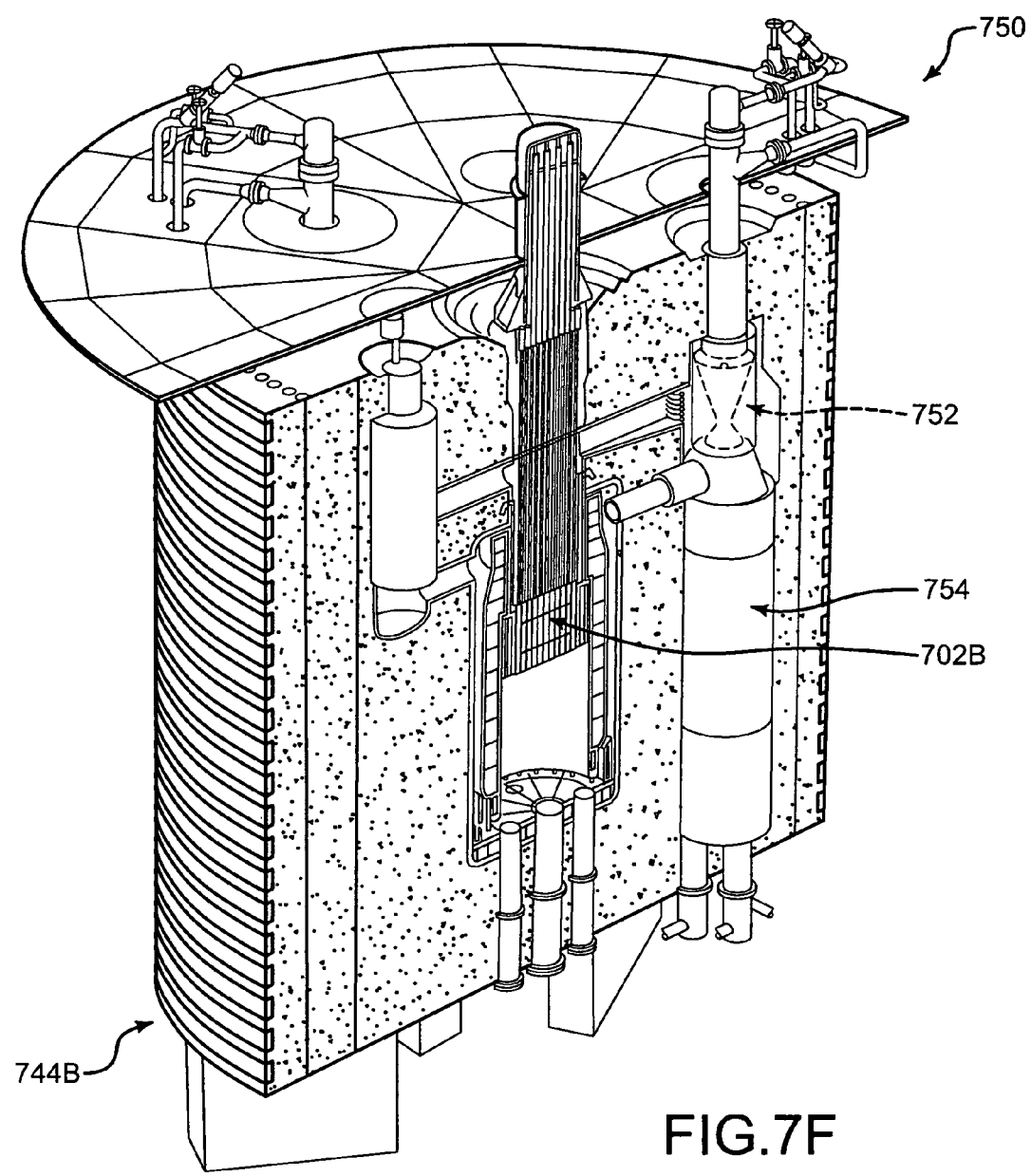
FIG. 7F is a partial cutaway perspective view of an illustrative gas cooled fast breeder reactor.

Another example of a fast breeder reactor is a gas cooled fast breeder reactor. Referring now to FIG. 7F, a gas cooled fast breeder reactor 750 includes a reactor pressure vessel 744B that contains a reactor core assembly 702B that is cooled by a gaseous reactor coolant, such as helium, that is circulated by a gaseous coolant circulator 752. The gaseous reactor coolant is circulated through the reactor core assembly 702B and is heated, and heat is transferred from the gaseous reactor coolant in a heat exchanger 754, such as a steam generator.

Figure 7G:
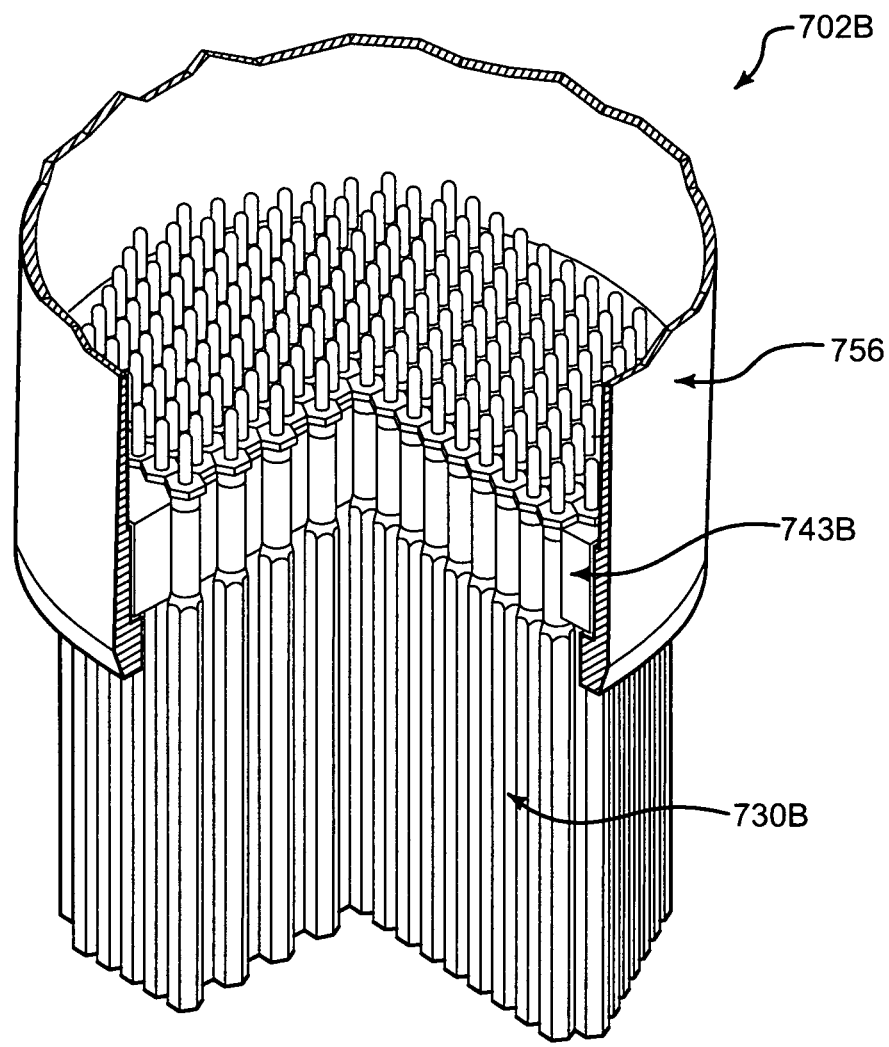
FIG. 7G is a partial cutaway perspective view of an illustrative reactor core assembly for the gas cooled fast breeder reactor of FIG. 7F.

Referring additionally to FIG. 7G, the reactor core assembly 702B includes nuclear fission fuel elements that are assembled into fuel assemblies 730B by structural components, such as a grid plate 734B and a grid support structure. The nuclear fission fuel elements and the fuel assemblies 730B are generally similar to the nuclear fission fuel elements 722 (FIGS. 7B and 7C) and the fuel assemblies 730 (FIG. 7C), with the difference that the nuclear fission fuel elements of the gas cooled fast breeder reactor 750 have surfaces that are roughened to provide increased surface area for heat transfer to the gaseous reactor coolant (that is, a thermally conductive member).

Referring now to FIGS. 7A-7G, in some arrangements the liquid metal fast breeder reactors 700 (FIGS. 7A-7D) and 700A (FIG. 7E) and the gas cooled fast breeder reactor 750 (FIGS. 7F-7G) may entail conventional nucleonics that involve reprocessing of breeder blankets. In some other arrangements, liquid metal fast breeder reactors and gas cooled fast breeder reactors may entail nucleonics in which a nuclear fission deflagration wave is initiated and propagated. Initiation and propagation of a nuclear fission deflagration wave is discussed in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

Reactor materials, such as without limitation components, like metallic components, of reactor cores discussed in the illustrative non-limiting examples set forth above, can experience exposure to neutrons with energy sufficient to create degradation, such as defects, in the material on the atomic and molecular level. Radiation damage to structural materials (measured in dislocations per atom (dpa)) is primarily reflective of exposure to neutrons with energies greater than 1 MeV. Damage from neutron exposure tends to cause radiation hardening, such that the ductile-to-brittle transition temperature of the material increases. Moreover, in a nuclear fission deflagration wave fast breeder reactor, reactor core materials may experience a high level of fluence due to exposure to high energy (that is, fast spectrum) neutrons over a prolonged time (due to slow propagation velocity of the nuclear fission deflagration wave).

For some classes of structural materials (such as ferritic/martensitic steels), it is known that some radiation damage can be removed by heating the material to greater than around 40% or so of its melting point and holding the material at that temperature for a pre-determined amount of time—that is, annealing the material. This removal of radiation damage results from relieving stress by, primarily, thermally inducing migration of crystalline defects to grain boundaries. When these defects are in the form of dislocations, these dislocation points act as localized stress risers within the crystal. Increasing the temperature of the material increases the mobility of the dislocations, thereby enabling the dislocation to migrate to a grain boundary where the stress is relieved. Subsequent cooling (e.g., quenching) for a predetermined amount of time followed by an increase in temperature can temper the material, thereby "locking in" its desired metallurgical qualities.

Counter to this effect is creep (that is, physical geometry change of the bulk material due to applied stresses such as fuel element internal pressure from fission products). The rate of creep increases with increasing temperature for a given stress. The creep rate in conjunction with internal vs. external pressures on the fuel element and/or fuel assemblies may limit annealing temperatures and annealing times.

The illustrative methods, systems, and apparatuses described herein can be used to treat or anneal components of reactor core assemblies or fuel assemblies, as desired for a particular application. To that end, it will be appreciated that the discussion set forth above regarding components of reactor core assemblies and components of fuel assemblies (that may be annealed by illustrative embodiments disclosed herein) is provided by way of non-limiting examples. That is, the components of reactor core assemblies and the components of fuel assemblies that may be treated or annealed by illustrative embodiments disclosed herein is not limited to those components of reactor core assemblies and components of fuel assemblies discussed above. To that end, any irradiated component of any reactor core assembly or any fuel assembly can be treated or annealed by illustrative embodiments disclosed herein.

Illustrative Methods

Now that an overview of illustrative methods and non-limiting examples of illustrative components that may be treated or annealed has been set forth, illustrative details of methods will now be discussed.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular design paradigms.

Referring now to FIG. 1A, the illustrative method 100 for annealing at least a portion of at least one metallic component of a nuclear fission fuel assembly of a nuclear fission reactor begins at a block 102. At a block 104 an annealing temperature range for at least a portion of at least one metallic component of a nuclear fission fuel assembly of a nuclear fission reactor is determined. At a block 106 at least the portion of the at least one metallic component of the nuclear fission fuel assembly is annealed within the annealing temperature range. The method 100 stops at a block 108. Illustrative details will be set forth below.

It will be appreciated that any metallic component of any fuel assembly can be annealed by the method 100. For example, in some embodiments the at least one metallic component can include cladding, a cooling component, a structural member, a thermally conductive member, and/or nuclear fission fuel material. As discussed above, metals such as zircalloy and stainless steel also serve as the fuel element enclosure (that is, cladding). However, it will be appreciated that treatment by annealing as described herein can expand the types of materials that may be used for reactor core materials. To that end and given by way of non-limiting examples, metal from which the metallic component is made can include without limitation steel, oxide dispersion strengthened (ODS) steels, austenitic steels (304, 316), ferritic/martensitic steels refractory metal, a refractory metal alloy, a non-ferrous metal, a non-ferrous metal alloy, and/or a super-alloy (such as Inconels, Zircaloys, and/or Hastelloys).

In some embodiments, the annealing temperature range determined at the block 104 may be greater than a predetermined operating temperature range of the nuclear fission fuel assembly. For example, some illustrative pressurized water reactor fuel assemblies may have an operating temperature range between cold leg temperature $T_C$ of around 550° F. and hot leg temperature $T_H$ of around 650° F. (at a nominal coolant pressure of around 2,250 psig); an illustrative loop type liquid metal fast breeder reactor fuel assembly may have an operating temperature range between $T_C$ of around 700° F. and $T_H$ of around 1000° F.; and an illustrative gas cooled fast breeder reactor fuel assembly may have an operating temperature range between $T_C$ of around 600° F. and $T_H$ of around 1000° F. However, as will be described below, the annealing temperature range may be greater than the predetermined operating temperature range of the nuclear fission fuel assembly.

In some embodiments, the annealing temperature range may be determined based upon radiation exposure of the at least one metallic component of the nuclear fission fuel assembly. For example, annealing temperature range may be based upon factors such as energy of the neutron spectrum to which the metallic component has been exposed. For example, for a given exposure time (such as may be measured in effective full power hours), exposure to a fast neutron spectrum (like in a fast breeder reactor) may result in more radiation damage than would exposure of the metallic component to a thermal neutron spectrum (like in a pressurized water reactor). As another example, for exposure to a given neutron spectrum (such as a thermal neutron spectrum or a fast neutron spectrum), exposure for a longer time (such as may be measured in effective full power hours) may result in more radiation damage than would exposure of the metallic component exposure for a shorter time. In such a case, a higher annealing temperature range (for a given annealing processing time) may be entailed for the case of longer exposure to the given neutron spectrum than would be entailed for the case of shorter exposure to the given neutron spectrum.

Moreover, in some cases a portion of some components, such as without limitation, a middle of a fuel assembly or fuel element, may have a radiation exposure history that is different from a radiation exposure history of another portion of the component, such as without limitation, an edge region of the nuclear fission fuel assembly or fuel element. In such a case, a radiation damage gradient may exist along the component. Thus, an annealing temperature range may be different for one portion of the component to be annealed than for other portions of the component.

In some other embodiments, the annealing temperature range may be determined based upon an operating temperature history during which the radiation occurred. It will be appreciated that lower temperature regions of a fuel assembly may suffer more radiation damage effects than higher temperature regions in the same fuel assembly. Moreover, in some cases a portion of some components, such as without limitation a middle of a fuel assembly or fuel element, may have an operating temperature history that is different from an operating temperature history of another portion of the component, such as without limitation an edge region of the nuclear fission fuel assembly or fuel element. In such a case, a radiation damage gradient may exist along the component. Thus, an annealing temperature range may be different for one portion of the component to be annealed than for other portions of the component.

In some other embodiments, the annealing temperature range may be determined based upon an annealing history of the component to be annealed. That is, in some embodiments historical data regarding annealing temperature of past annealing operations for a metallic component may be used to determine future annealing temperature ranges for the metallic component.

In some other embodiments, the annealing temperature range may be determined based upon material properties of the at least one metallic component of the nuclear fission fuel assembly. For example, in some embodiments a minimum temperature of the annealing temperature range may be at least around thirty percent of a melting point of the at least one metallic component of the nuclear fission fuel assembly. In one of the non-limiting examples discussed above, for stainless steel with a melting point of around 2,732° F., such a minimum temperature of the annealing temperature range can be around 820° F. In another non-limiting example discussed above, for Zircaloy with a melting point of around 3,362° F., such a minimum temperature of the annealing temperature range can be around 1,009° F.

As another example, in some other embodiments, an annealing temperature within the annealing temperature range may be around forty percent of a melting point of the at least one metallic component of the nuclear fission fuel assembly. In one of the non-limiting examples discussed above, for stainless steel with a melting point of around 2,732° F., such an annealing temperature within the annealing temperature range can be around 1,093° F. In another non-limiting example discussed above, for Zircaloy with a melting point of around 3,362° F., such an annealing temperature within the annealing temperature range can be around 1,345° F.

As another example, for some metallic components an annealing temperature within the annealing temperature range may be selected up to around 122° F. above an austenic temperature of the metal (as determined by the metal's percentage composition of carbon). Given by way of non-limiting examples, based upon such a material property an annealing temperature range could be between around 1360° F. and around 1482° F. for carbon compositions above around 0.8 percent. As a further non-limiting example, based upon such a material property an annealing temperature range could range between around 1360° F. and around 1482° F. for carbon compositions around 0.8 percent and vary substantially linearly up to an annealing temperature range between around 1657° F. and around 1774° F. for carbon compositions around 0 percent.

However, in some embodiments, a maximum temperature of the annealing temperature range may be selected as desired to provide a predetermined safety margin below a melting point of at least one component of the nuclear fission fuel assembly. In some other embodiments, a maximum temperature of the annealing temperature range may be selected as desired to provide a predetermined safety margin below structural degradation of at least one component of the nuclear fission fuel assembly. As also discussed above, the creep rate in conjunction with internal vs. external pressures on the fuel element and/or fuel assemblies may affect annealing temperatures (and also annealing times).

Annealing at least the portion of the at least one metallic component at the block 106 can be performed in various locations, as desired. For example, in some embodiments annealing at least the portion of the at least one metallic component can be performed in-place.

Figure 1B:
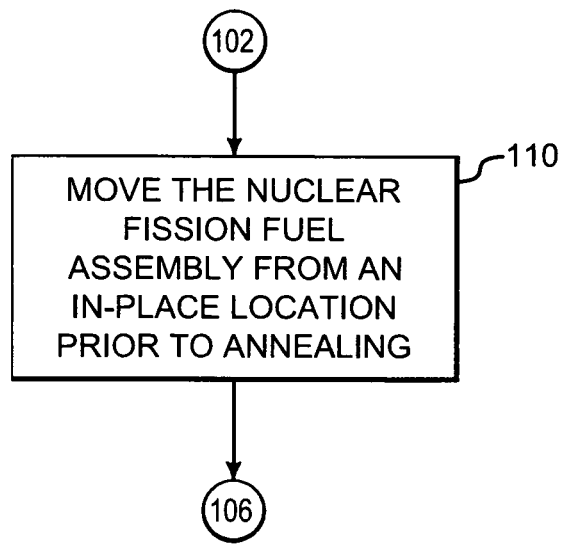

However, the at least one metallic component need not be annealed in-place. For example and referring now to FIG. 1B, in some other embodiments the nuclear fission fuel assembly (that includes the component to be annealed) may be moved at a block 110 from an in-place location prior to annealing at the block 106. In one arrangement, annealing may be performed within a reactor core of the nuclear fission reactor. For example, the nuclear fission fuel assembly may be moved from its in-place location to another location within the reactor core where the annealing is to take place. In another arrangement, annealing may be performed external of a reactor core of the nuclear fission reactor. For example, the nuclear fission fuel assembly may be moved from its in-place location to a location external of the reactor core but still internal to the reactor pressure vessel where the annealing is to take place. As another example, the nuclear fission fuel assembly may be moved from its in-place location to a location external of the reactor pressure vessel where the annealing is to take place. In such a case, annealing may be performed on-site of the nuclear fission reactor or off-site from the nuclear fission reactor, as desired.

Figure 1C:
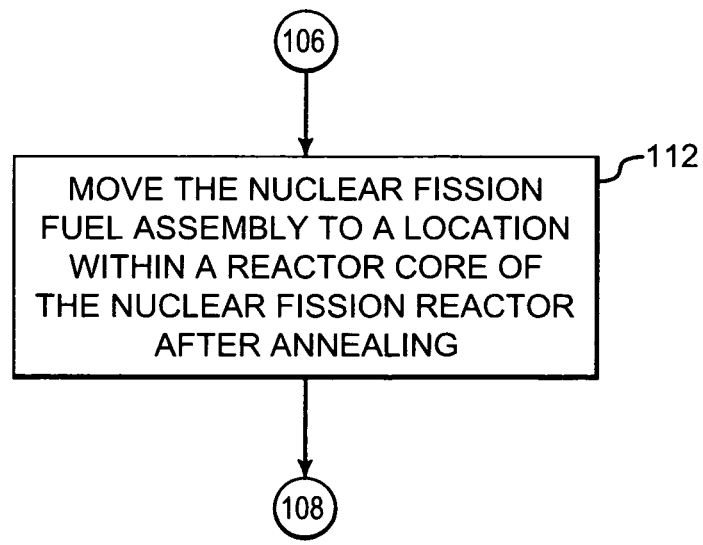

In some embodiments and referring now to FIG. 1C, the nuclear fission fuel assembly may be moved to a location within a reactor core of the nuclear fission reactor after annealing. For example, the annealed fuel assembly may be moved to its in-place location or any other in-core location as desired after having been annealed in a location other than its in-place location.

Figure 1D:
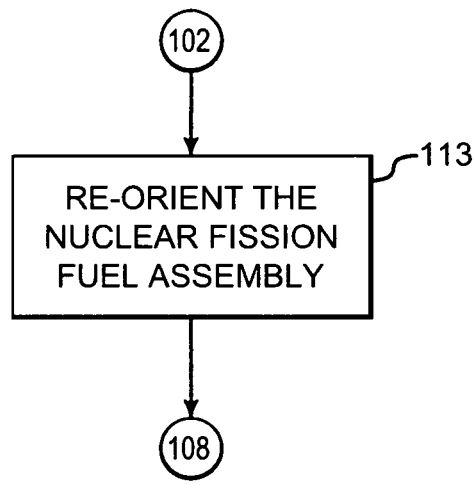

In some embodiments and referring to FIG. 1D, at a block 113 the nuclear fission fuel assembly may be re-oriented. Given by way of non-limiting example, the nuclear fission fuel assembly may be rotated 180 degrees for replacement in the reactor core. In such an arrangement, an end of the nuclear fission fuel assembly that was adjacent a cold leg inlet can be re-oriented for replacement in the reactor core adjacent a hot let outlet, and vice versa. That is, at the block 106 the nuclear fission fuel assembly can be turned "upside down" for replacement in the reactor core. In some embodiments, an entire nuclear fission fuel assembly need not be re-oriented at the block 113 in order for the nuclear fission fuel assembly to be considered re-oriented. For example, one or more fuel elements may be re-oriented within the nuclear fission fuel assembly in the same manner as described above (that is, rotated 180 degrees or turned "upside down"). It will be appreciated that the nuclear fission fuel assembly may be re-oriented before annealing or after annealing, as desired.

Figure 1E:
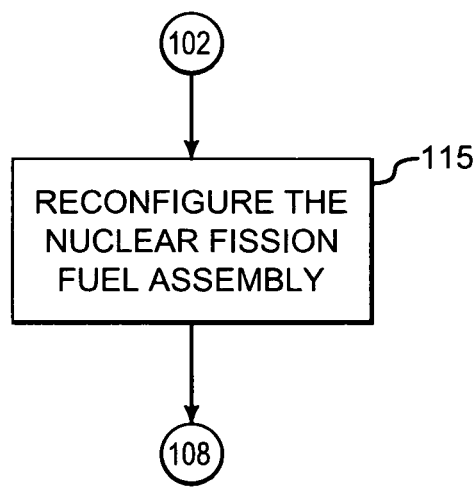

In some other embodiments and referring to FIG. 1E, at a block 115 the nuclear fission fuel assembly may be reconfigured. Given by way of non-limiting example, components (or portions of components) of the nuclear fission fuel assembly, such as fuel elements (or portions of fuel elements), may be removed from their original position in the nuclear fission fuel assembly and replaced in a different position in the nuclear fission fuel assembly. For example, a portion of a fuel element that was located away from an end (such as toward a middle) of the fuel element can be removed and swapped with a portion of the fuel element that was located toward an end of the fuel element, thereby reconfiguring the fuel element and, as a result, the nuclear fission fuel assembly. It will be appreciated that the nuclear fission fuel assembly may be reconfigured before annealing or after annealing, as desired.

Figure 1F:
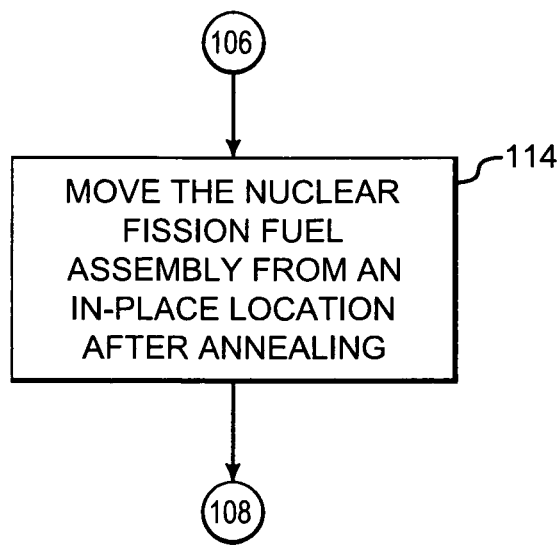

As another example and referring to FIG. 1F, at a block 114 the nuclear fission fuel assembly may be moved from an in-place location after annealing. In such an arrangement, the annealed fuel assembly may be moved to another location other than its original in-place location after having been annealed in-place. Such relocations as described above may be performed as part of a fuel assembly utilization plan, if desired.

Annealing at least the portion of the at least one metallic component of the nuclear fission fuel assembly within the annealing temperature range at the block 106 can be performed in various manners as desired for a particular application.

Figure 1G:
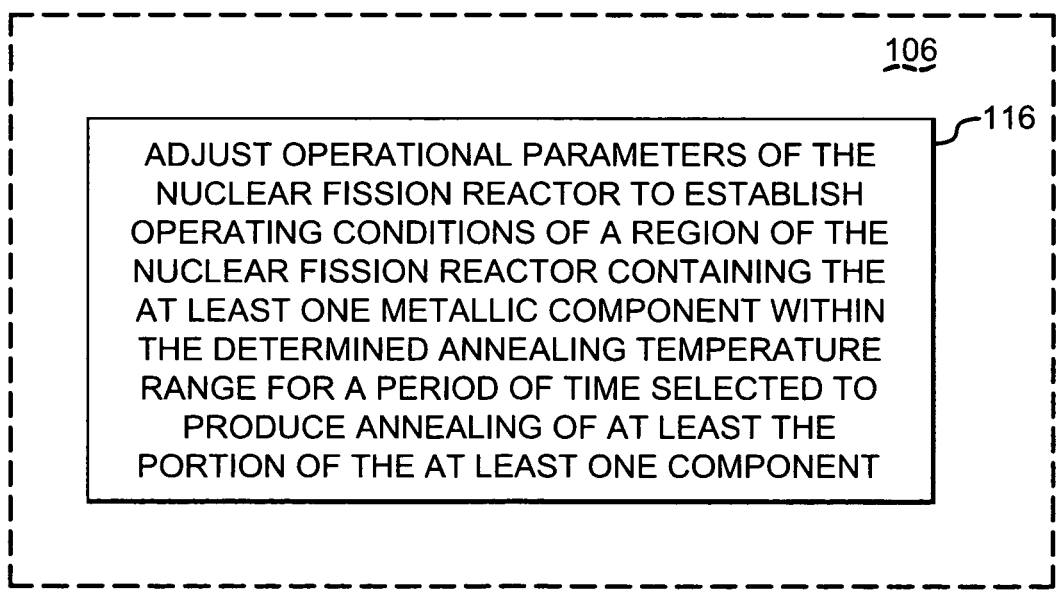

For example and referring to FIG. 1G, in some embodiments annealing at least the portion of the at least one metallic component of the nuclear fission fuel assembly within the annealing temperature range at the block 106 can include adjusting operational parameters of the nuclear fission reactor to establish operating conditions of a region of the nuclear fission reactor containing the at least one metallic component within the determined annealing temperature range for a period of time selected to produce annealing of at least the portion of the at least one metallic component at a block 116. It will be appreciated that in some arrangements one or more portions of a component (such as portions that generate heat from nuclear fission during power range operations or that generate decay heat) that are hotter than other portions of the component may experience more annealing effect than the other portions of the component.

Figure 1H:
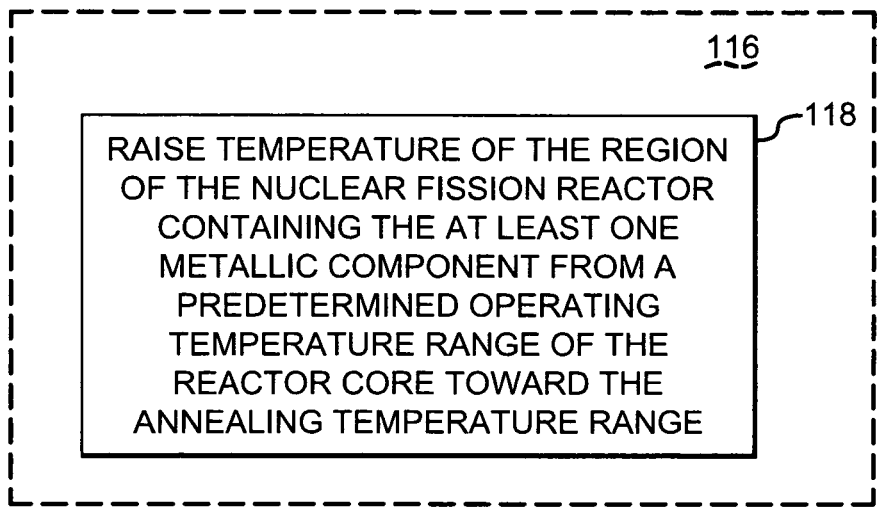
Figure 1I:
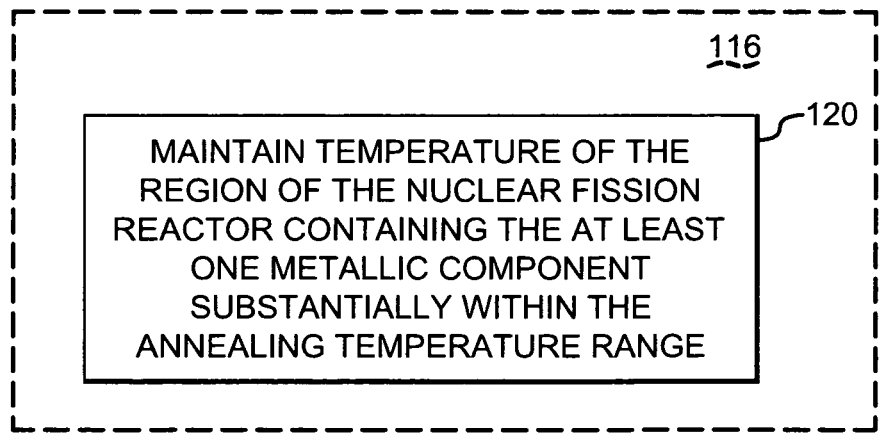

In some embodiments and referring to FIG. 1H, adjusting operational parameters at the block 116 can include raising temperature of the region of the nuclear fission reactor containing the at least one metallic component from a predetermined operating temperature range of the reactor core toward the annealing temperature range at a block 118. Referring to FIG. 1I, adjusting operational parameters at the block 116 can include maintaining temperature of the region of the nuclear fission reactor containing the at least one metallic component substantially within the annealing temperature range at a block 120.

Illustrative details regarding adjusting operational parameters to raise and/or maintain temperature and regarding selecting a period of time to produce annealing will be discussed below.

Figure 1J:
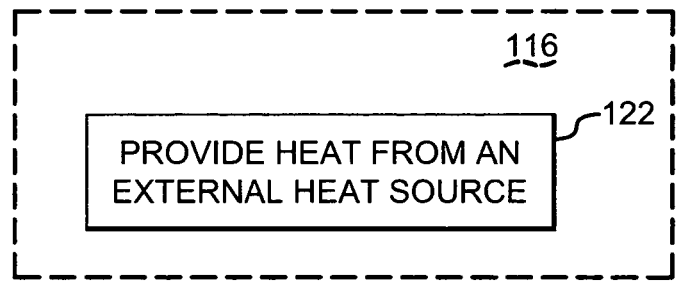

Referring now to FIG. 1J, adjusting operational parameters at the block 116 can include providing heat from an external heat source at a block 122. It will be appreciated that an external heat source can be placed in thermal communication with a portion of the component or all or substantially all of the component, as desired for a particular application. In some arrangements, placing an external heat source in thermal communication with a portion of the component can help permit annealing one portion of the component. In such an arrangement, other portions of the component may experience less annealing effect than the portion in thermal communication with the external heat source. In some arrangements (such as in a reactor core that is shut down), the portion in thermal communication with the external heat source may experience an annealing effect and the other portions may experience little or no annealing effect.

In some embodiments, the external heat source can include at least one electrical heat source. In some other embodiments, the external heat source can include at least one source of residual heat. For example, the residual heat can include decay heat. Given by way of non-limiting example, the decay heat may be generated by nuclear fission fuel material of one or more nuclear fission fuel elements of a fuel assembly that contains the metallic component being annealed and/or by nuclear fission fuel material of one or more nuclear fission fuel elements of one or more fuel assemblies that do not contain the metallic component being annealed. In some cases, such as when the metallic component to be annealed is cladding or metallic nuclear fission fuel material, the decay heat may be generated by nuclear fission fuel material of the nuclear fission fuel element that contains the metallic component being annealed.

In some other embodiments, the external heat source can include a heating fluid. For example, a heating fluid can be placed in thermal communication with the metallic component to be annealed. In such an arrangement the temperature of the heating fluid can be established around a predetermined temperature to produce a desired annealing effect. The heating fluid, by way of non-limiting example, may include the reactor coolant as a major component of the heating fluid. In this example, the temperature of the heating fluid is brought to a desired temperature by any one or more of the methods discussed above and placed in thermal communication with the metallic component to be annealed. By way of another non-limiting example, the fluid my be substantially different from the reactor coolant and may include any non-reactive fluid, such as nitrogen, argon, helium, and/or combinations of these fluids, with the reactor coolant. The non-reactive fluid temperature may also be controlled by any one or more of the methods discussed above.

Figure 1K:
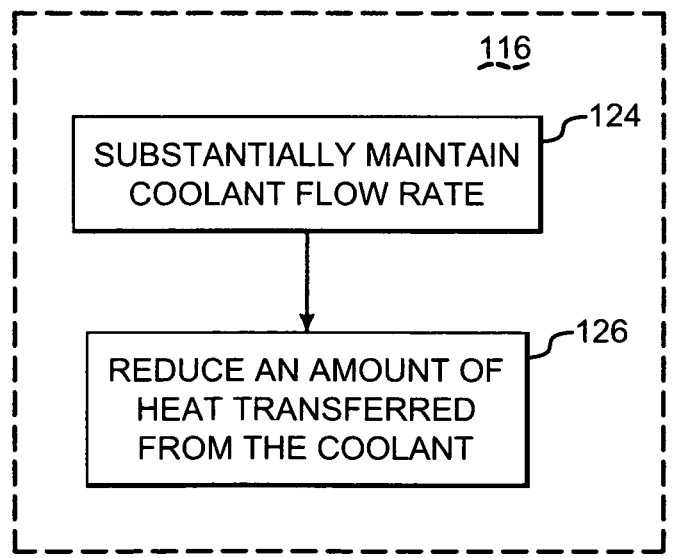

In some other embodiments and referring to FIG. 1K, adjusting operational parameters at the block 116 can include substantially maintaining coolant flow rate at a block 124 and reducing an amount of heat transferred from the coolant at a block 126. In such an arrangement, in some embodiments the heat transfer that is reduced is the heat transfer from the reactor coolant to a heat exchanger. Given by way of non-limiting example, an amount of heat transferred from the coolant can be reduced by reducing an amount of fluid that exits a secondary side of a heat exchanger through which reactor coolant flows on a primary side. For example, a valve can be throttled toward a shut position on a secondary side of a primary-to-secondary heat exchanger in a pressurized water reactor, a pool-type liquid metal fast breeder reactor, or a gas-cooled fast breeder reactor. As a further example, a valve can be throttled toward a shut position on an intermediate side of an intermediate heat exchanger in a loop-type liquid metal fast breeder reactor. Given by way of further example, a heat load presented to any of the heat exchangers described above can be reduced.

Figure 1L:
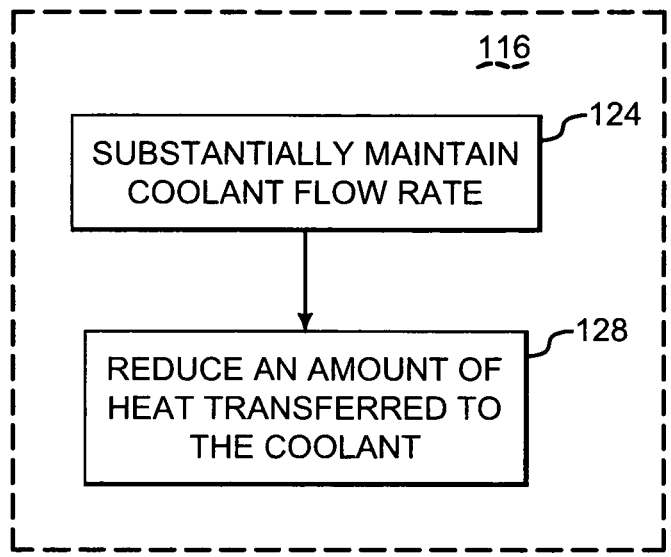

Similarly and referring to FIG. 1L, in some embodiments adjusting operational parameters at the block 116 can include substantially maintaining coolant flow rate at the block 124 and reducing an amount of heat transferred to the coolant at a block 128. In such an arrangement, in some embodiments the heat transfer that is reduced is the heat transfer from the nuclear fission fuel assembly containing the metallic component to be annealed to the reactor coolant. For example, if the heat transferred to a heat sink, such as a heat exchanger like a steam generator or the like, is reduced then the primary coolant temperature increases. This temperature increase of the reactor coolant in turn causes the temperature of the nuclear fission fuel assembly containing the metallic component to be annealed to rise for a given heat flux (that is, if decay heat is used as a heat source then the heat generation rate in the fuel will be roughly constant on short time scales). The nuclear fission fuel assembly then reaches a new temperature based on the new rate of heat rejection at the secondary loop or intermediate loop, as the case may be for a particular reactor application.

To that end and given by way of non-limiting example, an amount of heat transferred to the coolant can be reduced by reducing an amount of fluid that exits a secondary side of a heat exchanger through which reactor coolant flows on a primary side. For example, a valve can be throttled toward a shut position on a secondary side of a primary-to-secondary heat exchanger in a pressurized water reactor, a pool-type liquid metal fast breeder reactor, or a gas-cooled fast breeder reactor. As a further example, a valve can be throttled toward a shut position on an intermediate side of an intermediate heat exchanger in a loop-type liquid metal fast breeder reactor. Given by way of further example, a heat load presented to any of the heat exchangers described above can be reduced.

Figure 1M:
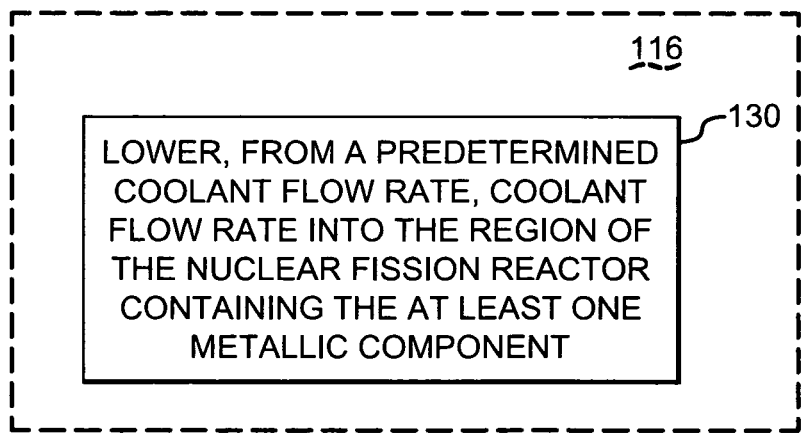

In other embodiments, referring to FIG. 1M adjusting operational parameters at the block 116 can include lowering, from a predetermined coolant flow rate, coolant flow rate into the region of the nuclear fission reactor containing the at least one metallic component at a block 130. For example, coolant flow rate can be lowered by throttling down a flow adjustment device, such as a valve. As another example, coolant flow rate can be lowered by shifting reactor coolant pump speed downward, such as from fast speed to slow speed, or by reducing the number of operating reactor coolant pumps.

Figure 1N:
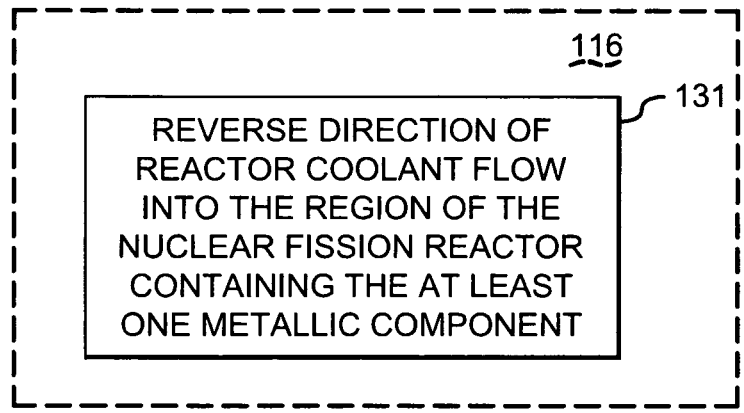

In other embodiments, referring to FIG. 1N adjusting operational parameters at the block 116 can include reversing direction of reactor coolant flow into the region of the nuclear fission reactor containing the at least one metallic component at a block 131. For example, in some arrangements reactor coolant flow can be reversed by appropriate positioning of cutoff valves and check valves. In some other arrangements, such as when the reactor coolant includes an electrically-conductive liquid reactor coolant, such as liquid metals, coolant flow can be reversed by an appropriate electrical device that can electrically control flow of electrically-conductive liquids.

Figure 1O:
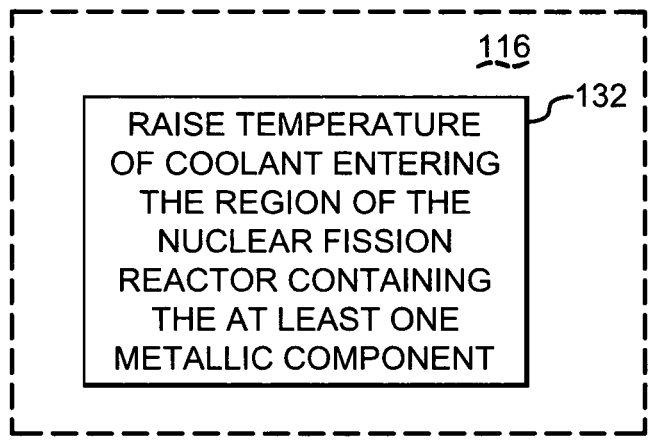

In other embodiments, referring to FIG. 1O adjusting operational parameters at the block 116 can include raising temperature of coolant entering the region of the nuclear fission reactor containing the at least one metallic component at a block 132. For example, reactivity level can be raised (such as, without limitation, by withdrawing control rods or otherwise removing neutron absorbing material) thereby increasing the amount of heat transferred from the nuclear fission fuel elements to the reactor coolant and, thus, raising temperature of reactor coolant for a given coolant flow rate. It will be appreciated that a negative temperature coefficient of reactivity (that is, negative $\alpha_T$) can help maintain inherent stability of the nuclear fission reactor in such cases.

Figure 1P:
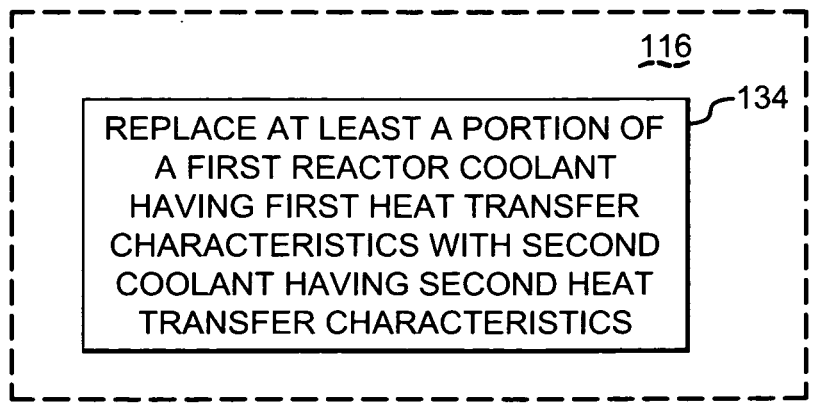

In some embodiments, referring to FIG. 1P adjusting operational parameters at the block 116 can include replacing at least a portion of a first reactor coolant having first heat transfer characteristics with second coolant having second heat transfer characteristics at a block 134. For example, in a liquid metal fast breeder reactor some or all of sodium reactor coolant may be replaced with lead reactor coolant or lead-bismuth reactor coolant; some or all of lead reactor coolant may be replaced with sodium reactor coolant or lead-bismuth reactor coolant; and some or all of lead-bismuth reactor coolant may be replaced with sodium reactor coolant or lead reactor coolant. Similarly, in a gas-cooled fast breeder reactor gaseous helium reactor coolant may be replaced with, given by way of non-limiting examples, gaseous argon, nitrogen, or supercritical carbon dioxide reactor coolant. In a pressurized water reactor, the liquid water reactor coolant may be replaced with, given by way of non-limiting examples, steam, inert gas, or the like.

Figure 1Q:
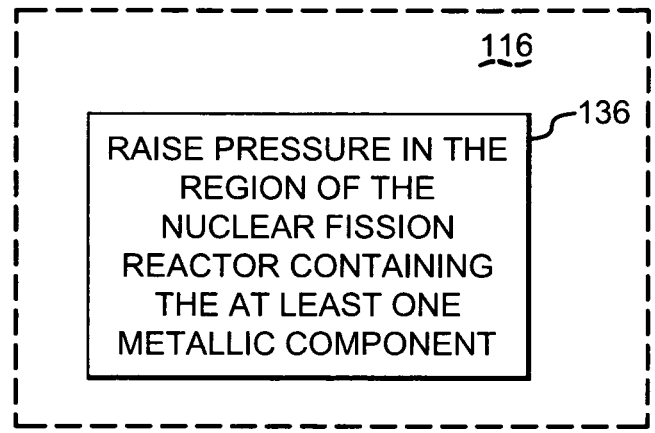

Referring now to FIG. 1Q, in some embodiments adjusting operational parameters at the block 116 can include raising pressure in the region of the nuclear fission reactor containing the at least one metallic component at a block 136. For example, pressure can be raised by a pressurizer (such as by energizing additional heaters in the pressurizer). Raising pressure can raise the temperature at which reactor coolant boils, thereby permitting raising temperature of the reactor coolant (and thus temperature of the metallic component to be annealed) without inducing local boiling in the reactor coolant in the region of the nuclear fission reactor containing the at least one metallic component.

Figure 1R:
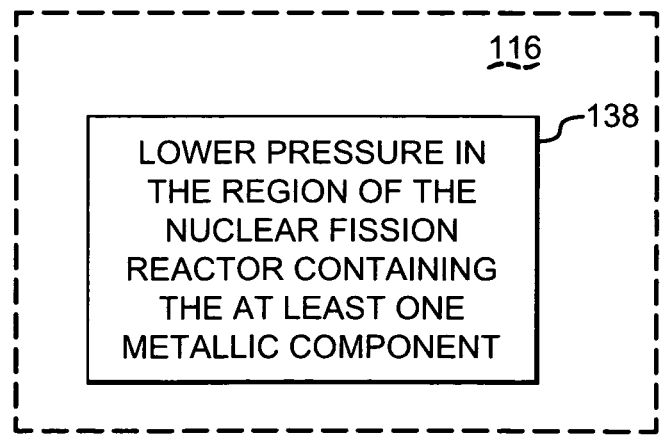

Referring now to FIG. 1R, in some other embodiments adjusting operational parameters at the block 116 can include lowering pressure in the region of the nuclear fission reactor containing the at least one metallic component. For example, pressure can be lowered by a pressurizer (such as by de-energizing heaters in the pressurizer). In some cases it may be desirable for local boiling to occur in the region of the nuclear fission reactor containing the at least one metallic component. Lowering pressure can lower the temperature at which reactor coolant boils, thereby permitting inducing local boiling in the reactor coolant in the region of the nuclear fission reactor containing the at least one metallic component. Because boiling is an isothermal process, substantially even temperature distribution can be maintained within the nuclear fission fuel assembly to be annealed. A substantially even temperature distribution may be maintained even in the event of increased heat generation rate of the heat generating material within the nuclear fission fuel assembly.

Figure 1S:
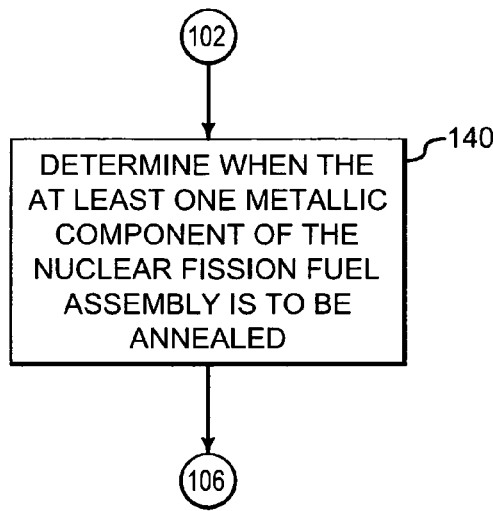

Referring now to FIG. 1S, a determination may be made at a block 140 regarding when the at least one metallic component of the nuclear fission fuel assembly is to be annealed. The determination of when the at least one metallic component of the nuclear fission fuel assembly is to be annealed may be made at the block 140 in a variety of manners, as desired for a particular application.

Figure 1T:
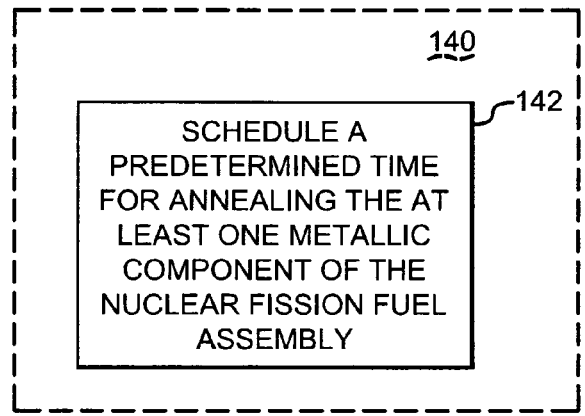

For example, in some embodiments and referring to FIG. 1T, determining when the at least one metallic component of the nuclear fission fuel assembly is to be annealed at the block 140 can include scheduling a predetermined time for annealing the at least one metallic component of the nuclear fission fuel assembly at a block 142. In some embodiments, the predetermined time may be scheduled during design of the reactor core assembly. In such a case, annealing may be considered to be part of reactor operation. As such, annealing may be performed for the reactor core assembly in bulk, if desired. Moreover, if applicable, bulk annealing of the reactor core assembly may be performed on a periodic schedule.

In some other embodiments, determining when the at least one metallic component of the nuclear fission fuel assembly is to be annealed at the block 140 may be based upon history of the at least one metallic component. For example, determining when the at least one metallic component of the nuclear fission fuel assembly is to be annealed at the block 140 may be based upon an annealing history of the at least one metallic component. That is, in some embodiments historical data regarding time between annealing operations for a metallic component may be used to predict and schedule future annealing operations for the metallic component.

As another example, determining when the at least one metallic component of the nuclear fission fuel assembly is to be annealed at the block 140 may be based upon an operational history of the nuclear fission fuel assembly. Given by way of non-limiting example, the operational history of the nuclear fission fuel assembly may include temperature history and/or radiation exposure or the like. In some embodiments, it may be known that materials typically are brought to annealing conditions at a certain operational time (such as may be measured in effective full power hours) or at a specific location within a reactor core assembly. In such a case, determining when to anneal the metallic component may be based on input from fluence history and temperature history. This fluence and temperature input may then be input into a calculation that can estimate (i) extent of radiation damage, if any; (ii) if annealing is needed; and (iii) in cases where annealing is needed, which annealing parameters are to be used.

Figure 1U:
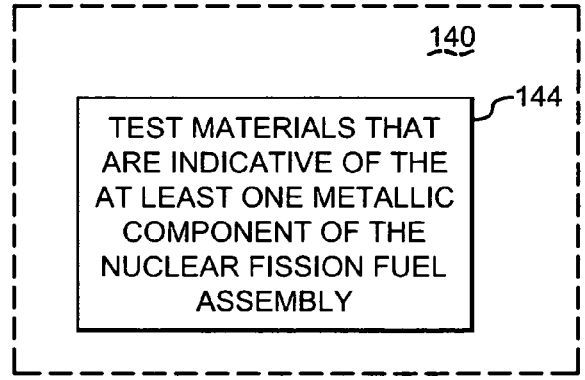
Figure 1V:
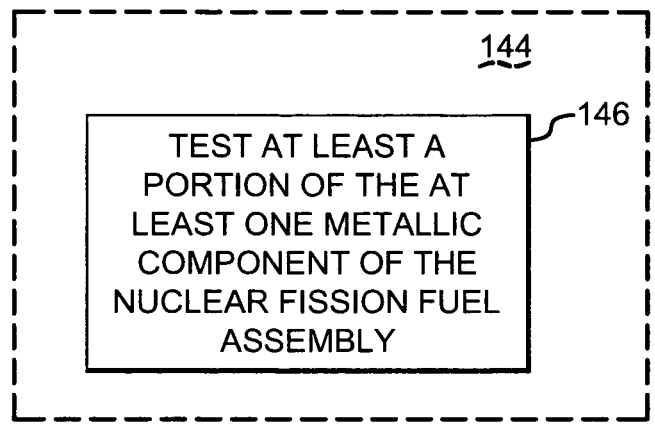
Figure 1W:
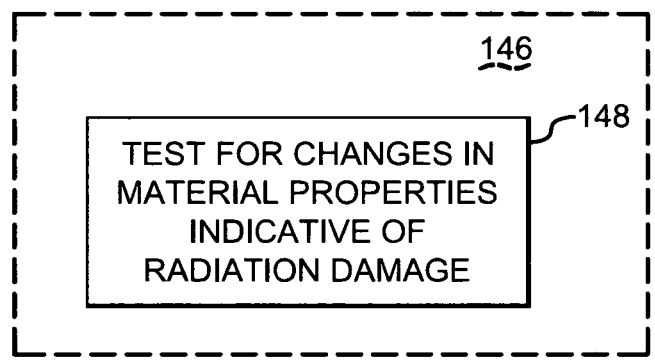

In some other embodiments and referring now to FIG. 1U, determining when the at least one metallic component of the nuclear fission fuel assembly is to be annealed at the block 140 may include testing materials that are indicative of the at least one metallic component of the nuclear fission fuel assembly at a block 144. In some embodiments and referring to FIG. 1V, testing materials that are indicative of the at least one metallic component of the nuclear fission fuel assembly at the block 144 can include testing at least a portion of the at least one metallic component of the nuclear fission fuel assembly at a block 146. Given by way of non-limiting example, referring to FIG. 1W testing materials that are indicative of the at least one metallic component of the nuclear fission fuel assembly at the block 146 may include testing for changes in material properties indicative of radiation damage at a block 148. For example, some illustrative material properties indicative of radiation damage may include electrical resistivity, physical dimensions, displacement response to physical stress, response to stimulus, speed of sound within material, ductile-to-brittle transition temperature, and/or radiation emission.

Figure 1X:
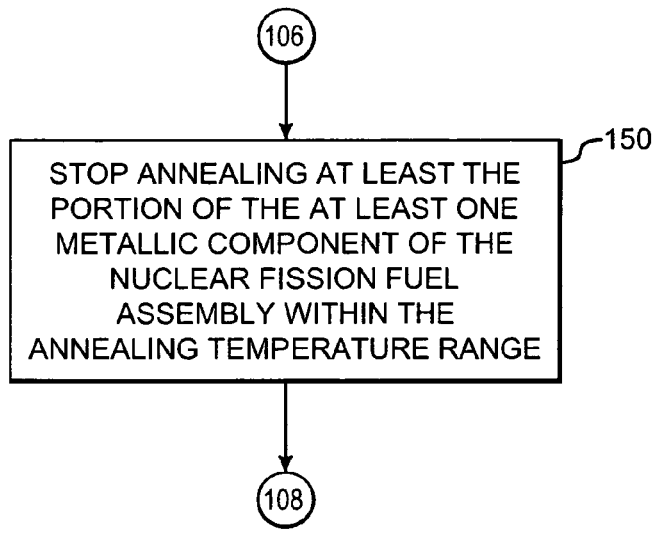

In some embodiments and referring to FIG. 1X, annealing at least the portion of the at least one metallic component of the nuclear fission fuel assembly within the annealing temperature range is stopped at a block 150. That is, in some embodiments temperature may be returned from the annealing temperature range toward the predetermined operating temperature range. In some cases, temperature may be reduced to ambient (such as when a reactor is shut down, cooled down, and depressurized for maintenance or any other application as desired).

A determination of when to stop annealing at least the portion of the at least one metallic component of the nuclear fission fuel assembly within the annealing temperature range at the block 150 may be made in any manner as desired for a particular application. For example, in some embodiments annealing may be stopped at the block 150 after a predetermined time period. Given by way of non-limiting example, the predetermined time period may be a function of temperature. For example, the predetermined time period may have an inverse relationship to the annealing temperature (that is, the lower the annealing temperature the longer the predetermined time period, and vice versa).

In some other embodiments, the predetermined time period may be a function of changes in material properties indicative of radiation damage. For example, the predetermined time period may be directly (as opposed to inversely) proportional to changes in material properties indicative of radiation damage. In some cases, for a given annealing temperature the predetermined time period may be proportional to an amount or extent of radiation damage throughout the at least one metallic component. In some other cases, for a given annealing temperature the predetermined time period may be proportional to severity of radiation damage regardless of amount or extent of radiation damage throughout the at least one metallic component.

In some embodiments the predetermined time period may be a function of radiation exposure. In such an arrangement, radiation damage to the at least one metallic component need not be determined. In some cases, for a given annealing temperature the predetermined time period may be proportional to energy of the neutron spectrum to which the at least one metallic component has been exposed. For example, a predetermined time period associated with exposure to a fast neutron spectrum (such as in a fast breeder reactor) may be longer than a predetermined time period associated with exposure to a thermal fission spectrum (such as in a pressurized water reactor). In some other cases, for a given annealing temperature the predetermined time period may be proportional to length of time of exposure. For example, longer exposure of a metallic component may entail a longer predetermined time period of annealing before stopping the annealing operation. However, it will be appreciated that exposure in a thermal reactor may entail additional exposure time to result in equivalent exposure time in a fast reactor.

Figure 1Y:
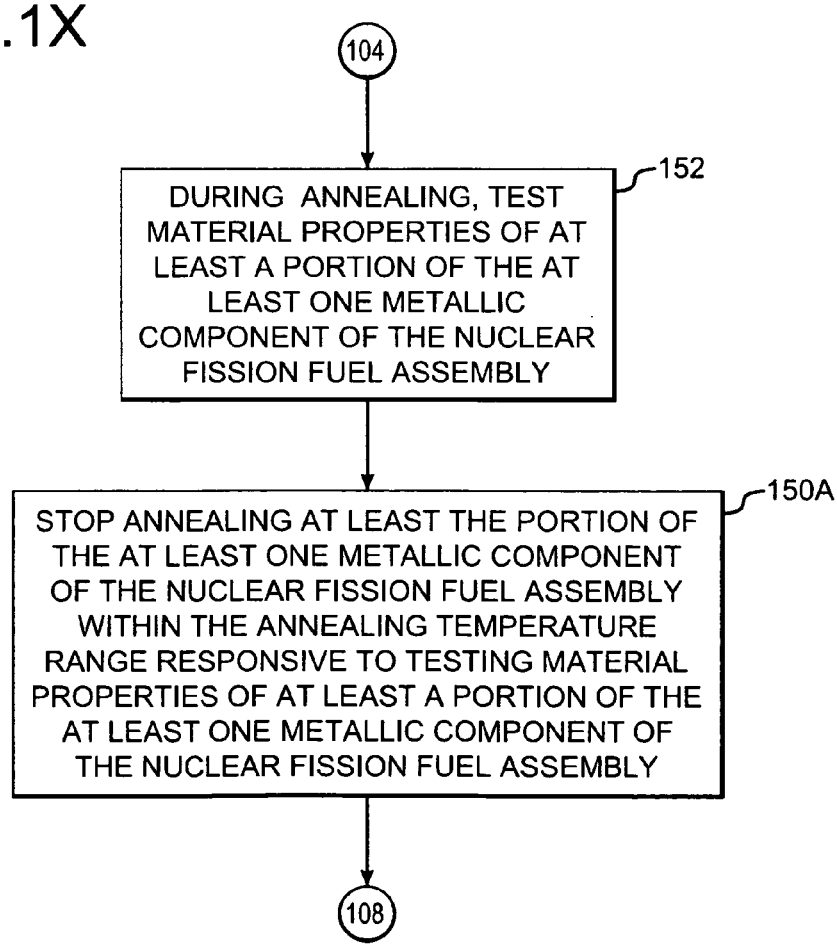

Referring now to FIG. 1Y, in some embodiments material properties of at least a portion of the at least one metallic component of the nuclear fission fuel assembly may be tested at a block 152 during annealing at the block 106. In such an arrangement, annealing at the block 106 is stopped at a block 150A responsive to testing material properties of at least a portion of the at least one metallic component of the nuclear fission fuel assembly. For example, results of testing of material properties can be monitored during annealing. When monitored results of a desired parameter have returned within desired levels, then annealing may be stopped.

It will also be appreciated that, as discussed above, the creep rate in conjunction with internal vs. external pressures on the fuel element and/or fuel assemblies may limit annealing times (as well as temperatures).

Figure 1Z:
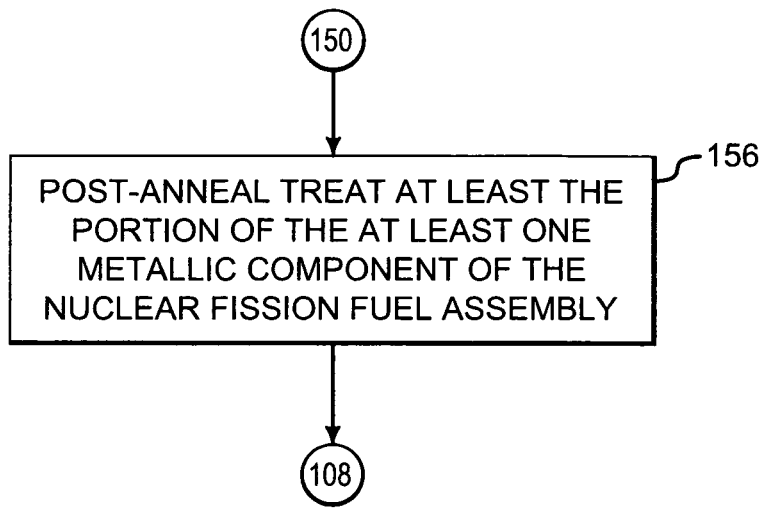
Figure 1A:
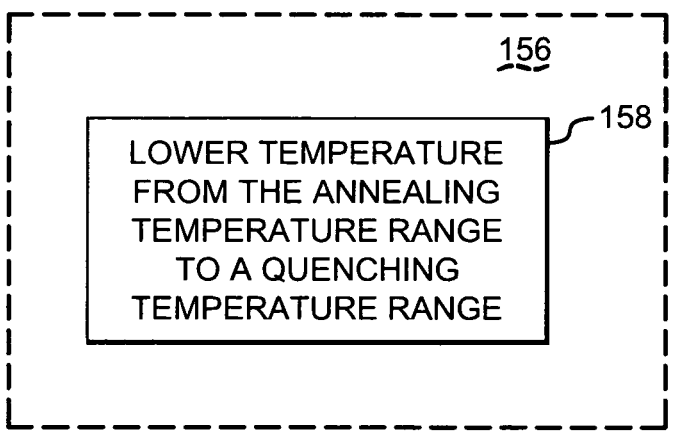
Figure 1A:
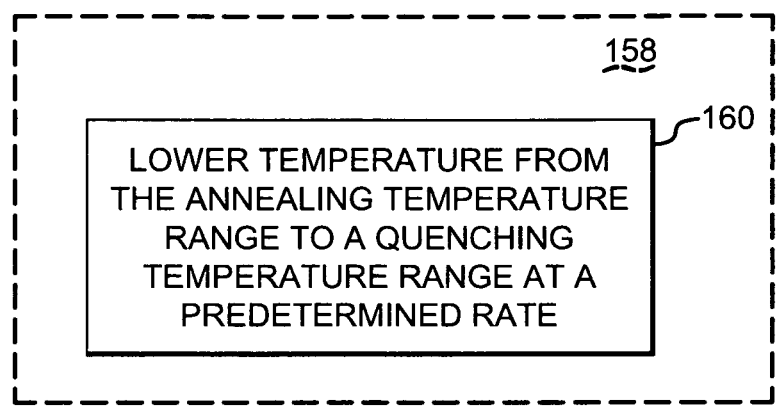
Figure 1A:
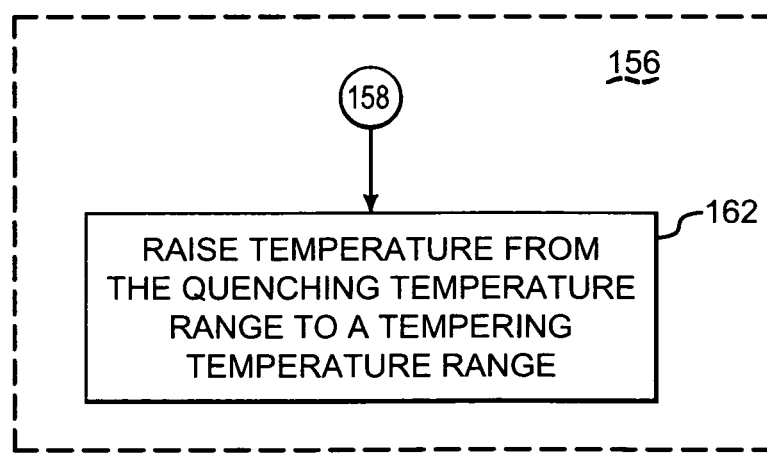
Figure 1A:
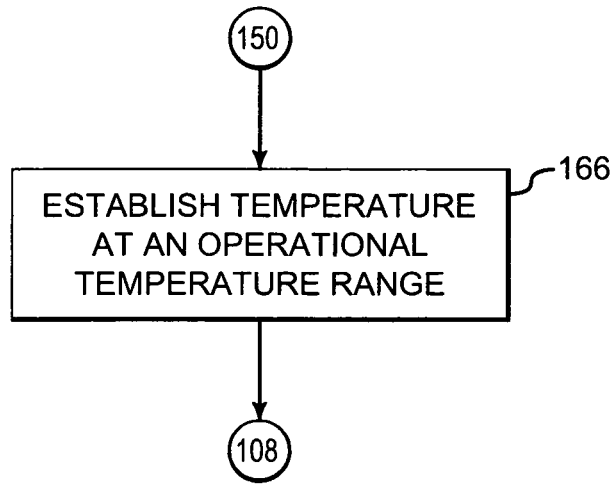
Figure 1A:
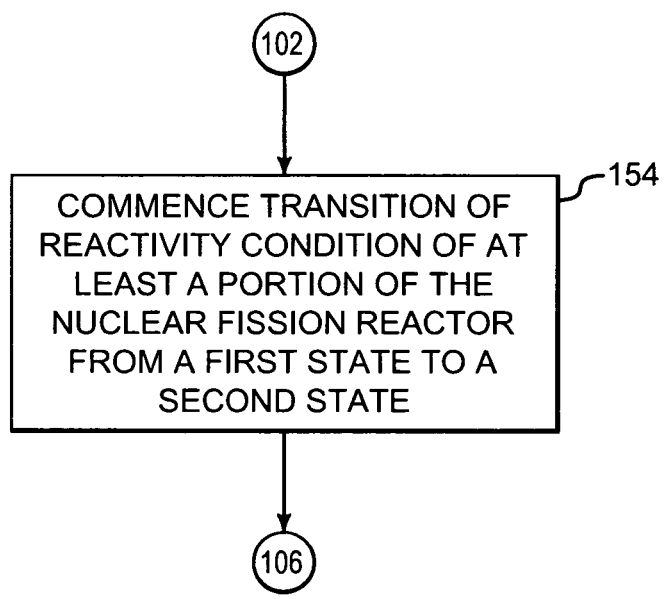

After annealing has been stopped at the block 150, it may be desirable in some embodiments to further treat that which has been annealed. To that end and referring now to FIG. 1Z, in some embodiments at a block 156 at least the portion of the at least one metallic component of the nuclear fission fuel assembly can be treated with post-annealing treatment.

In some embodiments, post-annealing treatment can include quenching. Quenching can produce a phase of crystal types in the material of the metallic component, thereby hardening the material.

To that end and referring to FIG. 1AA, in some embodiments post-anneal treating at least the portion of the at least one metallic component of the nuclear fission fuel assembly at the block 156 can include lowering temperature from the annealing temperature range to a quenching temperature range at a block 158. The quenching temperature range suitably is sufficiently low enough to cool the material that has been annealed. Given by way of non-limiting example, in some embodiments a suitable quenching temperature range can be around 200° C.-300° C. (392° F.-572° F.). However, any suitable quenching temperature range may be selected as desired for a particular application.

For example, in some embodiments in which the reactor coolant is a liquid metal, it will be appreciated that the quenching temperature range should be sufficiently high enough for a liquid metal reactor coolant to remain in liquid phase. Given by way of non-limiting examples, sodium has a melting point of 207.9° F., lead-bismuth eutectic has a melting point of 254.3° F., and lead has a melting point of 327.5° F. In such arrangements, the quenching temperature range may be selected to be as low as desired to cool the material to perform quenching yet be high enough to keep the liquid metal reactor coolant in liquid phase.

It will be noted that it may be desirable to lower temperature at the block 158 at a rate sufficient to achieve a quenching effect. To that end and referring to FIG. 1AB, in some embodiments lowering temperature to a quenching temperature range at the block 158 can include lowering temperature at a predetermined rate at a block 160.

It will be appreciated that such a predetermined rate of lowering temperature may be selected as desired for a particular application and may depend on various factors, such as without limitation material to be quenched, amount of hardening desired, limitations on rate of lowering temperature due to reactor plant construction characteristics, and the like. If desired, in some embodiments a reactor plant may be shut down and cooled down and/or depressurized to help lower temperature toward the quenching temperature. In some other embodiments, replacement reactor coolant (for example, at a lower temperature than existing reactor coolant) may be introduced into the reactor core to help lower temperature toward the quenching temperature.

In some other embodiments, post-annealing treatment can also include tempering after quenching. While quenching can produce a phase, tempering can grow the produced phase to any gaps in a grain boundary, thereby helping to relax grain boundary stress that may have developed during annealing and, as a result, toughening the material.

To that end and referring to FIG. 1AC, in some embodiments post-anneal treating at least the portion of the at least one metallic component of the nuclear fission fuel assembly at the block 156 can also include raising temperature from the quenching temperature range to a tempering temperature range at a block 162. The quenching temperature range suitably is any temperature range as desired that is between the quenching temperature range and the annealing temperature range. In some embodiments the tempering temperature range may be higher than the operating temperature range. In some other embodiments the tempering temperature range may be lower than the operating temperature range.

Referring now to FIG. 1AD, in some embodiments after annealing has stopped at the block 150 temperature may be established at an operational temperature range at a block 166, if desired.

Referring now to FIG. 1AE, in some embodiments annealing at the block 106 can be performed after commencement of transition of reactivity condition of at least a portion of the nuclear fission reactor from a first state to a second state at a block 154. Given by way of non-limiting example, the first state can include power range operation and the second state can include a shut-down state.

It will be appreciated that any number of metallic components of any number of fuel assemblies may be annealed, as desired for a particular application. For example, in some embodiments fewer than all nuclear fission fuel assemblies of a reactor core of the nuclear fission reactor can be annealed. In some other embodiments, substantially all nuclear fission fuel assemblies of a reactor core of the nuclear fission reactor can be annealed, as desired.

Other illustrative methods will be described below.

Referring now to FIG. 2A, the illustrative method 200 for annealing at least a portion of at least one component of a reactor core of a nuclear fission reactor begins at a block 202. At a block 204 an annealing temperature range (that is higher than a predetermined operating temperature range of the reactor core) for at least a portion of at least one component of the reactor core of a nuclear fission reactor is determined. At a block 206 at least the portion of the at least one component is annealed within the annealing temperature range. The method 200 stops at a block 208. Illustrative aspects will be described briefly below.

While the method 100 (FIG. 1A) discloses annealing at least a portion of at least one metallic component of a nuclear fission fuel assembly of a nuclear fission reactor, the method 200 discloses annealing at least a portion of any component or components of a reactor core of a nuclear fission reactor. Thus, the method 200 can be used for annealing at least a portion of one or more reactor core components such as without limitation a nuclear fission fuel assembly, a reactor core cooling component, and/or a reactor core structural member, non-limiting examples of which are discussed above. In some arrangements, the method 200 can be used to anneal at least a portion of one or more components of a nuclear fission fuel assembly, such as without limitation cladding, a cooling component, a structural member, a thermally conductive member, and/or nuclear fission fuel material, non-limiting examples of which are discussed above.

Moreover, the method 200 can be performed on any component of a reactor core—regardless of whether the component is metallic or not. Thus, annealing as disclosed by the method 200 can permit use in reactor cores of advanced materials, such as composite materials like SiC/SiC or the like. However, it will be appreciated that the method 200 may also be used for a one or more reactor core components that are made of metals—such as without limitation steel, oxide dispersion strengthened (ODS) steels, austenitic steels (304, 316), ferritic/martensitic steels refractory metal, a refractory metal alloy, a non-ferrous metal, a non-ferrous metal alloy, and/or a superalloy (such as Inconels, Zircaloys, and/or Hastelloys).

Further, while the annealing temperature range for the method 100 (FIG. 1A) need not be higher than an operating temperature range, it will also be noted that the annealing temperature range determined at the block 204 is higher than the predetermined operating temperature range of the reactor core.

With the exception of the differences noted directly above, other aspects of the method 200 are similar to aspects of the method 100 (FIG. 1A). To that end and for sake of brevity, aspects of the method 200 will be described briefly.

As noted above, the annealing temperature range determined at the block 204 is higher than a predetermined operating temperature range of the reactor core. The discussion of optional arrangements of the method 100 (FIG. 1A) in which annealing temperature range is higher than a predetermined operating temperature range is applicable to the method 200. Thus, details of the annealing temperature range being higher than the operating temperature range need not be repeated for an understanding. However, aspects of the method 200 will be noted below for completeness.

For example, in some embodiments, the annealing temperature range may be determined based upon any one or more factors such as radiation exposure of the at least one component, an operating temperature history during which the radiation occurred, and/or an annealing history of the component to be annealed. In some other embodiments, the annealing temperature range may be determined based upon material properties of the at least one component. For example, in some embodiments a minimum temperature of the annealing temperature range may be at least around thirty percent of a melting point of the at least one component. As another example, in some other embodiments, an annealing temperature within the annealing temperature range may be around forty percent of a melting point of the at least one component. In some embodiments, a maximum temperature of the annealing temperature range may be selected as desired to provide a predetermined safety margin below a melting point of at least one component. In some other embodiments, a maximum temperature of the annealing temperature range may be selected as desired to provide a predetermined safety margin below structural degradation of at least one component.

Figure 2B:
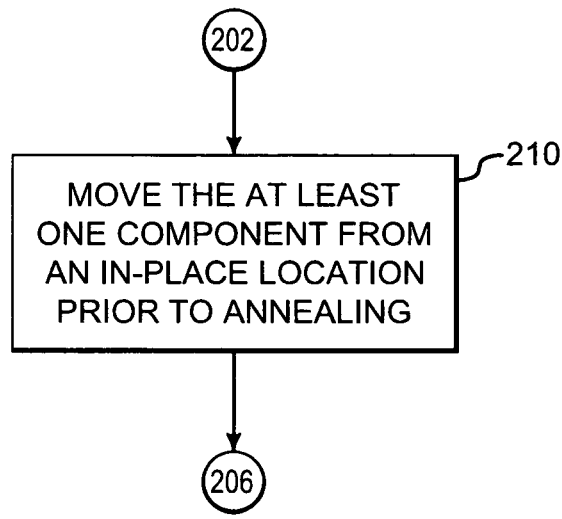

Annealing at least the portion of the at least one component at the block 206 can be performed in various locations, as desired. For example, in some embodiments annealing at least the portion of the at least one component can be performed in-place. However, the at least one component need not be annealed in-place. For example and referring now to FIG. 2B, in some other embodiments the at least one component to be annealed may be moved at a block 210 from an in-place location prior to annealing at the block 206. In one arrangement, annealing may be performed within a reactor core of the nuclear fission reactor. For example, the at least one component may be moved from its in-place location to another location within the reactor core where the annealing is to take place. In another arrangement, annealing may be performed external of a reactor core of the nuclear fission reactor. For example, the at least one component may be moved from its in-place location to a location external of the reactor core but still internal to the reactor pressure vessel where the annealing is to take place. As another example, the at least one component may be moved from its in-place location to a location external of the reactor pressure vessel where the annealing is to take place. In such a case, annealing may be performed on-site of the nuclear fission reactor or off-site from the nuclear fission reactor, as desired.

Figure 2C:
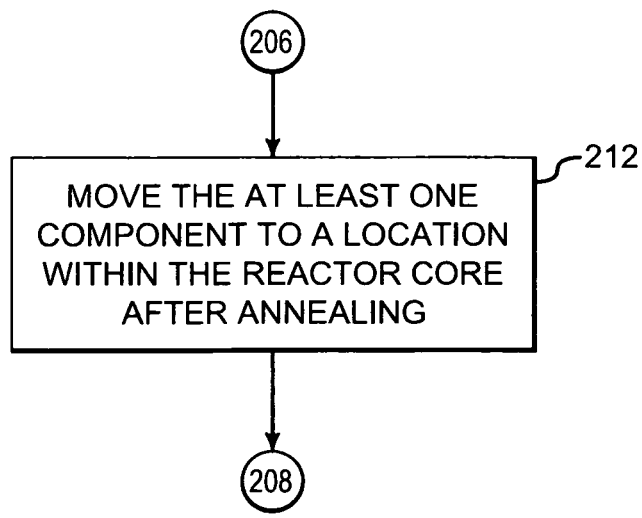

In some embodiments and referring now to FIG. 2C, the at least one component may be moved to a location within a reactor core of the nuclear fission reactor after annealing.

Figure 2D:
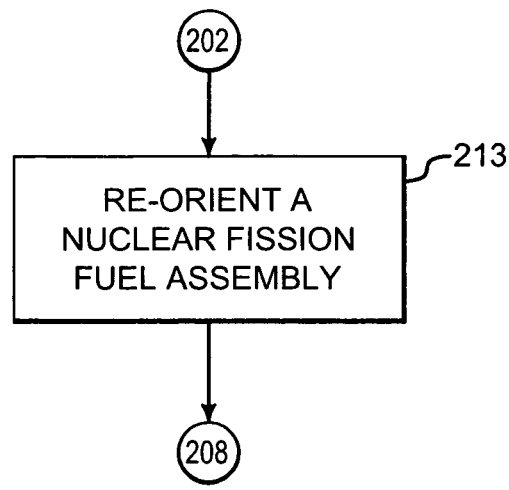
Figure 2E:
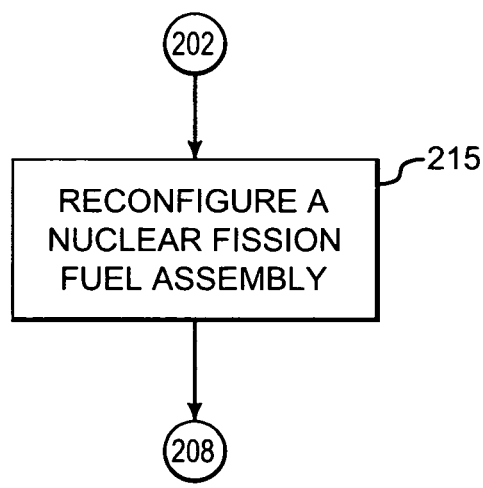

In some embodiments and referring to FIG. 2D, at a block 213 the at least one component may be re-oriented. In some other embodiments and referring to FIG. 2E, at a block 215 the at least one component may be reconfigured.

Figure 2F:
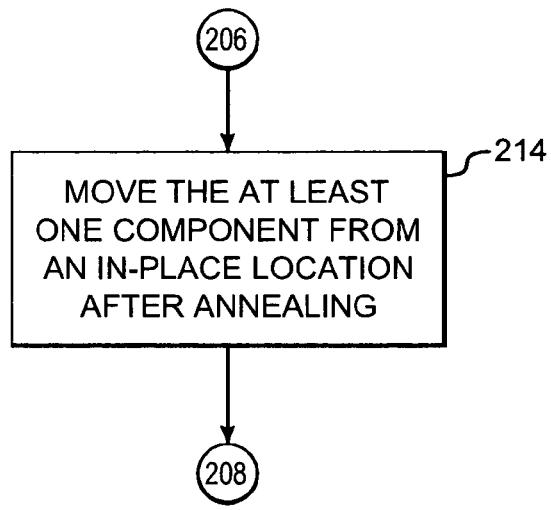

As another example and referring to FIG. 2F, at a block 214 the at least one component may be moved from an in-place location after annealing.

Annealing at least the portion of the at least one component of the reactor core within the annealing temperature range at the block 206 can be performed in various manners as desired for a particular application.

Figure 2G:
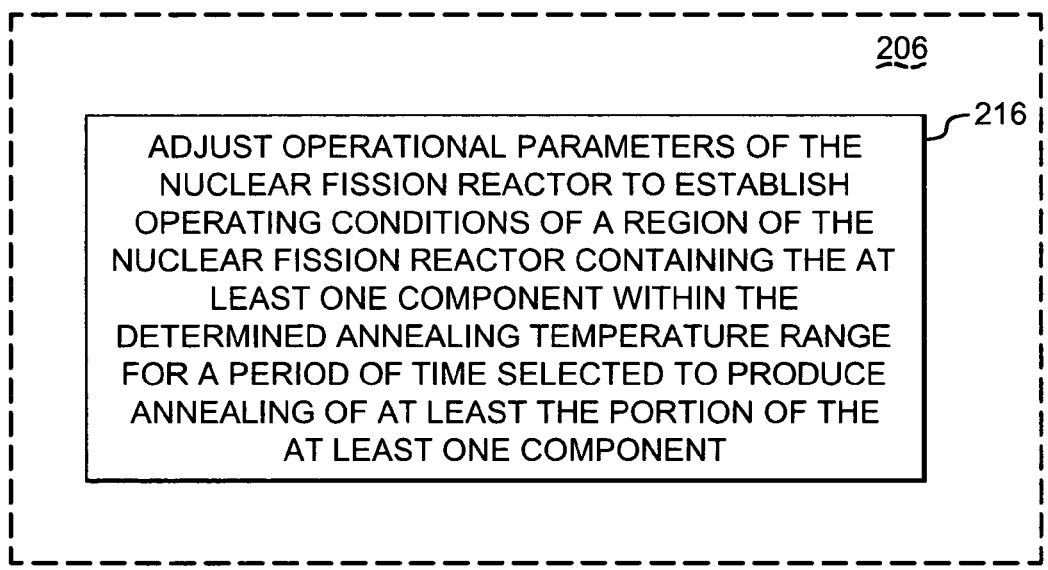

For example and referring to FIG. 2G, in some embodiments annealing at least the portion of the at least one component within the annealing temperature range at the block 206 can include adjusting operational parameters of the nuclear fission reactor to establish operating conditions of a region of the nuclear fission reactor containing the at least one component within the determined annealing temperature range for a period of time selected to produce annealing of the at least one metallic component at a block 216.

Figure 2H:
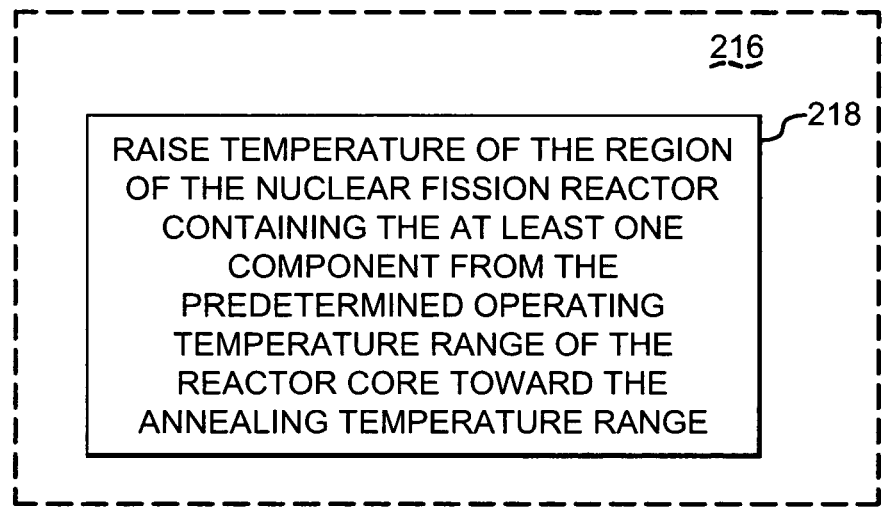
Figure 2I:
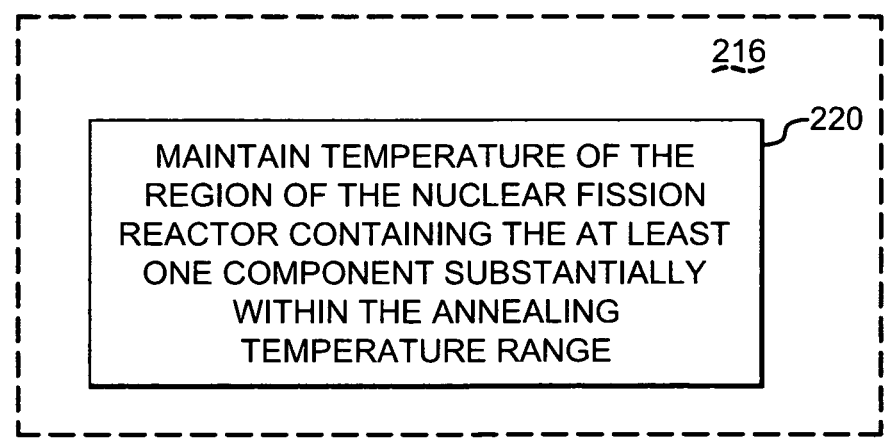

In some embodiments and referring to FIG. 2H, adjusting operational parameters at the block 216 can include raising temperature of the region of the nuclear fission reactor containing the at least one component from a predetermined operating temperature range of the reactor core toward the annealing temperature range at a block 218. Referring to FIG. 2I, adjusting operational parameters at the block 216 can include maintaining temperature of the region of the nuclear fission reactor containing the at least one component substantially within the annealing temperature range at a block 220.

Illustrative details regarding adjusting operational parameters to raise and/or maintain temperature and regarding selecting a period of time to produce annealing will be discussed below.

Figure 2J:
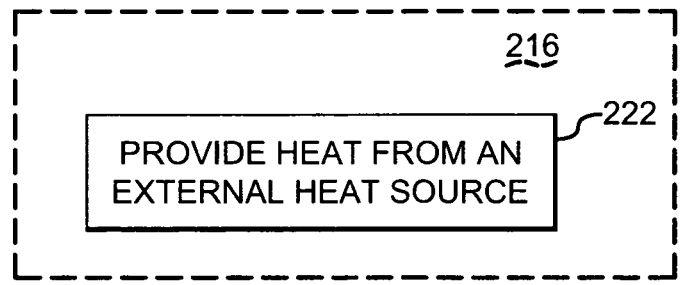

Referring now to FIG. 2J, adjusting operational parameters at the block 216 can include providing heat from an external heat source at a block 222. In some embodiments, the external heat source can include at least one electrical heat source.

In some other embodiments, the external heat source can include at least one source of residual heat. For example, the residual heat can include decay heat. In some other embodiments, the external heat source can include a heating fluid.

Figure 2K:
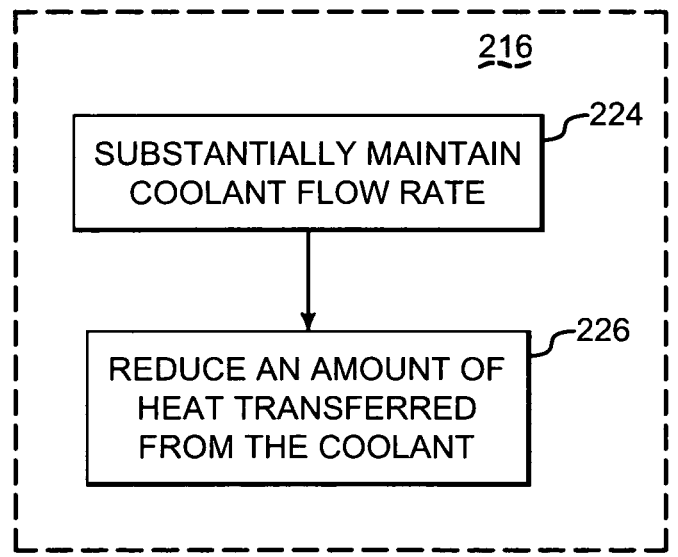
Figure 2L:
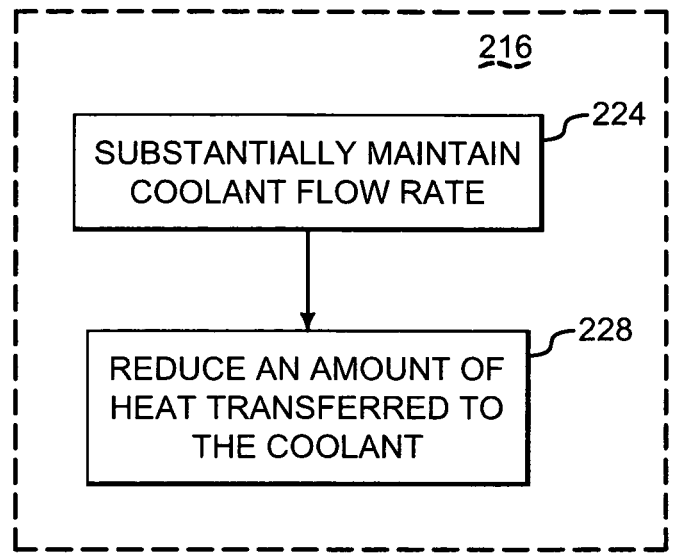

In some other embodiments and referring to FIG. 2K, adjusting operational parameters at the block 216 can include substantially maintaining coolant flow rate at a block 224 and reducing an amount of heat transferred from the coolant at a block 226. Similarly and referring to FIG. 2L, in some embodiments adjusting operational parameters at the block 216 can include substantially maintaining coolant flow rate at the block 224 and reducing an amount of heat transferred to the coolant at a block 228.

Figure 2M:
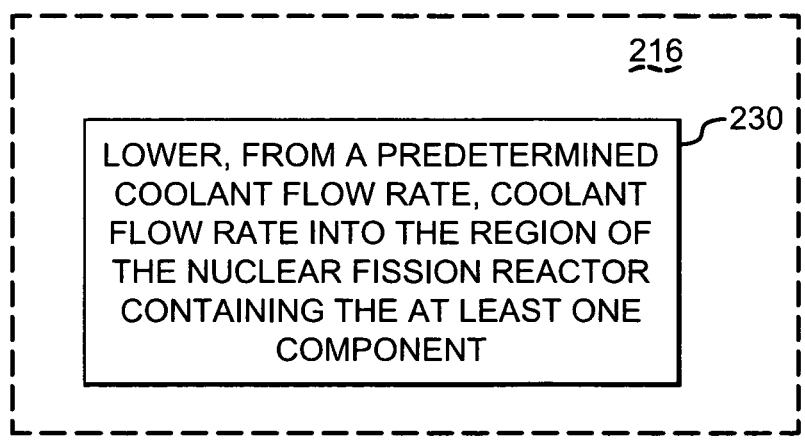

In other embodiments, referring to FIG. 2M adjusting operational parameters at the block 216 can include lowering, from a predetermined coolant flow rate, coolant flow rate into the region of the nuclear fission reactor containing the at least one component at a block 230.

Figure 2N:
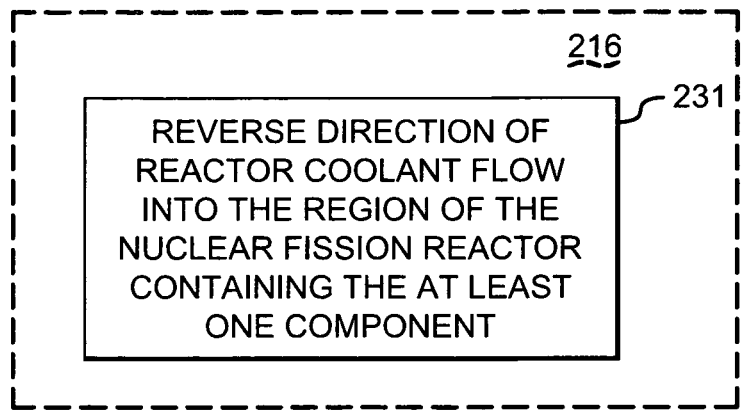

In other embodiments, referring to FIG. 2N adjusting operational parameters at the block 216 can include reversing direction of reactor coolant flow into the region of the nuclear fission reactor containing the at least one component at a block 231.

Figure 2O:
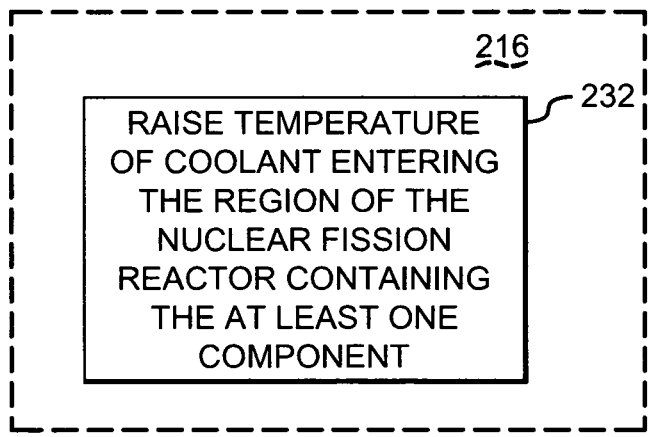
Figure 2P:
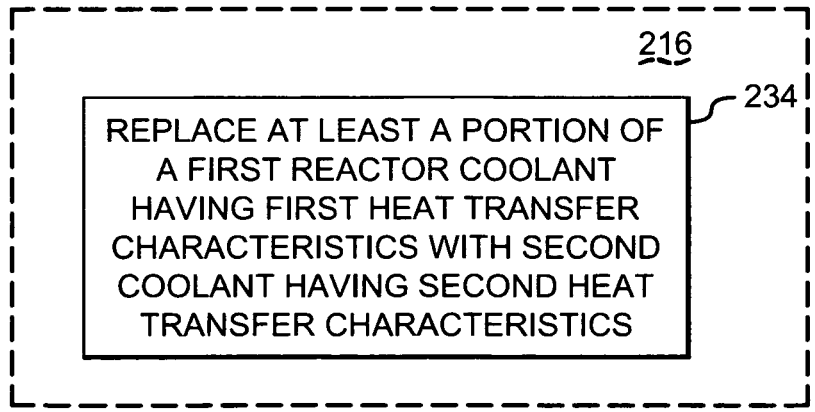

In other embodiments, referring to FIG. 2O adjusting operational parameters at the block 216 can include raising temperature of coolant entering the region of the nuclear fission reactor containing the at least one component at a block 232. In some embodiments, referring to FIG. 2P adjusting operational parameters at the block 216 can include replacing at least a portion of a first reactor coolant having first heat transfer characteristics with second coolant having second heat transfer characteristics at a block 234.

Figure 2Q:
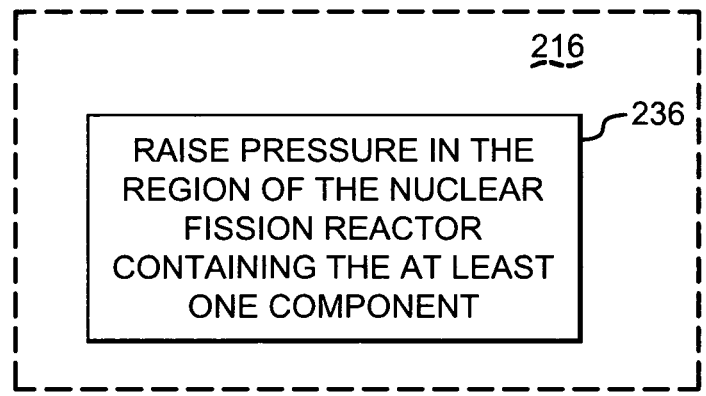
Figure 2R:
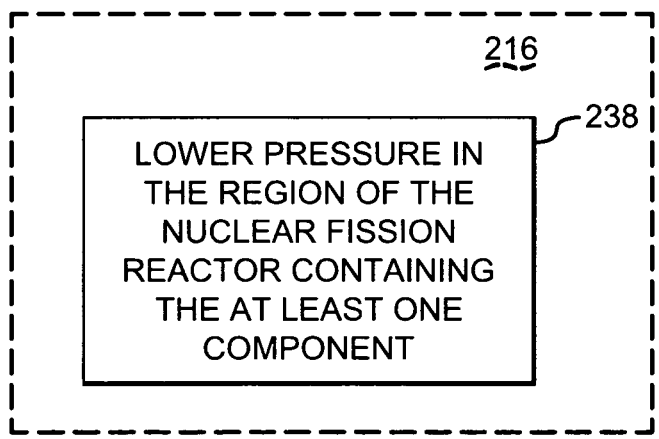

Referring now to FIG. 2Q, in some embodiments adjusting operational parameters at the block 216 can include raising pressure in the region of the nuclear fission reactor containing the at least one component at a block 236. Referring now to FIG. 2R, in some other embodiments adjusting operational parameters at the block 216 can include lowering pressure in the region of the nuclear fission reactor containing the at least one component.

Figure 2S:
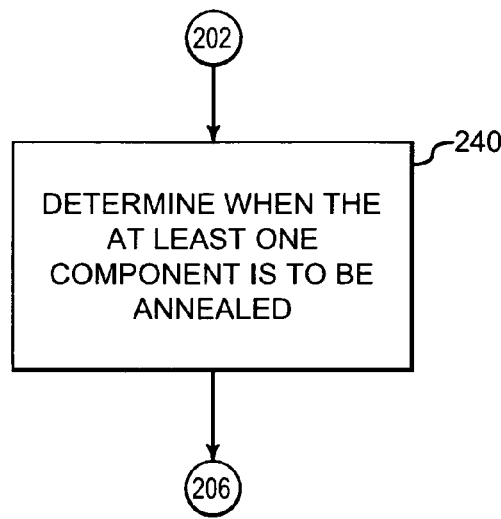

Referring now to FIG. 2S, a determination may be made at a block 240 regarding when the at least one component is to be annealed. The determination of when the at least one component is to be annealed may be made at the block 240 in a variety of manners, as desired for a particular application.

Figure 2T:
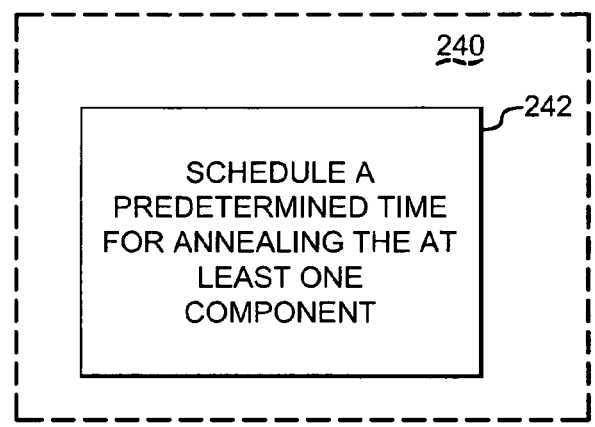

For example, in some embodiments and referring to FIG. 2T, determining when the at least one component is to be annealed at the block 240 can include scheduling a predetermined time for annealing the at least one component at a block 242. In some other embodiments, determining when the at least one component is to be annealed at the block 240 may be based upon history of the at least one component. For example, determining when the at least one component is to be annealed at the block 240 may be based upon an annealing history of the at least one component. As another example, determining when the at least one component is to be annealed at the block 240 may be based upon an operational history of the at least one component. Given by way of non-limiting example, the operational history of the nuclear fission fuel assembly may include temperature history and/or radiation exposure or the like.

Figure 2U:
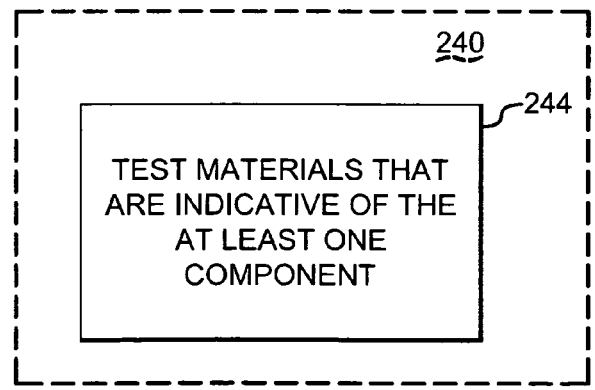
Figure 2V:
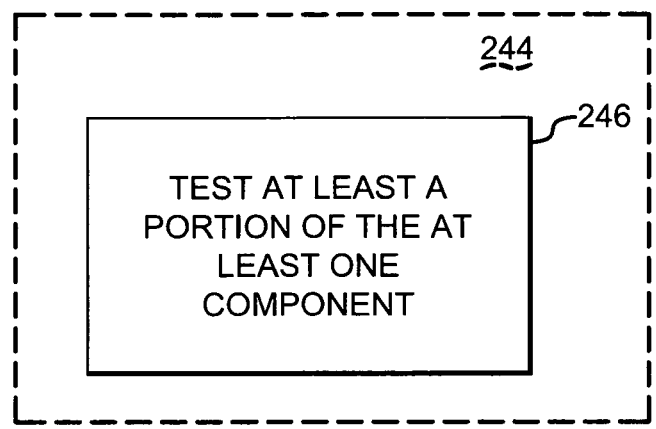
Figure 2W:
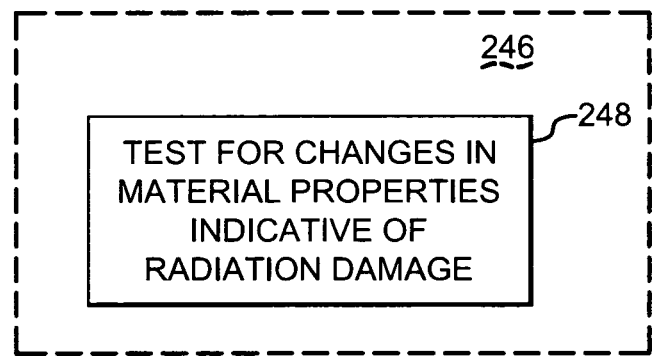

In some other embodiments and referring now to FIG. 2U, determining when the at least one component is to be annealed at the block 240 may include testing materials that are indicative of the at least one component at a block 244. In some embodiments and referring to FIG. 2V, testing materials that are indicative of the at least one component at the block 244 can include testing at least a portion of the at least one component at a block 246. Given by way of non-limiting example, referring to FIG. 2W testing materials that are indicative of the at least one component at the block 246 may include testing for changes in material properties indicative of radiation damage at a block 248. For example, some illustrative material properties indicative of radiation damage may include electrical resistivity, physical dimensions, displacement response to physical stress, response to stimulus, speed of sound within material, ductile-to-brittle transition temperature, and/or radiation emission.

Figure 2X:
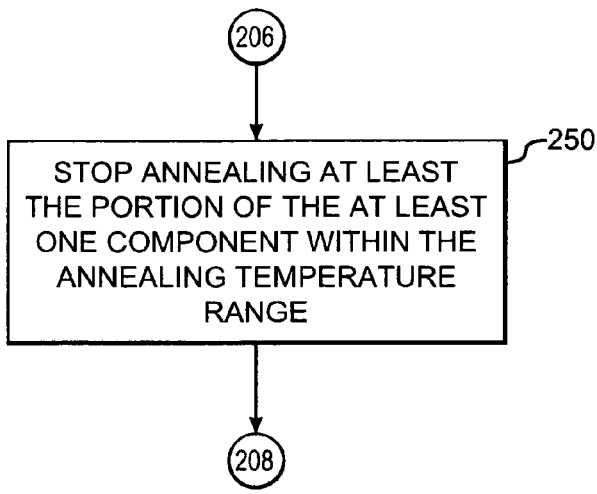

In some embodiments and referring to FIG. 2X, annealing at least the portion of the at least one component within the annealing temperature range is stopped at a block 250. A determination of when to stop annealing at least the portion of the at least one component within the annealing temperature range at the block 250 may be made in any manner as desired for a particular application. For example, in some embodiments annealing may be stopped at the block 250 after a predetermined time period. Given by way of non-limiting example, the predetermined time period may be a function of temperature. In some other embodiments, the predetermined time period may be a function of changes in material properties indicative of radiation damage. In some embodiments the predetermined time period may be a function of radiation exposure.

Figure 2Y:
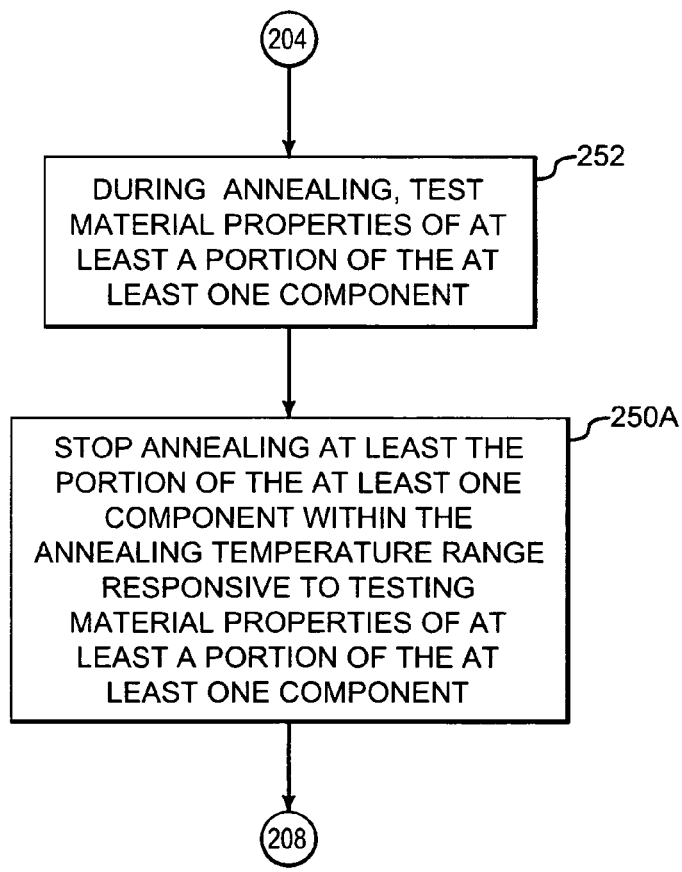

Referring now to FIG. 2Y, in some embodiments material properties of at least a portion of the at least one component may be tested at a block 252 during annealing at the block 206. In such an arrangement, annealing at the block 206 is stopped at a block 250A responsive to testing material properties of at least a portion of the at least one component.

Figure 2Z:
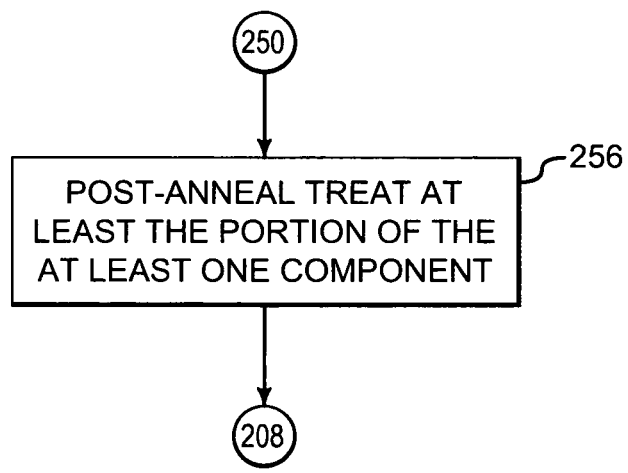
Figure 2A:
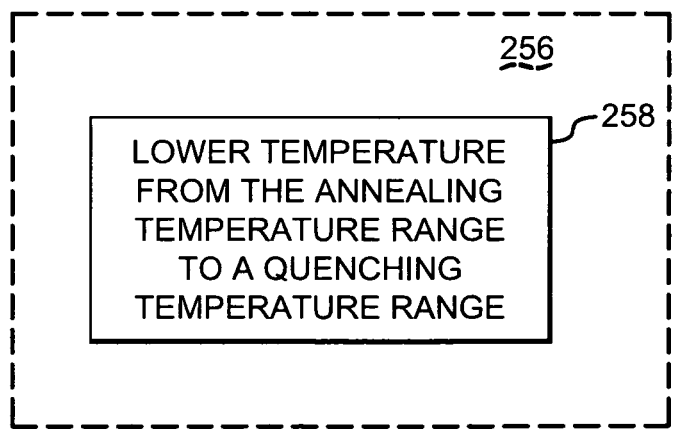
Figure 2A:
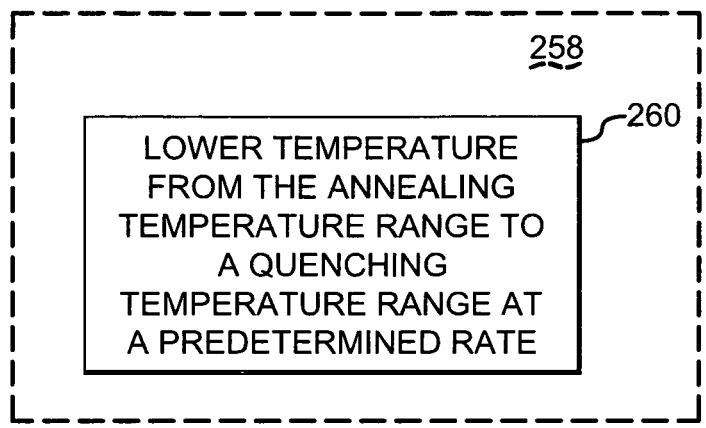
Figure 2A:
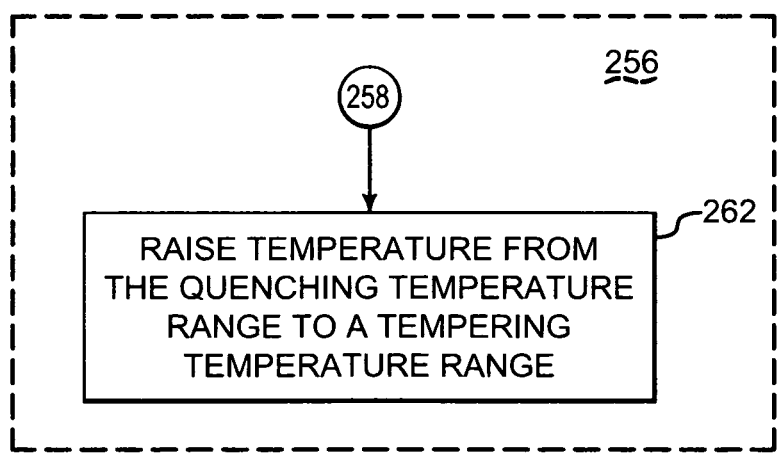
Figure 2A:
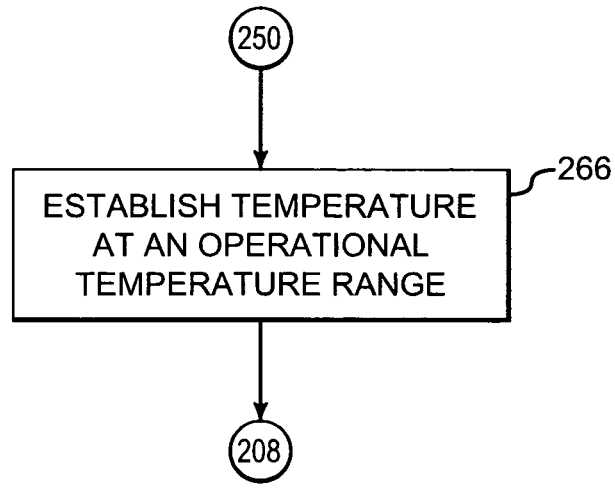
Figure 2A:
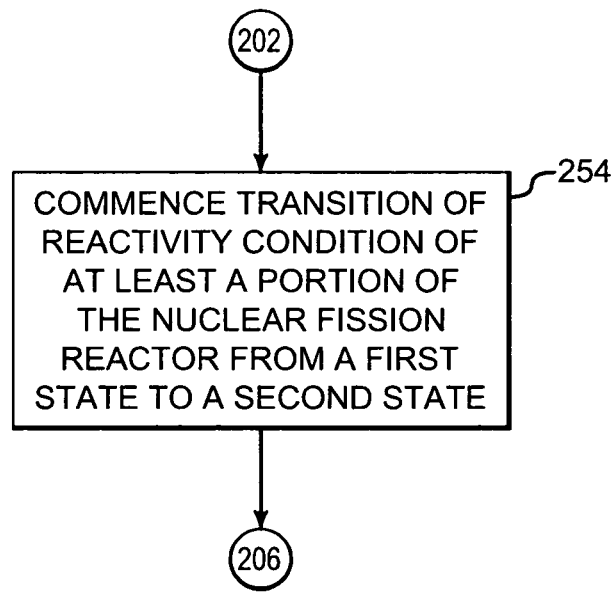

After annealing has been stopped at the block 250, it may be desirable in some embodiments to further treat that which has been annealed. To that end and referring now to FIG. 2Z, in some embodiments at a block 256 at least the portion of the at least one component can be treated with post-annealing treatment. In some embodiments, post-annealing treatment can include quenching. To that end and referring to FIG. 2AA, in some embodiments post-anneal treating at least the portion of the at least one component at the block 256 can include lowering temperature from the annealing temperature range to a quenching temperature range at a block 258. Referring to FIG. 2AB, in some embodiments lowering temperature to a quenching temperature range at the block 258 can include lowering temperature at a predetermined rate at a block 260. In some other embodiments, post-anneal treating can also include tempering after quenching. To that end and referring to FIG. 2AC, in some embodiments post-anneal treating at least the portion of the at least one component at the block 256 can also include raising temperature from the quenching temperature range to a tempering temperature range at a block 262.

Referring now to FIG. 2AD, in some embodiments after annealing has stopped at the block 250 temperature may be established at an operational temperature range at a block 266, if desired.

Referring now to FIG. 2AE, in some embodiments annealing at the block 206 can be performed after commencement of transition of reactivity condition of at least a portion of the nuclear fission reactor from a first state to a second state at a block 254. Given by way of non-limiting example, the first state can include power range operation and the second state can include a shut-down state.

It will be appreciated that any number of components and any number of fuel assemblies and their components may be annealed, as desired for a particular application. For example, in some embodiments fewer than all nuclear fission fuel assemblies of a reactor core of the nuclear fission reactor can be annealed. In some other embodiments, substantially all nuclear fission fuel assemblies of a reactor core of the nuclear fission reactor can be annealed, as desired.

Referring now to FIG. 3A, the illustrative method 300 for treating at least a portion of at least one component of a reactor core of a nuclear fission reactor begins at a block 302. At a block 304 a temperature of a region of a reactor core of a nuclear fission reactor is elevated, from a predetermined operating temperature range to an annealing temperature range, for a time period sufficient to produce annealing of at least a portion of at least one selected component of the region of the reactor core without removing the at least one selected component from the reactor core. The method 300 stops at a block 306. Illustrative aspects will be described briefly below.

While the method 100 (FIG. 1A) discloses annealing at least a portion of at least one metallic component of a nuclear fission fuel assembly of a nuclear fission reactor, the method 300 discloses annealing at least a portion of any component or components of a reactor core of a nuclear fission reactor. Thus, similar to the method 200 (FIG. 2A), the method 300 can be used for annealing at least a portion of one or more reactor core components such as without limitation a nuclear fission fuel assembly, a reactor core cooling component, and/or a reactor core structural member, non-limiting examples of which are discussed above. In some arrangements, the method 300 can be used to anneal at least a portion of one or more components of a nuclear fission fuel assembly, such as without limitation cladding, a cooling component, a structural member, a thermally conductive member, and/or nuclear fission fuel material, non-limiting examples of which are discussed above.

Moreover (and also similar to the method 200 (FIG. 2A)), the method 300 can be performed on any component or components of a reactor core—regardless of whether the component is metallic or not. Thus, annealing as disclosed by the method 300 can permit use in reactor cores of advanced materials, such as composite materials like SiC/SiC or the like. However, it will be appreciated that the method 300 may also be used for a one or more reactor core components that are made of metals—such as without limitation steel, oxide dispersion strengthened (ODS) steels, austenitic steels (304, 316), ferritic/martensitic steels refractory metal, a refractory metal alloy, a non-ferrous metal, a non-ferrous metal alloy, and/or a superalloy (such as Inconels, Zircaloys, and/or Hastelloys).

Further, while the annealing temperature range for the method 100 (FIG. 1A) need not be higher than an operating temperature range, it will be noted that at the block 304 temperature of a region of a reactor core of a nuclear fission reactor is elevated from a predetermined operating temperature range to an annealing temperature range.

Lastly, while annealing performed by either the method 100 (FIG. 1A) or the method 200 (FIG. 2A) need not occur within a reactor core, it will also be noted that the method 300 can produce annealing of at least a portion of at least one selected component of the region of the reactor core without removing the at least one selected component from the reactor core.

With the exception of the differences noted directly above, other aspects of the method 300 are similar to aspects of the method 100 (FIG. 1A). To that end and for sake of brevity, aspects of the method 300 will be described briefly.

As noted above, at the block 304 temperature of a region of a reactor core of a nuclear fission reactor is elevated from a predetermined operating temperature range to an annealing temperature range. The discussion of optional arrangements of the method 100 (FIG. 1A) in which annealing temperature range is higher than a predetermined operating temperature range is applicable to the method 300. Thus, details of the annealing temperature range being higher than the operating temperature range need not be repeated for an understanding. However, aspects of the method 300 will be noted below for completeness.

For example, in some embodiments, the annealing temperature range may be determined based upon any one or more factors such as radiation exposure of the at least one component, an operating temperature history during which the radiation occurred, and/or an annealing history of the component to be annealed. In some other embodiments, the annealing temperature range may be determined based upon material properties of the at least one selected component. For example, in some embodiments a minimum temperature of the annealing temperature range may be at least around thirty percent of a melting point of the at least one selected component. As another example, in some other embodiments, an annealing temperature within the annealing temperature range may be around forty percent of a melting point of the at least one selected component. In some embodiments, a maximum temperature of the annealing temperature range may be selected as desired to provide a predetermined safety margin below a melting point of at least one selected component. In some other embodiments, a maximum temperature of the annealing temperature range may be selected as desired to provide a predetermined safety margin below structural degradation of at least one selected component.

Figure 3B:
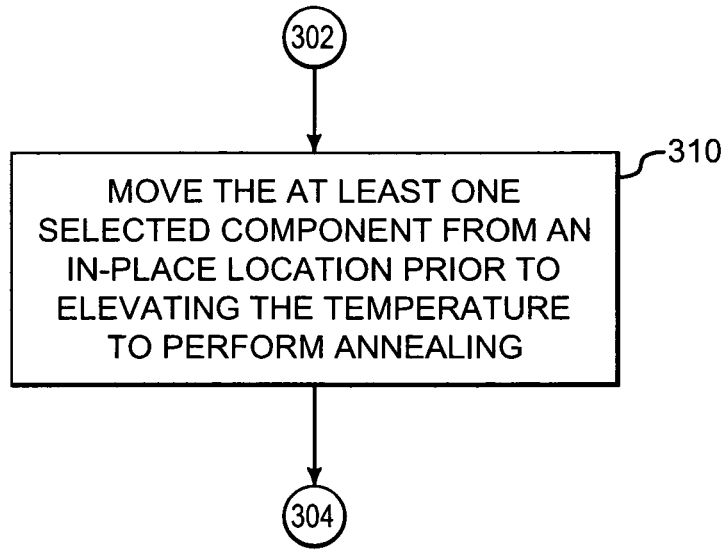

Elevating the temperature to perform annealing at the block 304 can be performed in various locations of a reactor core, as desired. For example, in some embodiments elevating the temperature to perform annealing of at least the portion of the at least one selected component can be performed in-place. However, the at least one selected component need not be annealed in-place. For example and referring now to FIG. 3B, in some other embodiments the at least one selected component to be annealed may be moved at a block 310 from an in-place location prior to elevating the temperature to perform annealing at the block 304. It will be noted that, as discussed above, elevating the temperature to perform annealing is performed within a reactor core of the nuclear fission reactor. Thus, in some arrangements, the at least one selected component may be moved from its in-place location to another location within the reactor core where the annealing is to take place.

Figure 3C:
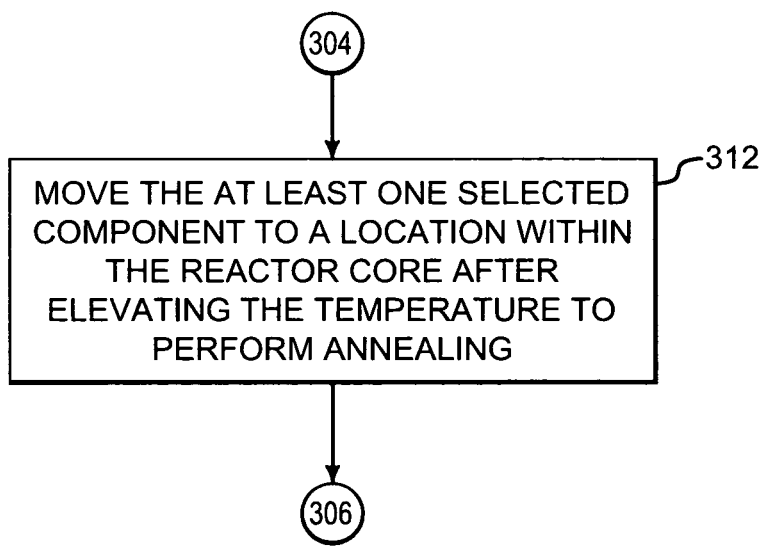

In some embodiments and referring now to FIG. 3C, the at least one selected component may be moved to a location within a reactor core of the nuclear fission reactor after elevating the temperature to perform annealing.

Figure 3D:
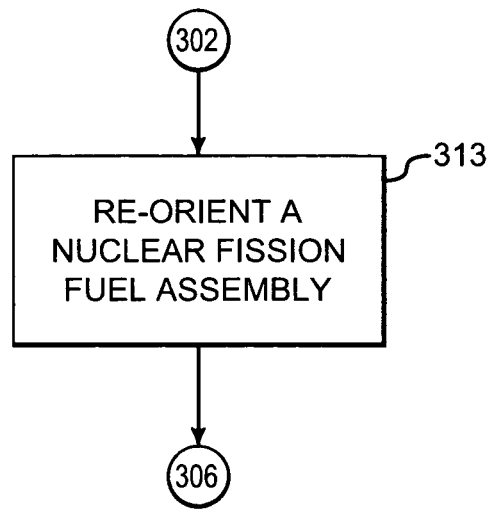
Figure 3E:
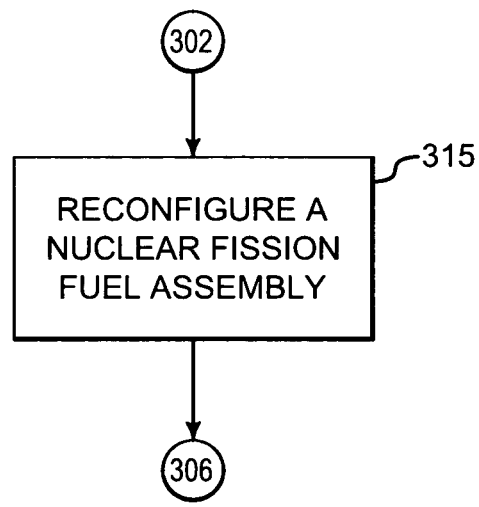

In some embodiments and referring to FIG. 3D, at a block 313 the at least one selected component may be re-oriented annealing. In some other embodiments and referring to FIG. 3E, at a block 315 the at least one selected component may be reconfigured.

Figure 3F:
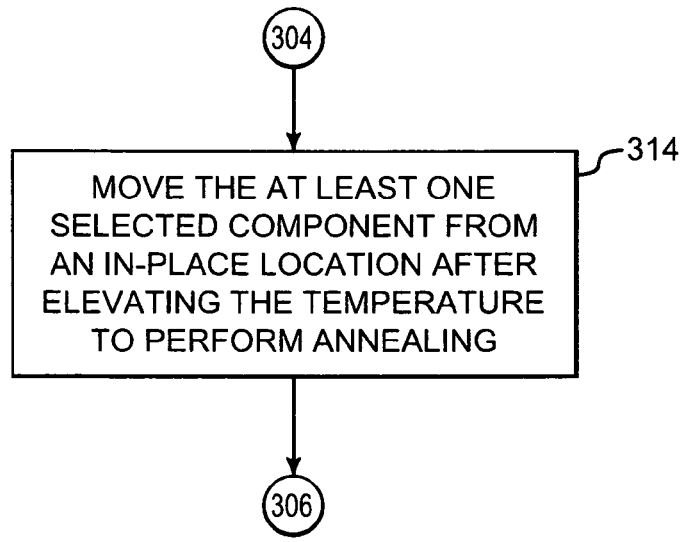

As another example and referring to FIG. 3F, at a block 314 the at least one selected component may be moved from an in-place location after elevating the temperature to perform annealing.

Elevating the temperature to perform annealing at the block 304 can be performed in various manners as desired for a particular application.

Figure 3G:
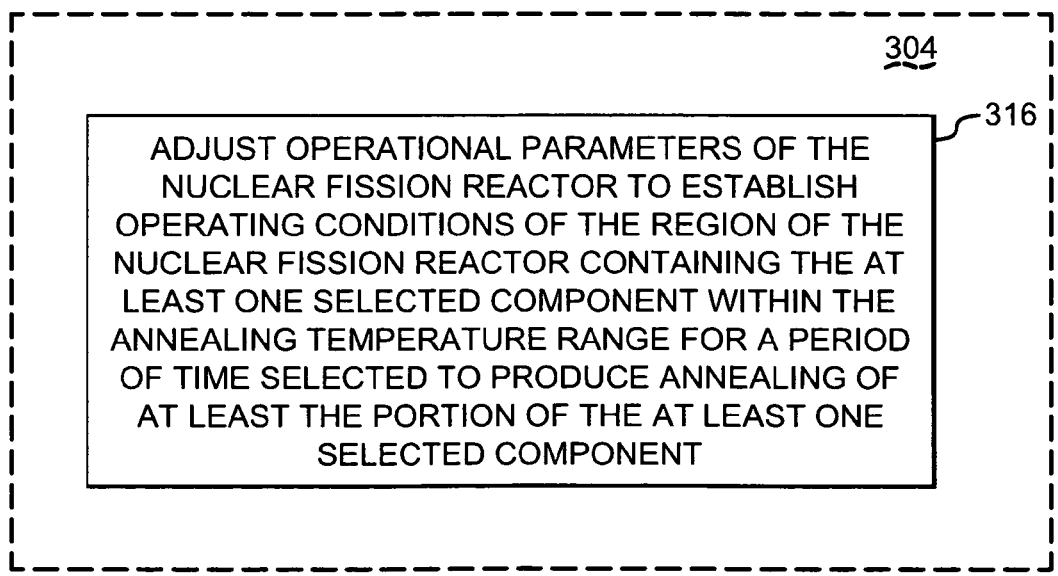

For example and referring to FIG. 3G, in some embodiments elevating the temperature to perform annealing at the block 304 can include adjusting operational parameters of the nuclear fission reactor to establish operating conditions of the region of the nuclear fission reactor containing the at least one selected component within the annealing temperature range for a period of time selected to produce annealing of at least the portion of the at least one metallic component at a block 316.

Figure 3H:
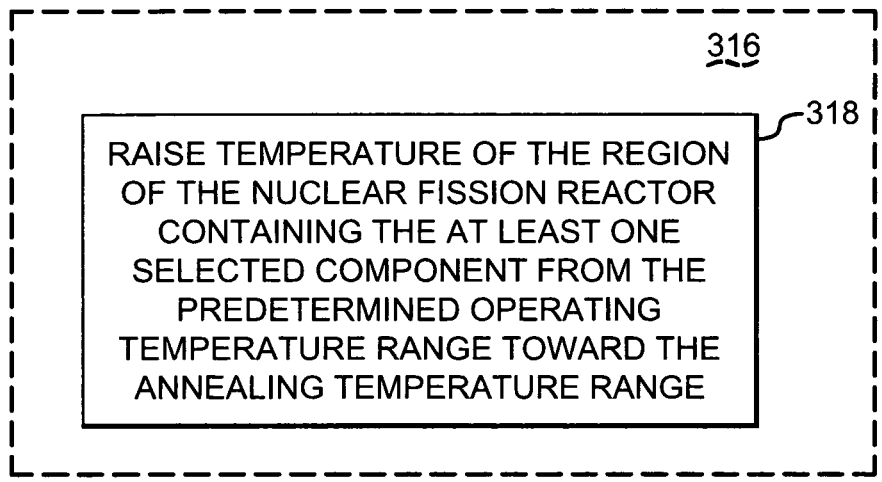
Figure 3I:
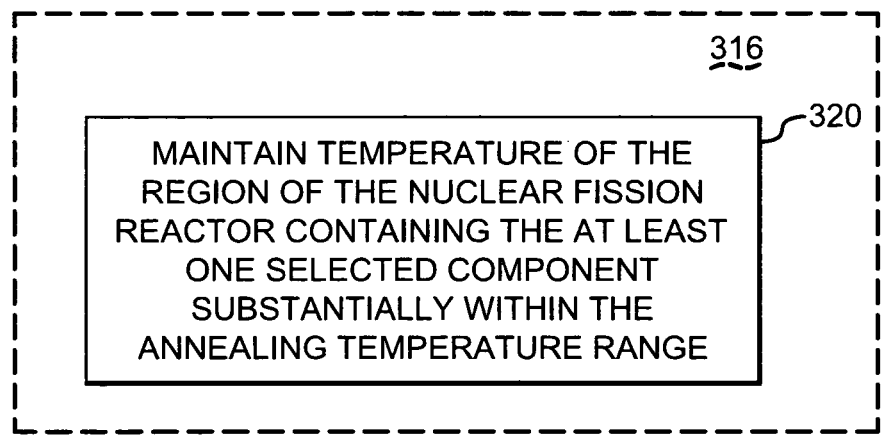

In some embodiments and referring to FIG. 3H, adjusting operational parameters at the block 316 can include raising (that is, changing) temperature of the region of the nuclear fission reactor containing the at least one selected component from a predetermined operating temperature range of the reactor core toward the annealing temperature range at a block 318. Referring to FIG. 3I, adjusting operational parameters at the block 316 can include maintaining temperature of the region of the nuclear fission reactor containing the at least one selected component substantially within the annealing temperature range at a block 320.

Illustrative details regarding adjusting operational parameters to raise and/or maintain temperature and regarding selecting a period of time to produce annealing will be discussed below.

Figure 3J:
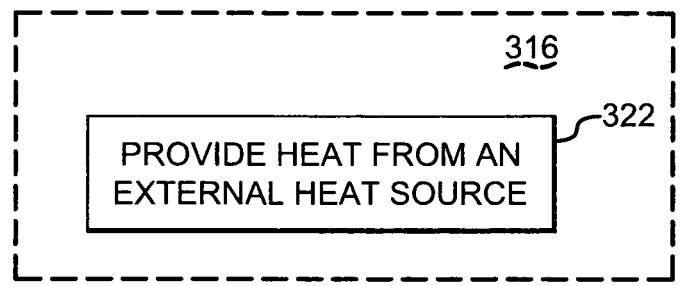

Referring now to FIG. 3J, adjusting operational parameters at the block 316 can include providing heat from an external heat source at a block 322. In some embodiments, the external heat source can include at least one electrical heat source.

In some other embodiments, the external heat source can include at least one source of residual heat. For example, the residual heat can include decay heat. In some other embodiments, the external heat source can include a heating fluid.

Figure 3K:
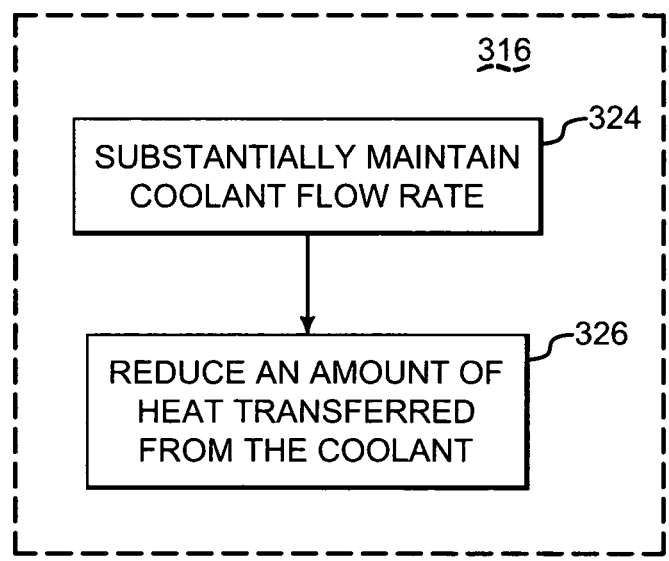
Figure 3L:
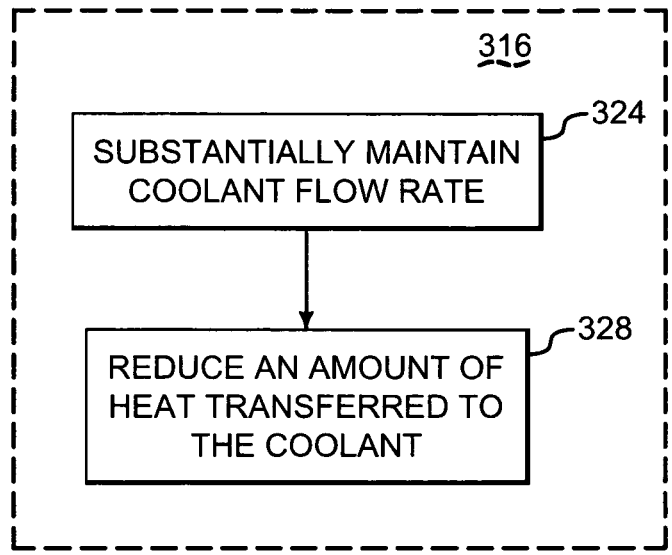

In some other embodiments and referring to FIG. 3K, adjusting operational parameters at the block 316 can include substantially maintaining coolant flow rate at a block 324 and reducing an amount of heat transferred from the coolant at a block 326. Similarly and referring to FIG. 3L, in some embodiments adjusting operational parameters at the block 316 can include substantially maintaining coolant flow rate at the block 324 and reducing an amount of heat transferred to the coolant at a block 328.

Figure 3M:
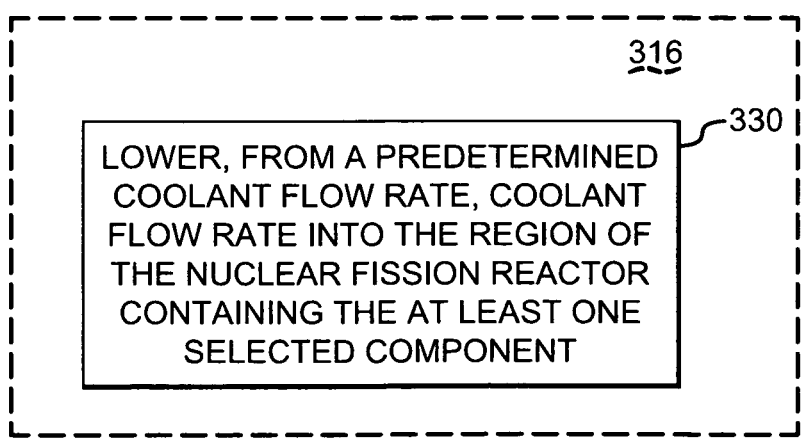

In other embodiments, referring to FIG. 3M adjusting operational parameters at the block 316 can include lowering, from a predetermined coolant flow rate, coolant flow rate into the region of the nuclear fission reactor containing the at least one selected component at a block 330.

Figure 3N:
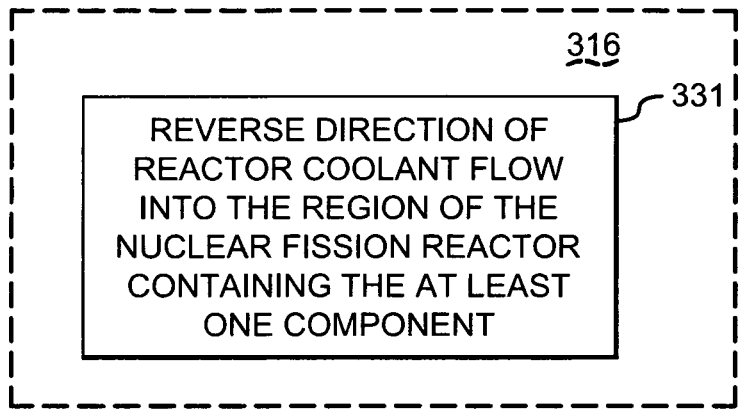

In other embodiments, referring to FIG. 3N adjusting operational parameters at the block 316 can include reversing direction of reactor coolant flow into the region of the nuclear fission reactor containing the at least one selected component at a block 331.

Figure 3O:
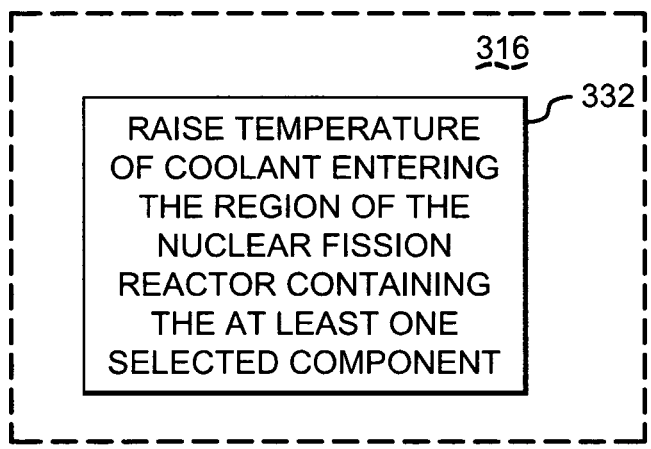
Figure 3P:
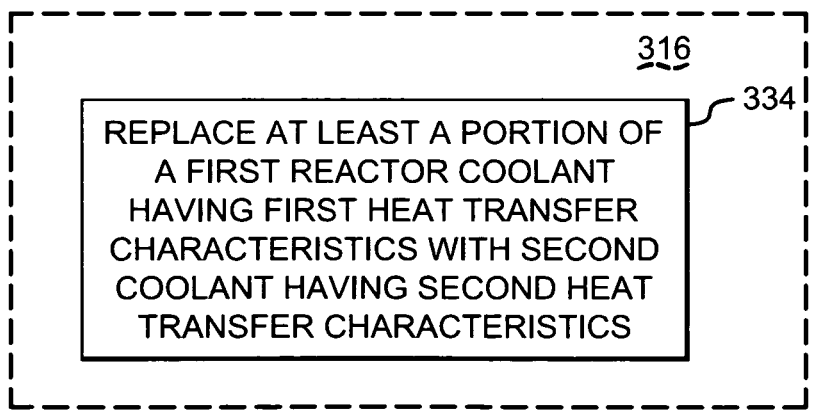

In other embodiments, referring to FIG. 3O adjusting operational parameters at the block 316 can include raising temperature of coolant entering the region of the nuclear fission reactor containing the at least one selected component at a block 332. In some embodiments, referring to FIG. 3P adjusting operational parameters at the block 316 can include replacing at least a portion of a first reactor coolant having first heat transfer characteristics with second coolant having second heat transfer characteristics at a block 334.

Figure 3Q:
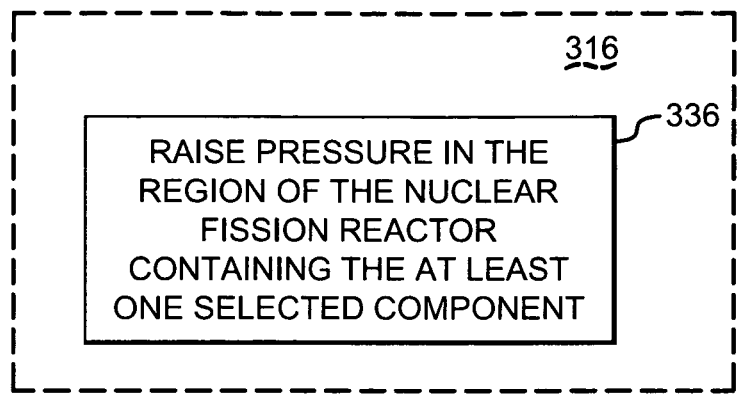
Figure 3R:
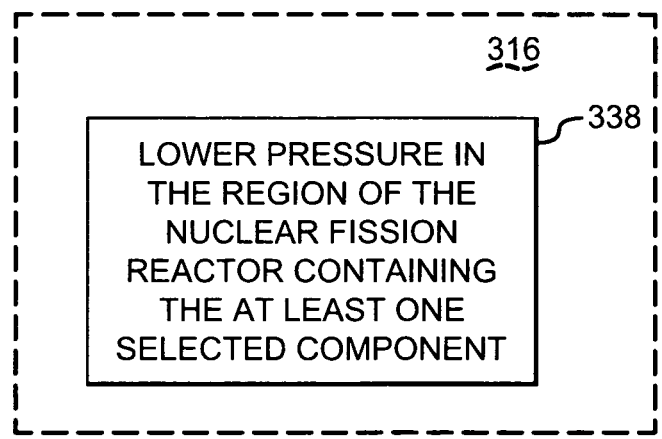

Referring now to FIG. 3Q, in some embodiments adjusting operational parameters at the block 316 can include raising pressure in the region of the nuclear fission reactor containing the at least one selected component at a block 336. Referring now to FIG. 3R, in some other embodiments adjusting operational parameters at the block 316 can include lowering pressure in the region of the nuclear fission reactor containing the at least one selected component.

Figure 3S:
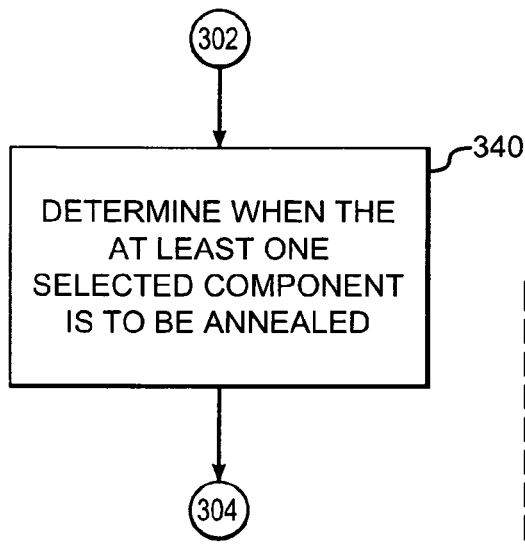

Referring now to FIG. 3S, a determination may be made at a block 340 regarding when the at least one selected component is to be annealed. The determination of when the at least one selected component is to be annealed may be made at the block 340 in a variety of manners, as desired for a particular application.

Figure 3T:
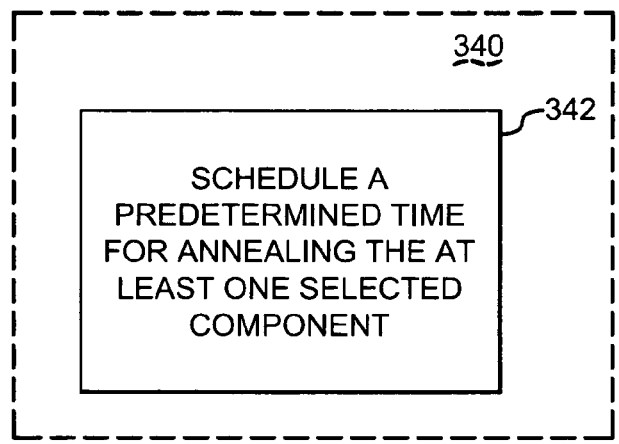

For example, in some embodiments and referring to FIG. 3T, determining when the at least one component is to be annealed at the block 340 can include scheduling a predetermined time for annealing the at least one selected component at a block 342. In some other embodiments, determining when the at least one selected component is to be annealed at the block 340 may be based upon history of the at least one selected component. For example, determining when the at least one selected component is to be annealed at the block 340 may be based upon an annealing history of the at least one selected component. As another example, determining when the at least one selected component is to be annealed at the block 340 may be based upon an operational history of the at least one selected component. Given by way of non-limiting example, the operational history of the nuclear fission fuel assembly may include temperature history and/or radiation exposure or the like.

Figure 3U:
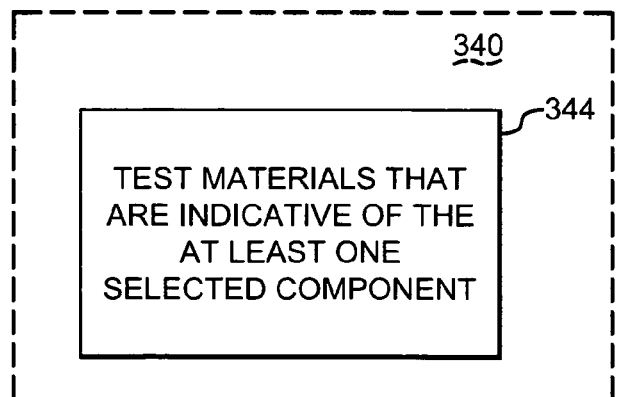
Figure 3V:
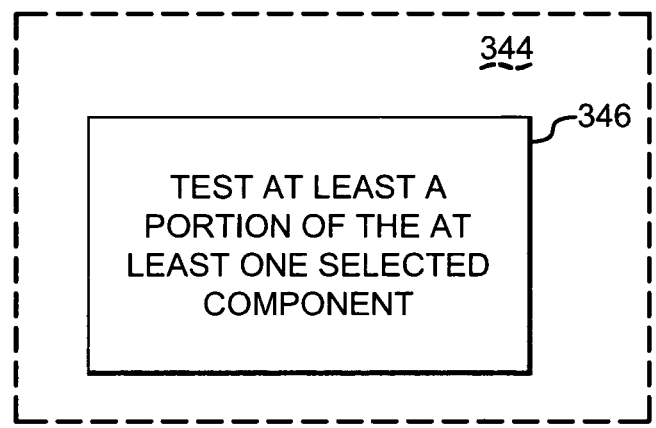
Figure 3W:
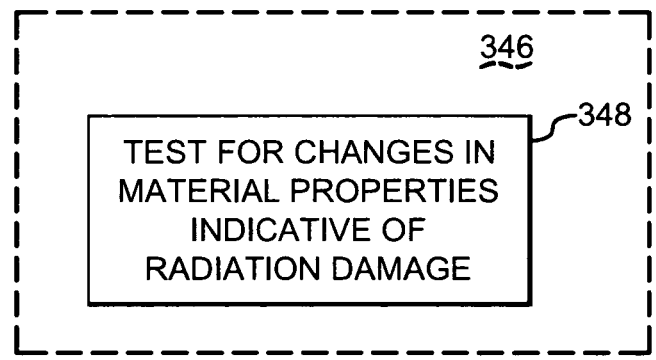

In some other embodiments and referring now to FIG. 3U, determining when the at least one selected component is to be annealed at the block 340 may include testing materials that are indicative of the at least one selected component at a block 344. In some embodiments and referring to FIG. 3V, testing materials that are indicative of the at least one selected component at the block 344 can include testing at least a portion of the at least one selected component at a block 346. Given by way of non-limiting example, referring to FIG. 3W testing materials that are indicative of the at least one selected component at the block 346 may include testing for changes in material properties indicative of radiation damage at a block 348. For example, some illustrative material properties indicative of radiation damage may include electrical resistivity, physical dimensions, displacement response to physical stress, response to stimulus, speed of sound within material, ductile-to-brittle transition temperature, and/or radiation emission.

Figure 3X:
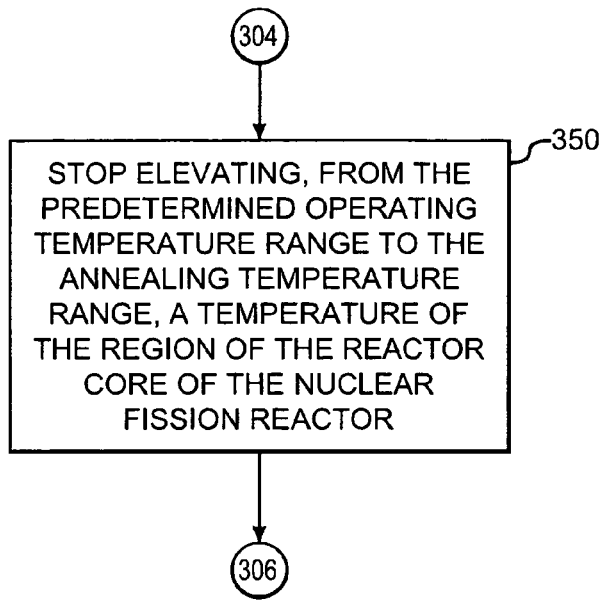

In some embodiments and referring to FIG. 3X, elevating the temperature to perform annealing is stopped at a block 350. A determination of when to stop elevating the temperature to perform annealing at the block 350 may be made in any manner as desired for a particular application. For example, in some embodiments elevating the temperature to perform annealing may be stopped at the block 350 after a predetermined time period. Given by way of non-limiting example, the predetermined time period may be a function of temperature. In some other embodiments, the predetermined time period may be a function of changes in material properties indicative of radiation damage. In some embodiments the predetermined time period may be a function of radiation exposure.

Figure 3Y:
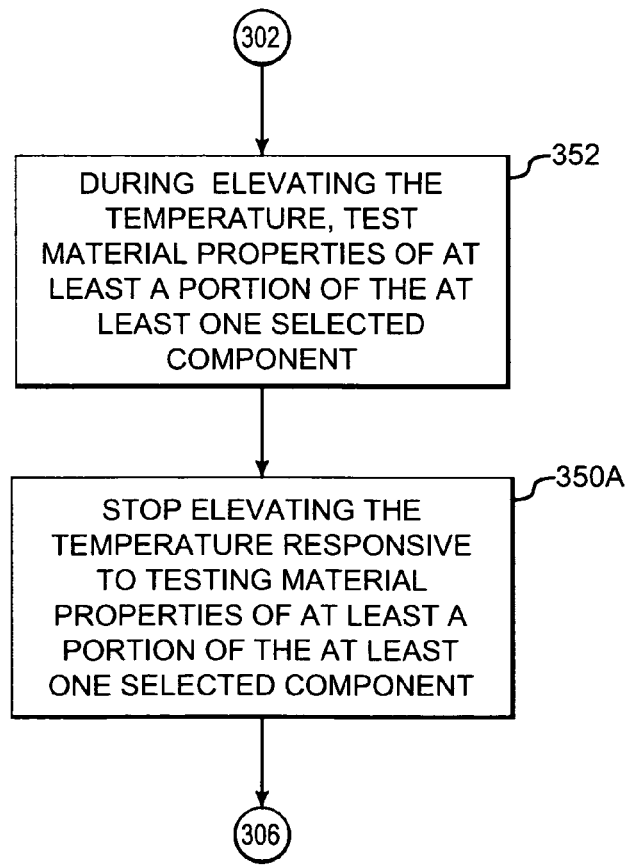

Referring now to FIG. 3Y, in some embodiments material properties of at least a portion of the at least one selected component may be tested at a block 352 during elevating the temperature to perform annealing at the block 304. In such an arrangement, elevating the temperature to perform annealing at the block 304 is stopped at a block 350A responsive to testing material properties of at least a portion of the at least one selected component.

Figure 3Z:
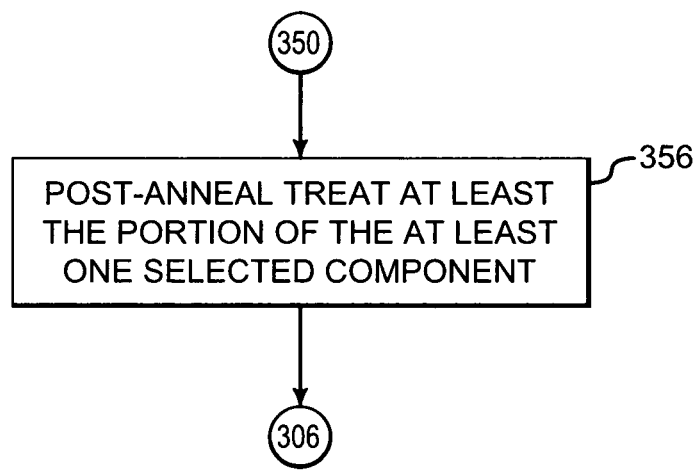
Figure 3A:
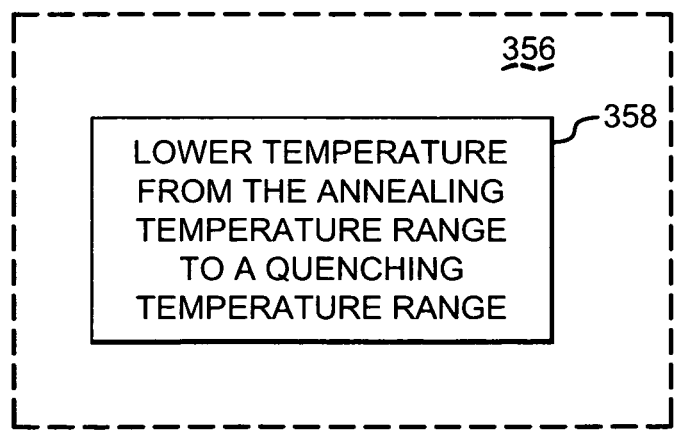
Figure 3A:
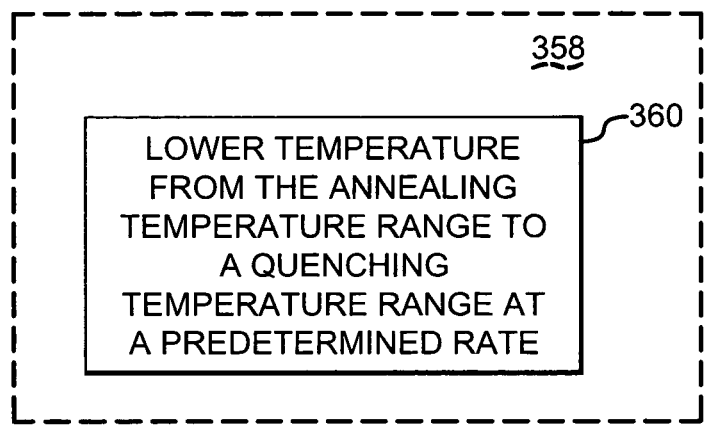
Figure 3A:
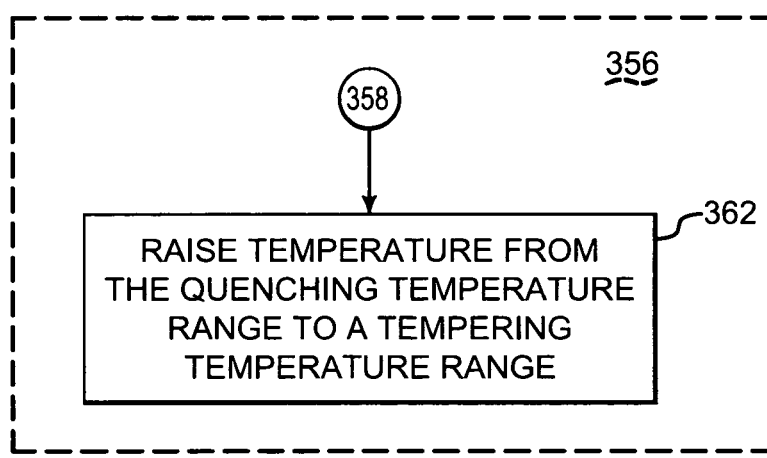
Figure 3A:
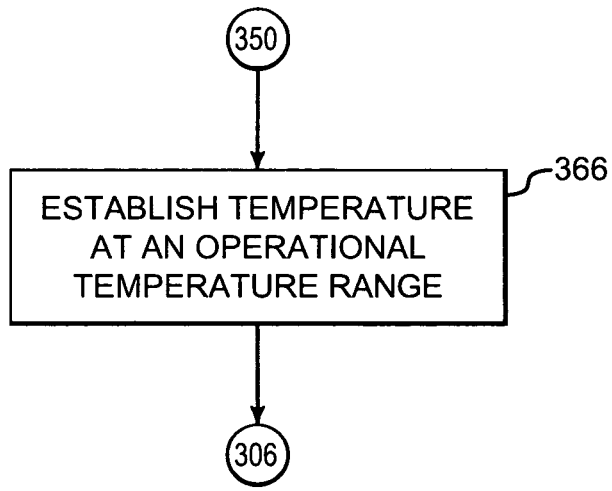
Figure 3A:
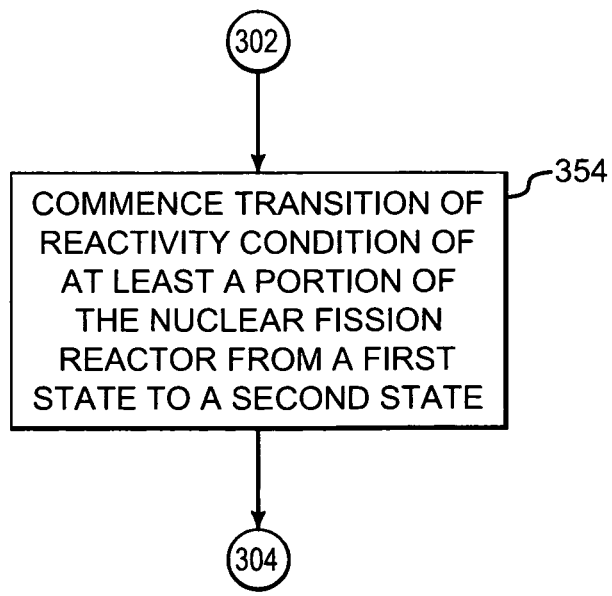

After annealing has been stopped at the block 350, it may be desirable in some embodiments to further treat that which has been annealed. To that end and referring now to FIG. 3Z, in some embodiments at a block 356 at least the portion of the at least one selected component can be treated with post-annealing treatment. In some embodiments, post-annealing treatment can include quenching. To that end and referring to FIG. 3AA, in some embodiments post-anneal treating at least the portion of the at least one selected component at the block 356 can include lowering temperature from the annealing temperature range to a quenching temperature range at a block 358. Referring to FIG. 3AB, in some embodiments lowering temperature to a quenching temperature range at the block 358 can include lowering temperature at a predetermined rate at a block 360. In some other embodiments, post-annealing treatment can also include tempering after quenching. To that end and referring to FIG. 3AC, in some embodiments post-anneal treating at least the portion of the at least one selected component at the block 356 can also include raising temperature from the quenching temperature range to a tempering temperature range at a block 362.

Referring now to FIG. 3AD, in some embodiments after annealing has stopped at the block 350 temperature may be established at an operational temperature range at a block 366, if desired.

Referring now to FIG. 3AE, in some embodiments elevating the temperature to perform annealing at the block 304 can be performed after commencement of transition of reactivity condition of at least a portion of the nuclear fission reactor from a first state to a second state at a block 354. Given by way of non-limiting example, the first state can include power range operation and the second state can include a shut-down state.

It will be appreciated that any number of components and any number of fuel assemblies and their components may be annealed, as desired for a particular application. For example, in some embodiments fewer than all nuclear fission fuel assemblies of a reactor core of the nuclear fission reactor can be annealed. In some other embodiments, substantially all nuclear fission fuel assemblies of a reactor core of the nuclear fission reactor can be annealed, as desired.

Referring now to FIG. 4A, the illustrative method 400 for producing an annealing effect begins at a block 402. At a block 404 a reactor coolant system is adjusted to produce a temperature deviation from a nominal operating temperature range. At a block 406 the temperature deviation from the nominal operating temperature is maintained for a period selected to produce a selected annealing effect. At a block 408, after the period selected to produce the selected annealing effect, the reactor coolant system is adjusted to return to the nominal operating temperature range. The method 400 stops at a block 410. Illustrative details will be set forth below.

In some embodiments, the selected annealing effect can anneal at least a portion of at least one reactor core component such as at least one nuclear fission fuel assembly, reactor core cooling component, and/or reactor core structural member. When at least one nuclear fission fuel assembly is annealed, the annealed component can include cladding, a cooling component, a structural member, a thermally conductive member, and/or nuclear fission fuel material.

In some embodiments, the selected annealing effect can include a predicted annealing effect. That is, a desired extent of annealing to be performed can be predicted. The desired extent of annealing can be a function of one or more factors, such as annealing temperature, annealing time, material properties of a component to be annealed, exposure of the component to be annealed, operational history of the component to be annealed, and/or annealing history of the component to be annealed, all of which have been discussed above.

In some other embodiments the selected annealing effect can include a measured annealing effect. That is, as discussed above material properties of the component can be monitored as desired during annealing. When the monitored material properties return to a desired range of values, the selected annealing effect has been produced, and the reactor coolant system can be adjusted to return to the nominal operating temperature range at the block 410.

Figure 4B:
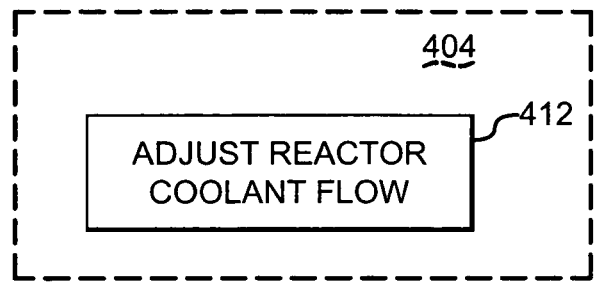
FIGS. 4B through 4H are flowcharts of details of portions of the method of FIG. 4A.

Referring to FIG. 4B, in some embodiments adjusting a reactor coolant system to produce a temperature deviation from a nominal operating temperature range at the block 404 can include adjusting reactor coolant flow at a block 412. As discussed above, reactor coolant flow can be adjusted by throttling a flow adjustment device, such as a valve. As another example, reactor coolant flow can be adjusted by shifting reactor coolant pump speed, such as between fast speed and slow speed, or by changing the number of operating reactor coolant pumps.

Figure 4C:
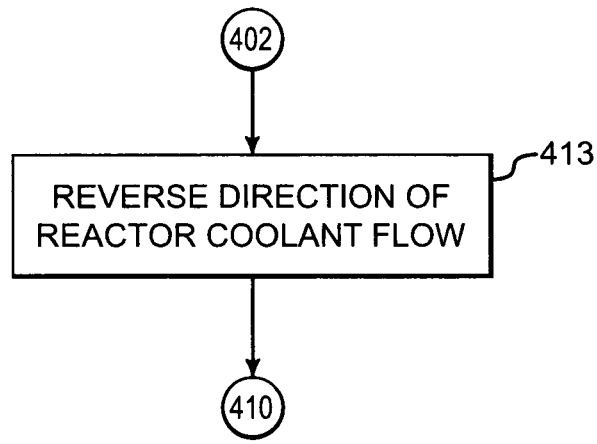

In other embodiments, referring to FIG. 4C direction of reactor coolant flow at a block 413.

Figure 4D:
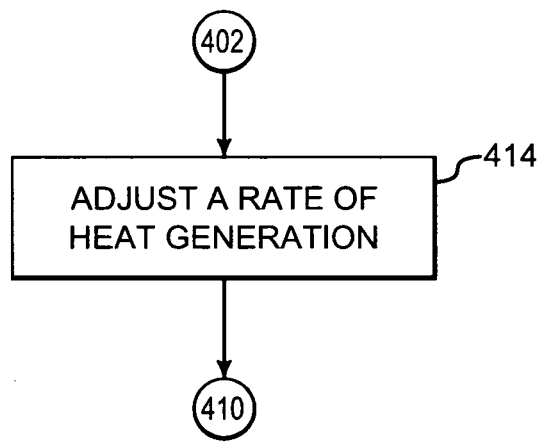

Referring now to FIG. 4D and in some embodiments, in addition to adjusting a reactor coolant system to produce a temperature deviation from a nominal operating temperature range at the block 404, a rate of heat generation can be adjusted at a block 414. Given by way of non-limiting examples and as discussed above, heat generation can be adjusted by providing heat from an external heat source, such as at least one electrical heat source, a heating fluid, and/or at least one source of residual heat, such as decay heat. In addition, heat generation may be adjusted temporarily by adjusting reactivity, such as without limitation by withdrawing or inserting control rods or otherwise adjusting an amount of neutron absorbing material, thereby raising or lowering reactor coolant temperature. It will be appreciated that such an adjustment of heat generation may have a temporary effect on temperature in nuclear fission reactors with a negative temperature coefficient of reactivity $\alpha_T$.

Figure 4E:
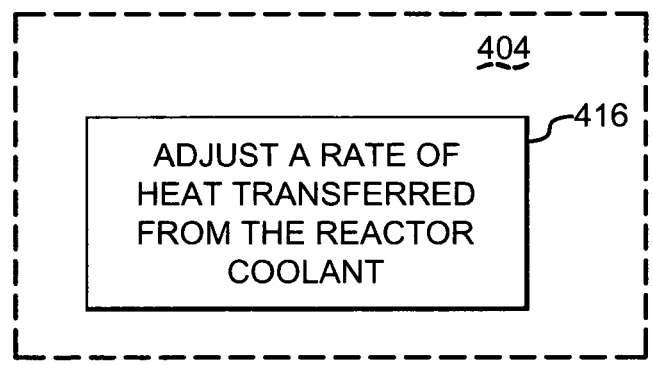

Referring to FIG. 4E, in some embodiments adjusting a reactor coolant system to produce a temperature deviation from a nominal operating temperature range at the block 404 can include adjusting a rate of heat transferred from the reactor coolant at a block 416. As discussed above, a rate of heat transferred from the reactor coolant can be adjusted in a number of ways. Given by way of non-limiting examples, an amount of fluid that exits a secondary side of a heat exchanger through which reactor coolant flows on a primary side can be adjusted; a valve can be throttled toward a shut position on a secondary side of a primary-to-secondary heat exchanger in a pressurized water reactor, a pool-type liquid metal fast breeder reactor, or a gas-cooled fast breeder reactor; a valve can be throttled toward a shut position on an intermediate side of an intermediate heat exchanger in a loop-type liquid metal fast breeder reactor; a heat load presented to any of the heat exchangers described above can be reduced; or the like.

Figure 4F:
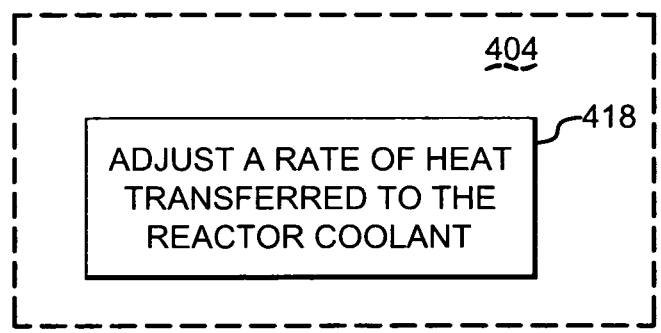

Referring to FIG. 4F, in some other embodiments adjusting a reactor coolant system to produce a temperature deviation from a nominal operating temperature range at the block 404 can include adjusting a rate of heat transferred to the reactor coolant at a block 418. As discussed above, a rate of heat transferred to the reactor coolant can be adjusted in a number of ways. Given by way of non-limiting examples, the heat transfer that is adjusted is the heat transfer from a fuel assembly containing the component to be annealed to the reactor coolant. Given by way of non-limiting examples, an amount of heat transferred to the coolant can be adjusted by adjusting an amount of fluid that exits a secondary side of a heat exchanger through which reactor coolant flows on a primary side. For example, a valve can be throttled on a secondary side of a primary-to-secondary heat exchanger in a pressurized water reactor, a pool-type liquid metal fast breeder reactor, or a gas-cooled fast breeder reactor. As a further example, a valve can be throttled on an intermediate side of an intermediate heat exchanger in a loop-type liquid metal fast breeder reactor. Given by way of further example, a heat load presented to any of the heat exchangers described above can be adjusted.

Figure 4G:
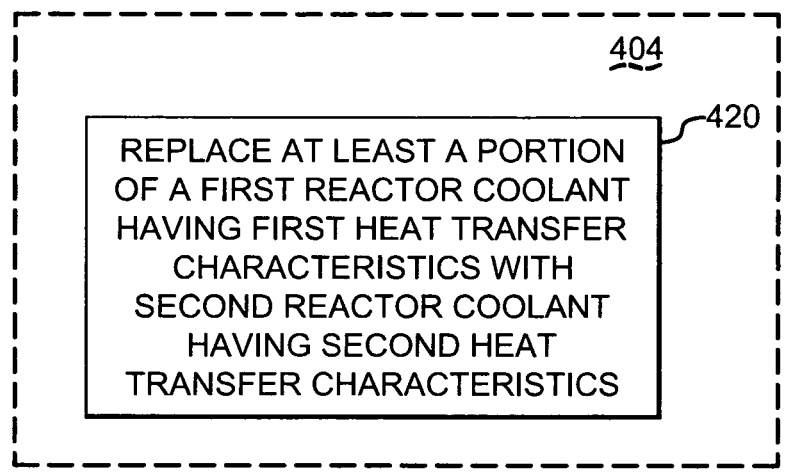

Referring now to FIG. 4G, in some embodiments adjusting a reactor coolant system to produce a temperature deviation from a nominal operating temperature range at the block 404 can include replacing at least a portion of a first reactor coolant having first heat transfer characteristics with second coolant having second heat transfer characteristics at a block 420. Examples of replacement of at least a portion of reactor coolant have been discussed above.

Figure 4H:
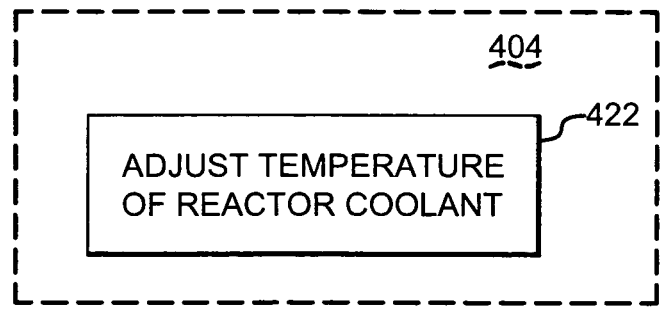

Referring to FIG. 4H, in some embodiments adjusting a reactor coolant system to produce a temperature deviation from a nominal operating temperature range at the block 404 can include adjusting temperature of reactor coolant at a block 422. Given by way of non-limiting examples, temperature of reactor coolant can be adjusted by adding pump heat, such as by increasing the number of operating reactor coolant pumps or by increasing the pump velocity for a given level of heat rejection from either the primary or intermediate cooling loops. It will be appreciated that, when the reactor is shut down, addition of pump heat can raise reactor coolant temperature. For a reactor coolant pump, pump power is proportional to velocity. Moreover, for a typical reactor coolant pump, around 1 MW or so of power is typically lost to inefficiency. This lost power is transferred as heat to reactor coolant in the reactor coolant loop.

Referring now to FIG. 5A, the illustrative method 500 for annealing at least a portion of at least one component of a nuclear fission reactor core begins at a block 502. At a block 504 a nuclear fission reactor core is operated within a predetermined operating temperature range. At a block 506 the nuclear fission reactor core is shut down. At a block 508 temperature of at least a portion of the nuclear fission reactor core is raised above the predetermined operating temperature range to an annealing temperature range for at least one component of the nuclear fission reactor core. At a block 510 temperature of at least the portion of the nuclear fission reactor core is maintained within the annealing temperature range for a time period selected to perform annealing of at least a portion of the at least one component of the nuclear fission reactor core. The method 500 stops at a block 512. Illustrative details will be set forth below.

Figure 5B:
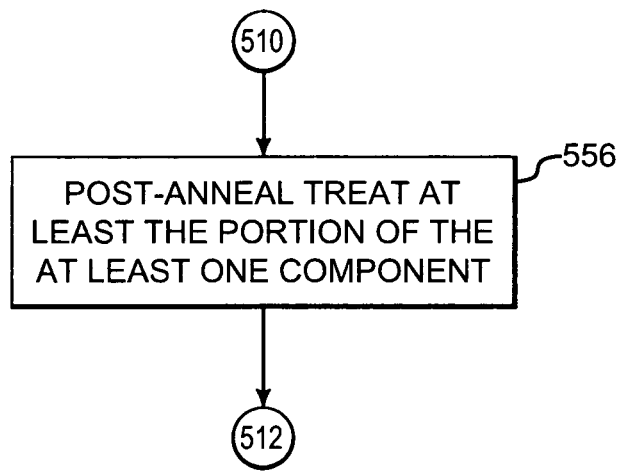
FIGS. 5B through 5T are flowcharts of details of portions of the method of FIG. 5A.
Figure 5C:
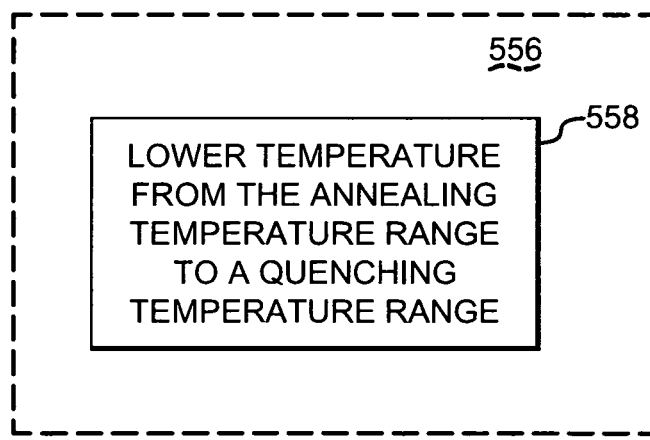
Figure 5D:
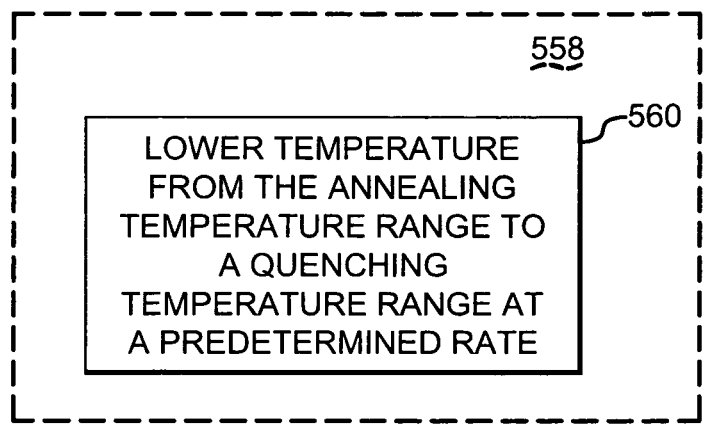
Figure 5E:
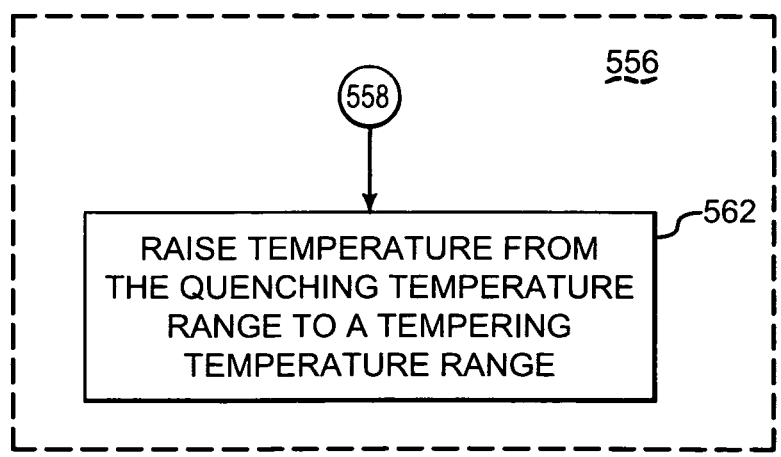

After temperature of at least the portion of the nuclear fission reactor core was maintained within the annealing temperature range for the time period at the block 510, it may be desirable in some embodiments to further treat at least a part of that which has been annealed. To that end and referring now to FIG. 5B, in some embodiments at a block 556 at least the portion of the at least one component can be treated with post-annealing treatment. In some embodiments, post-annealing treatment can include quenching. To that end and referring to FIG. 5C, in some embodiments post-anneal treating at least the portion of the at least one component at the block 556 can include lowering temperature from the annealing temperature range to a quenching temperature range at a block 558. Referring to FIG. 5D, in some embodiments lowering temperature to a quenching temperature range at the block 558 can include lowering temperature at a predetermined rate at a block 560. In some other embodiments, post-annealing treatment can also include tempering after quenching. To that end and referring to FIG. 5E, in some embodiments post-anneal treating at least the portion of the at least one component at the block 556 can also include raising temperature from the quenching temperature range to a tempering temperature range at a block 562.

Figure 5F:
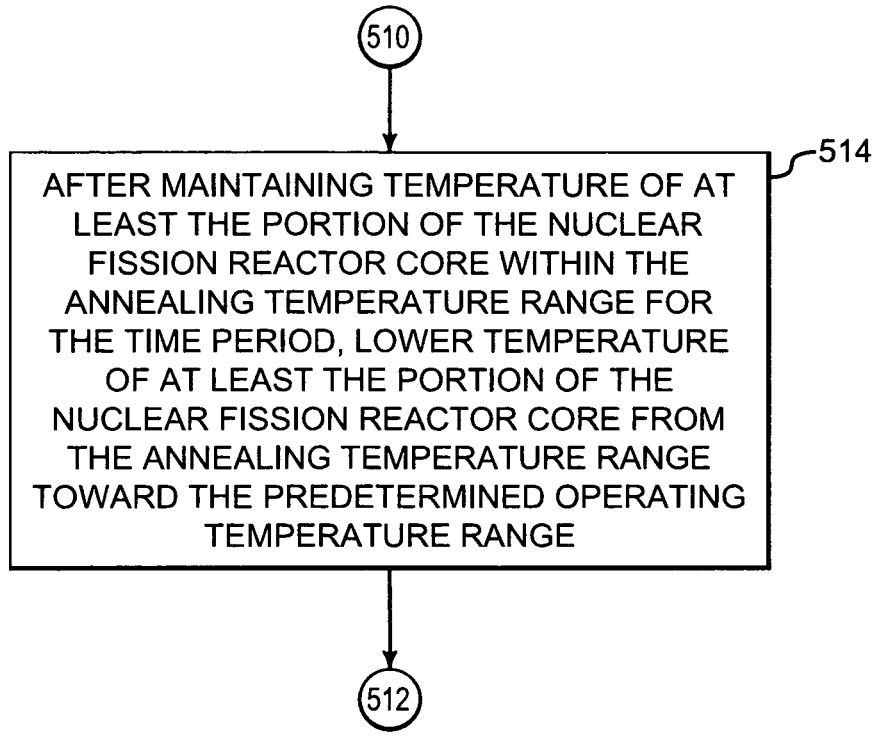

Referring to FIG. 5F, in some embodiments, at a block 514 temperature of at least the portion of the nuclear fission reactor core can be lowered from the annealing temperature range toward the predetermined operating temperature range after temperature of at least the portion of the nuclear fission reactor core was maintained within the annealing temperature range for the time period.

Figure 5G:
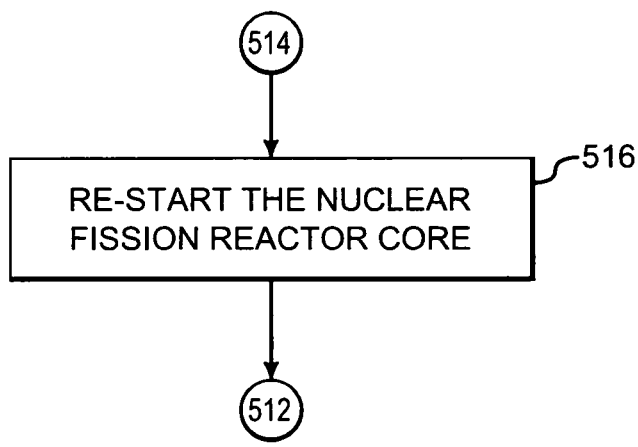

Referring now to FIG. 5G, after temperature of at least the portion of the nuclear fission reactor core has been lowered from the annealing temperature range at the block 514, the nuclear fission reactor core can be re-started at a block 516, as desired. It will be appreciated that applicable initial conditions for re-starting the reactor core should be met when re-starting the reactor core at the block 516.

Figure 5H:
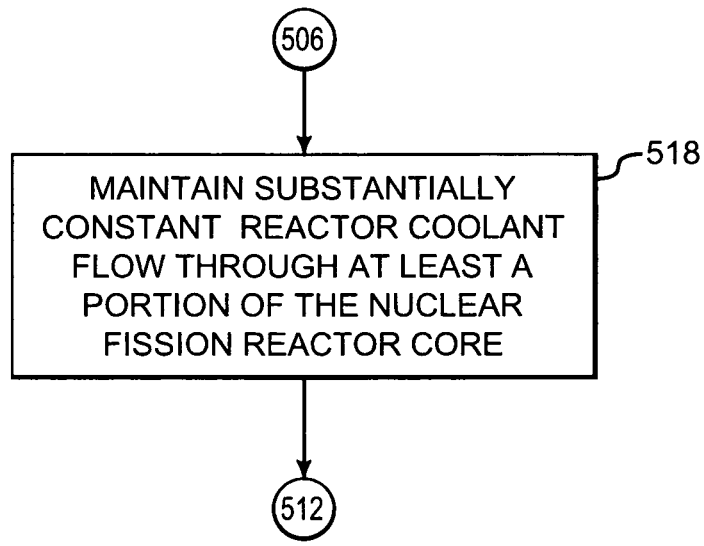

Referring now to FIG. 5H, substantially constant reactor coolant flow can be maintained through at least a portion of the nuclear fission reactor core at a block 518. It will be appreciated that reactor coolant flow can be adjusted as desired, if at all, during operation at the block 504 and shut down at the block 506. Thus, in some embodiments the reactor coolant flow may be maintained substantially constant while raising the temperature at the block 508 and maintaining temperature at the block 510.

Figure 5I:
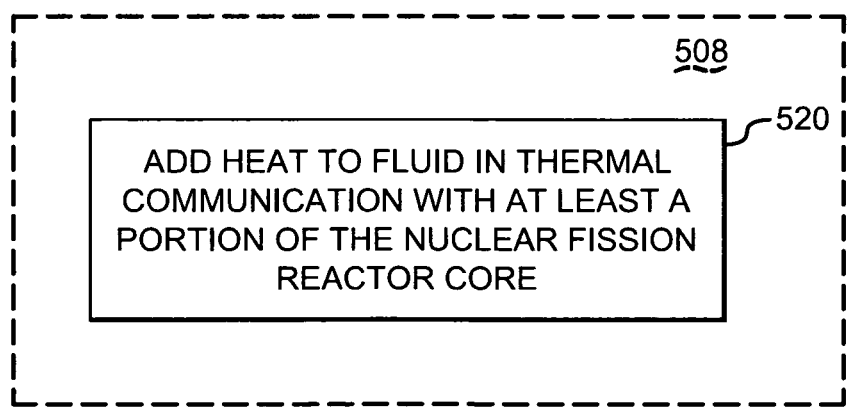

Referring to FIG. 5I, in some embodiments raising temperature of at least a portion of the nuclear fission reactor core above the predetermined operating temperature range to an annealing temperature range at the block 508 can include adding heat to fluid in thermal communication with at least a portion of the nuclear fission reactor core at a block 520. As discussed above, heat can be added by providing heat from an external heat source, such as at least one electrical heat source or a heating fluid. In addition, pump heat may be added to reactor coolant by operating reactor coolant pumps.

Figure 5J:
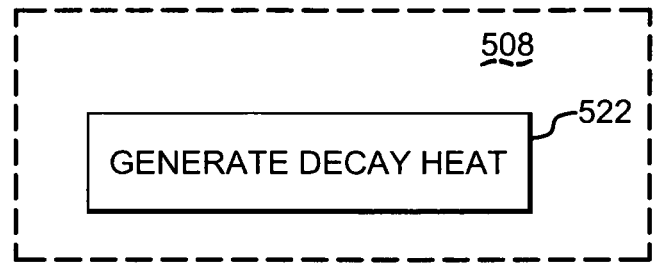

Referring to FIG. 5J, in some embodiments raising temperature of at least a portion of the nuclear fission reactor core above the predetermined operating temperature range to an annealing temperature range at the block 508 can include generating decay heat at a block 522. Generation of decay heat has been discussed above.

Figure 5K:
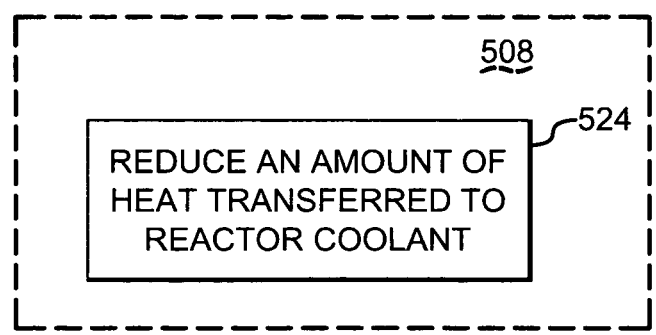

Referring now to FIG. 5K, in some embodiments raising temperature of at least a portion of the nuclear fission reactor core above the predetermined operating temperature range to an annealing temperature range at the block 508 can include reducing an amount of heat transferred to reactor coolant at a block 524. As discussed above, in some embodiments the heat transfer that can reduced is the heat transfer, such as decay heat, from a fuel assembly containing the component to be annealed to the reactor coolant. Given by way of non-limiting example, an amount of heat transferred to the coolant can be reduced by reducing an amount of fluid that exits a secondary side of a heat exchanger through which reactor coolant flows on a primary side. For example, a valve can be throttled toward a shut position on a secondary side of a primary-to-secondary heat exchanger in a pressurized water reactor, a pool-type liquid metal fast breeder reactor, or a gas-cooled fast breeder reactor. As a further example, a valve can be throttled toward a shut position on an intermediate side of an intermediate heat exchanger in a loop-type liquid metal fast breeder reactor. Given by way of further example, a heat load presented to any of the heat exchangers described above can be reduced.

Figure 5L:
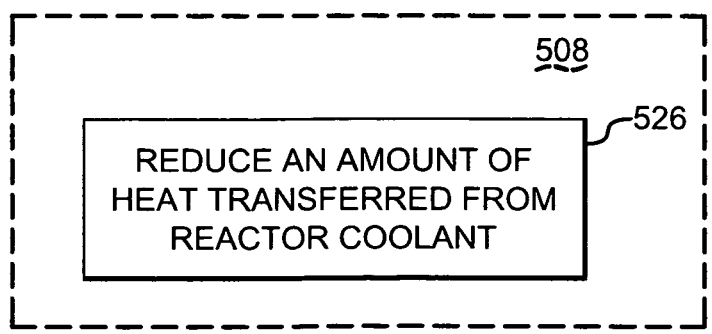

Referring to FIG. 5L, in some other embodiments raising temperature of at least a portion of the nuclear fission reactor core above the predetermined operating temperature range to an annealing temperature range at the block 508 can include reducing an amount of heat transferred from reactor coolant at a block 526. As discussed above, in some embodiments the heat transfer that is reduced is the heat transfer from the reactor coolant to a heat exchanger. Given by way of non-limiting example, an amount of heat transferred from the coolant can be reduced by reducing an amount of fluid that exits a secondary side of a heat exchanger through which reactor coolant flows on a primary side. For example, a valve can be throttled toward a shut position on a secondary side of a primary-to-secondary heat exchanger in a pressurized water reactor, a pool-type liquid metal fast breeder reactor, or a gas-cooled fast breeder reactor. As a further example, a valve can be throttled toward a shut position on an intermediate side of an intermediate heat exchanger in a loop-type liquid metal fast breeder reactor. Given by way of further example, a heat load presented to any of the heat exchangers described above can be reduced.

Figure 5M:
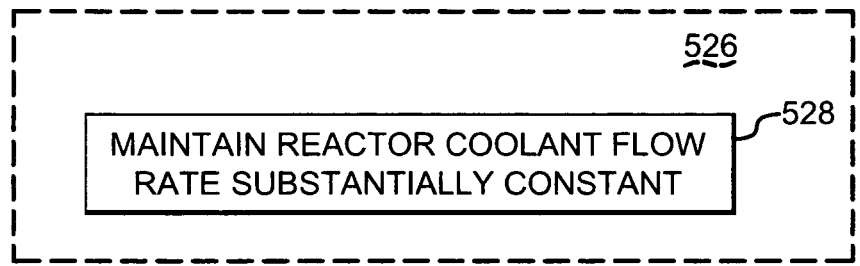

Referring now to FIG. 5M, in some embodiments reducing an amount of heat transferred from reactor coolant at the block 526 can include maintaining reactor coolant flow rate substantially constant at a block 528.

Figure 5N:
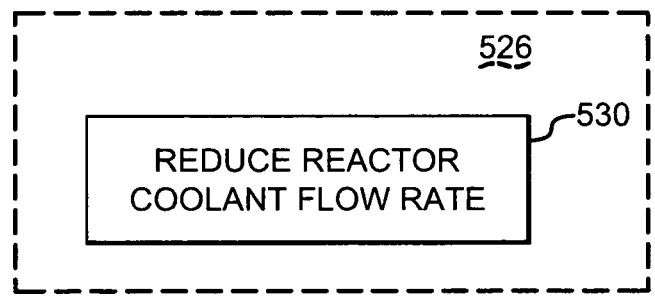

However, in some other embodiments and referring to FIG. 5N, reducing an amount of heat transferred from reactor coolant at the block 526 can include reducing reactor coolant flow rate at a block 530. Reducing reactor coolant flow rate has been discussed above.

Figure 5O:
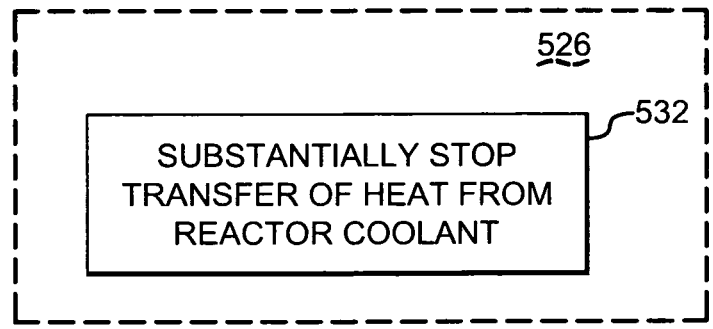

Referring to FIG. 5O, in some other embodiments reducing an amount of heat transferred from reactor coolant at the block 526 can include substantially stopping transfer of heat from reactor coolant at a block 532. Given by way of non-limiting example, heat transfer from the reactor coolant may be substantially stopped, if desired, by performing any one or more of the techniques discussed above for the block 526 in conjunction with reducing reactor coolant flow rate, as desired for a particular application.

Figure 5P:
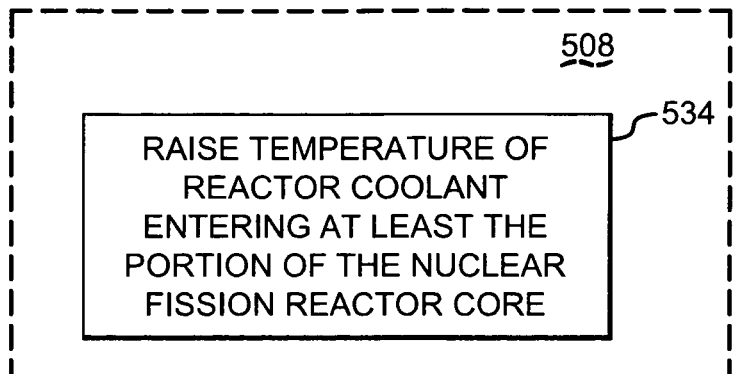

Referring to FIG. 5P, in some embodiments raising temperature of at least a portion of the nuclear fission reactor core above the predetermined operating temperature range to an annealing temperature range at the block 508 can include raising temperature of reactor coolant entering at least the portion of the nuclear fission reactor core at a block 534. Given by way of non-limiting example, temperature of reactor coolant can be raised by providing heat from an external heat source, such as at least one electrical heat source or a heating fluid. In addition, pump heat may be added to reactor coolant by operating reactor coolant pumps. Moreover, decay heat may also raise temperature of reactor coolant.

Figure 5Q:
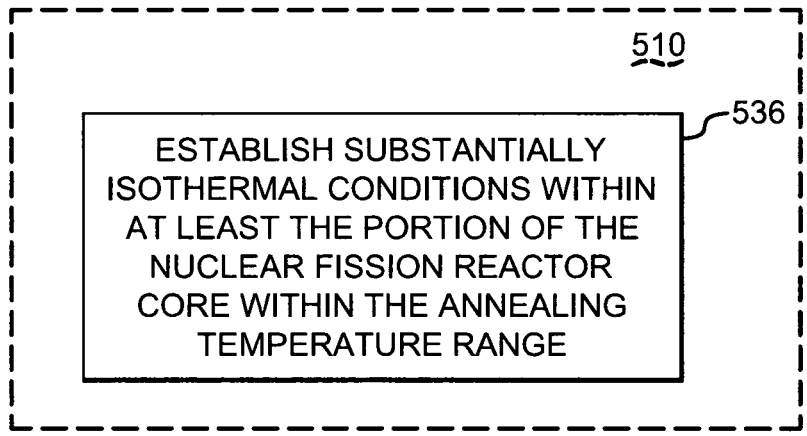
Figure 5R:
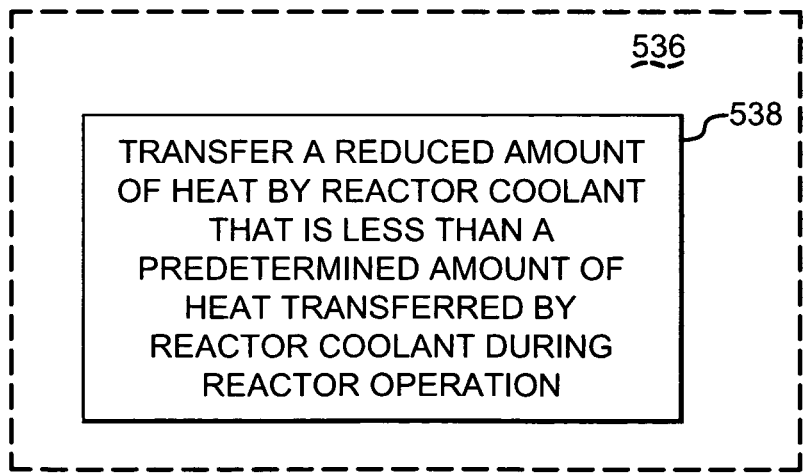

Referring to FIG. 5Q, maintaining temperature of at least the portion of the nuclear fission reactor core within the annealing temperature range for a time period at the block 510 can include establishing substantially isothermal conditions within at least the portion of the nuclear fission reactor core within the annealing temperature range at a block 536. For example and referring now to FIG. 5R, in some embodiments establishing substantially isothermal conditions within at least the portion of the nuclear fission reactor core within the annealing temperature range at the block 536 can include transferring a reduced amount of heat by reactor coolant that is less than a predetermined amount of heat transferred by reactor coolant during reactor operation at a block 538.

Figure 5S:
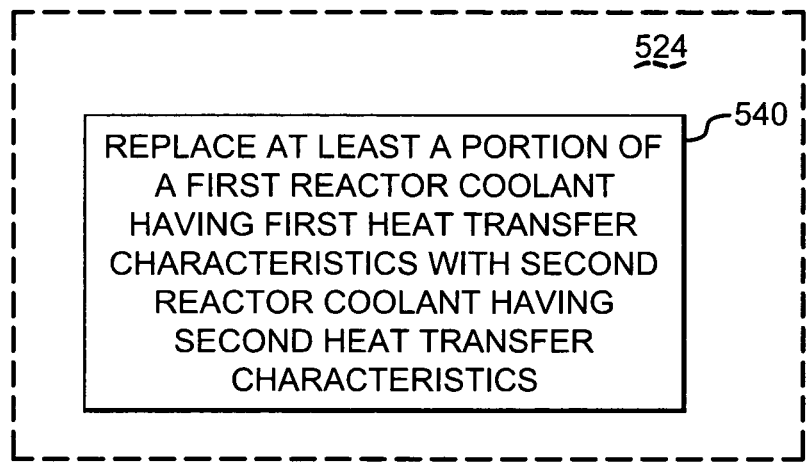

Referring now to FIG. 5S, in some embodiments reducing an amount of heat transferred to reactor coolant at the block 524 can include replacing at least a portion of a first reactor coolant having first heat transfer characteristics with second coolant having second heat transfer characteristics at a block 540. Replacing a portion of reactor coolant has been discussed above.

Figure 5T:
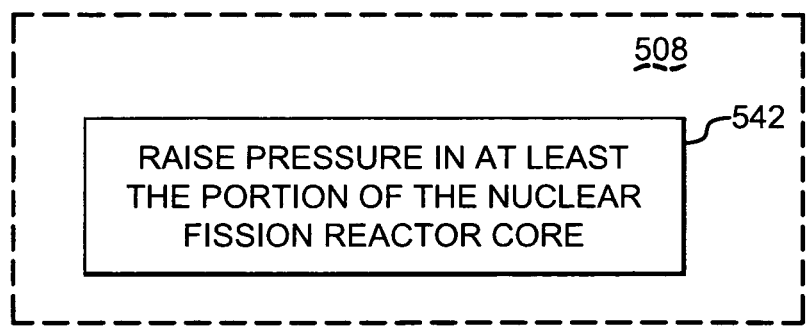

Referring to FIG. 5T, in some embodiments raising temperature of at least a portion of the nuclear fission reactor core above the predetermined operating temperature range to an annealing temperature range for at least one component of the nuclear fission reactor core at the block 508 can include raising pressure in at least the portion of the nuclear fission reactor core at a block 542. Raising pressure has been discussed above.

It will be appreciated that any portion of the reactor core may be annealed, as desired for a particular application. For example, in some embodiments less than all of the reactor core can be annealed. In some other embodiments, substantially all of the reactor core of the nuclear fission reactor can be annealed, as desired.

Illustrative Systems and Apparatuses

Illustrative systems and apparatuses will now be described. The illustrative systems and apparatuses can provide host environments for performance of any of the methods described herein. It will be appreciated that the illustrative systems and apparatuses shown in the accompanying FIGS. 8A-8K and described below are illustrated in functional block diagram form. As such, the block diagrams of FIGS. 8A-8K show illustrative functions and are not intended to convey limitations on locations of all components that may perform the illustrated functions. In addition, any type of nuclear fission reactor whatsoever may serve as a host environment for the systems and apparatuses shown in FIGS. 8A-8K.

Figure 8A:
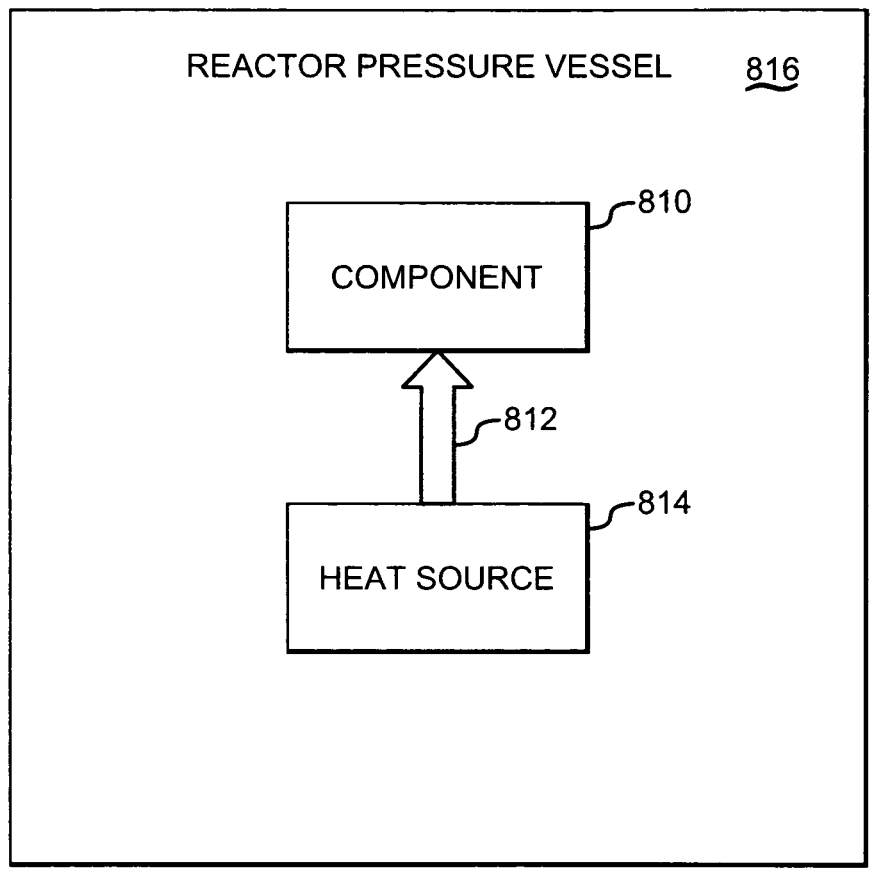

Referring to FIG. 8A, a functional relationship is illustrated in which at least a portion of at least one component 810 may be annealed by heat transfer, indicated by an arrow 812, from a heat source 814 that is in thermal communication (as indicated by the arrow 812) with at least the portion of the component 810. In the relationship shown in FIG. 8A, annealing can occur within a reactor pressure vessel 816.

The component 810 may include any of the components discussed above. In some embodiments and given by way of non-limiting example, the component 810 can include at least one reactor core component such as at least one nuclear fission fuel assembly, reactor core cooling component, and/or reactor core structural member. When at least one nuclear fission fuel assembly is annealed, the component 810 can include cladding, a cooling component, a structural member, a thermally conductive member, and/or nuclear fission fuel material.

The heat source 814 may include any of the heat sources discussed above. In some embodiments in which the heat source 814 is located within the reactor pressure vessel 816, the heart source 814 may include nuclear fission fuel material, such as that contained in nuclear fission fuel elements and/or fuel assemblies, thereby generating heat during power range operations or by generating decay heat after shutdown from power range operations. In some other embodiments, the heat source 814 may include an external heat source (that is, external to a fuel assembly), such as at least one electrical heat source, a heating fluid, and/or at least one source of residual heat, such as decay heat.

As shown in FIG. 8A, the heat transfer mechanism of thermal communication between the heat source 814 and the component 810 can include reactor coolant. The reactor coolant can include liquid metal or gaseous reactor coolant, non-limiting examples of which have been described above.

Figure 8B:
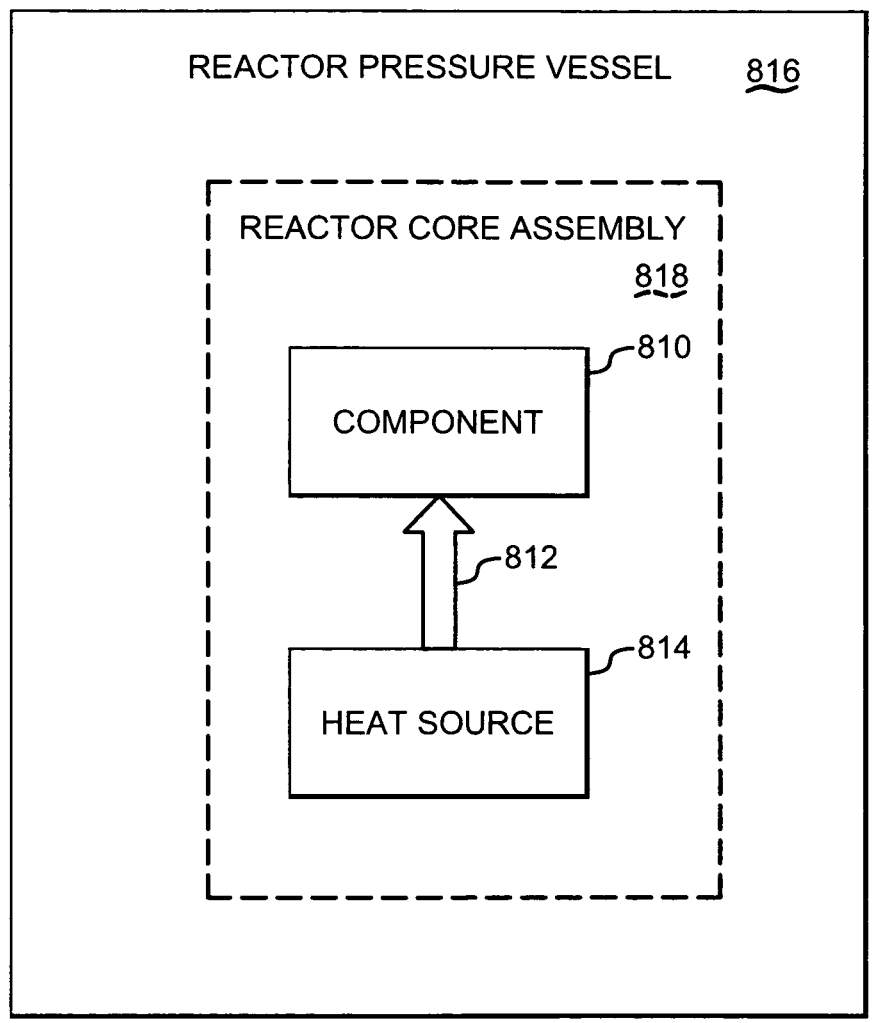

Referring to FIG. 8B, in some embodiments the component 810 and the heat source 814 are located in a reactor core assembly 818 within the reactor pressure vessel 816. In such an arrangement, and as indicated by the arrow 812, annealing of at least the portion of the component 810 can occur within the reactor core assembly 818. In some embodiments, annealing of at least the portion of the component 810 can be performed in an in-place location of the component 810. In some other embodiments, the component 810 can be moved, with suitable handling equipment, from its in-place location to another location within the reactor core assembly 818 where annealing can occur.

Figure 8C:
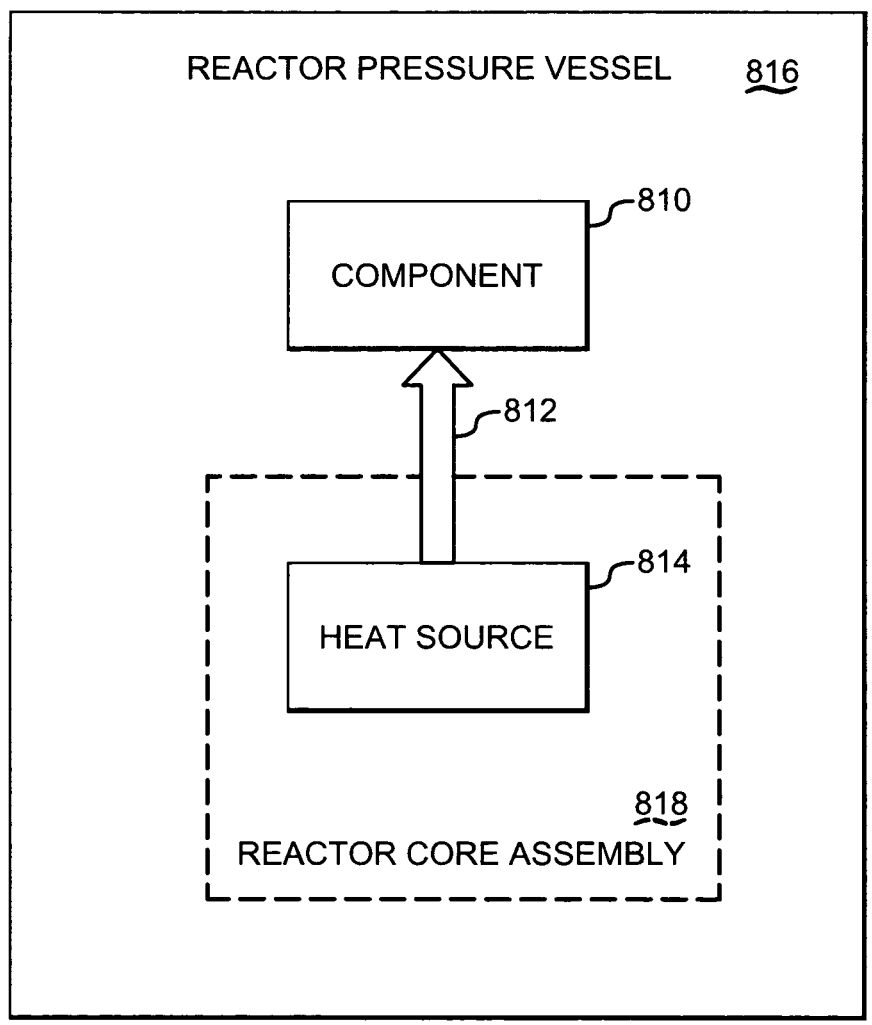

Referring to FIG. 8C, in some embodiments the component 810 can be re-located from the reactor core assembly 818 with suitable handling equipment. In such an arrangement, and as indicated by the arrow 812, annealing of at least the portion of the component 810 can occur exterior of the reactor core assembly 818 but within the reactor pressure vessel 816.

Figure 8D:
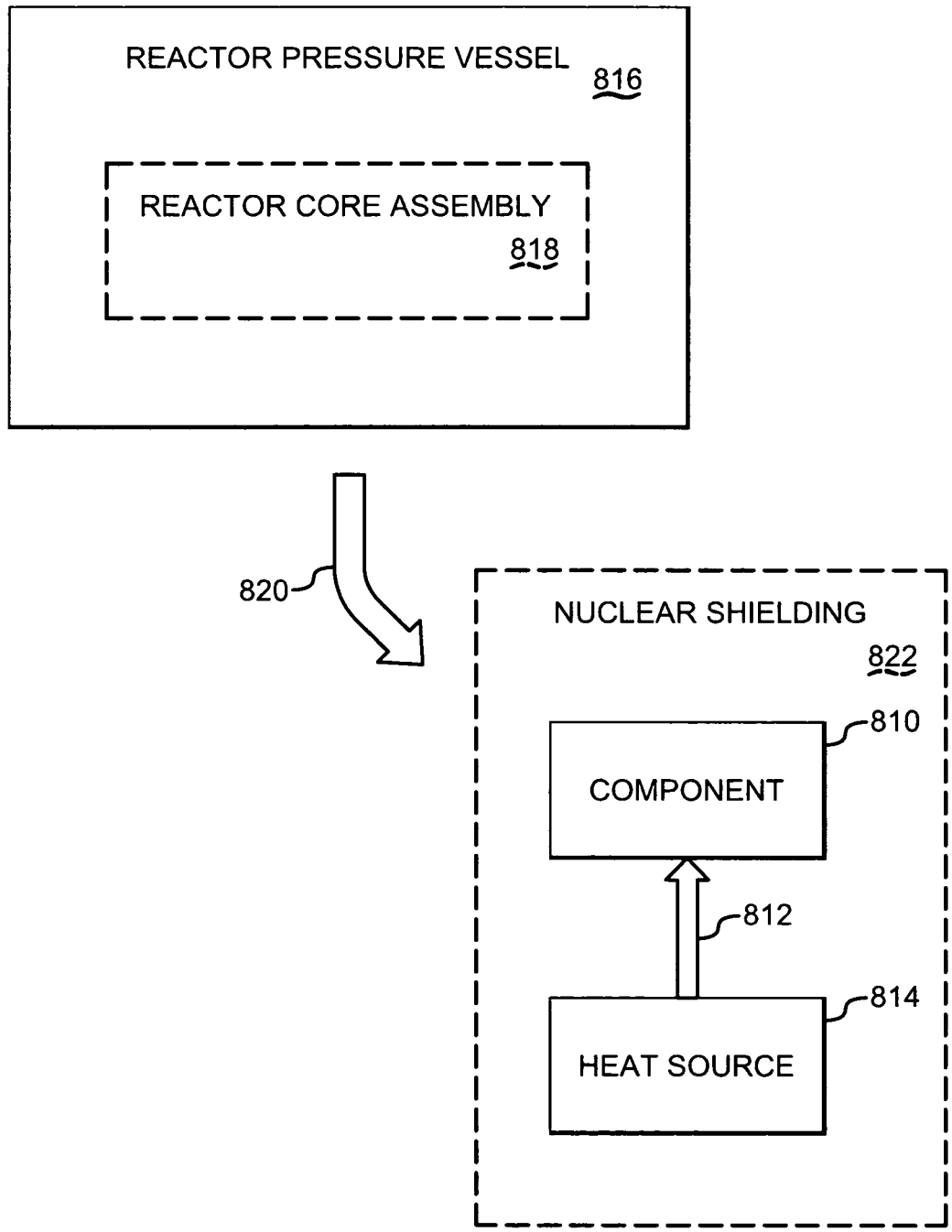

Referring to FIG. 8D, in some other embodiments the component 810 can be re-located, as indicated by an arrow 820, from the reactor pressure vessel 816 with suitable handling equipment and placed within suitable nuclear shielding 822 in an annealing facility, as desired. In such an arrangement, and as indicated by the arrow 812, annealing of at least the portion of the component 810 can occur exterior of the reactor pressure vessel 816. Also, in such an arrangement, the heat source 814 can be any of the heat sources described above. However, when the heat source 814 includes nuclear fission fuel material (such as when a nuclear fission fuel element or a fuel assembly is removed from the reactor pressure vessel 816 and relocated to the nuclear shielding 822 within the annealing facility) then the heat is generated via decay heat generation as opposed to power range operations. In some embodiments, annealing can occur on-site of the nuclear fission reactor. In some other embodiments, annealing can occur off-site from the nuclear fission reactor.

Figure 8E:
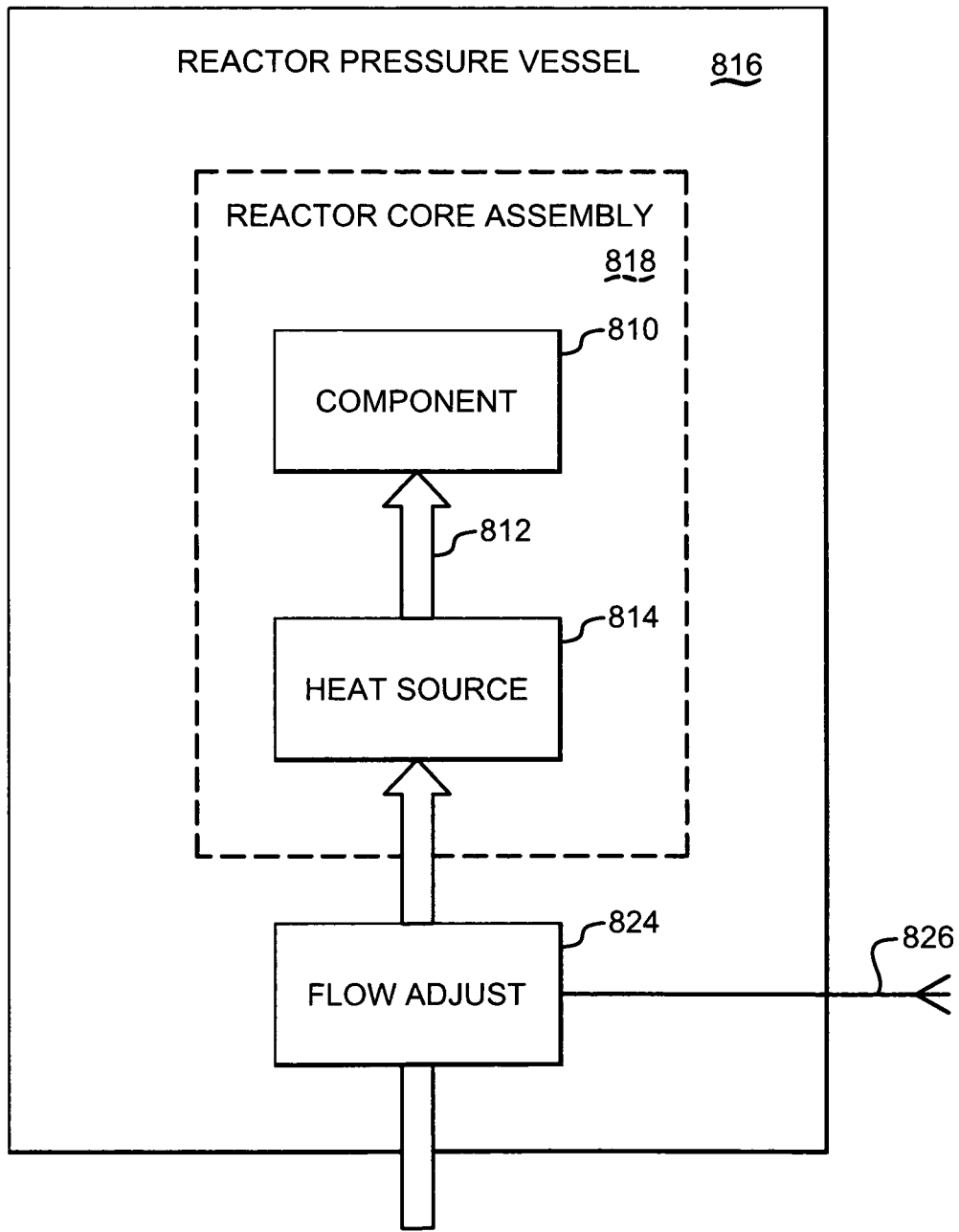

Referring to FIG. 8E, in some embodiments heat transfer from the heat source 814 to the component 810 can be adjusted, such as with a flow adjust function 824. The flow adjust function 824 can cause reactor coolant flow to be adjusted, thereby adjusting amount of heat transferred from the heat source 814 to the component 810. In some embodiments the flow adjust function can be responsive to a control input 826. In some embodiments the control input 826 can be a mechanical input. In some other embodiments the control input 826 can be a signal input, such as an electrical signal, an optical signal, a radio-frequency signal, or the like.

Figure 8F:
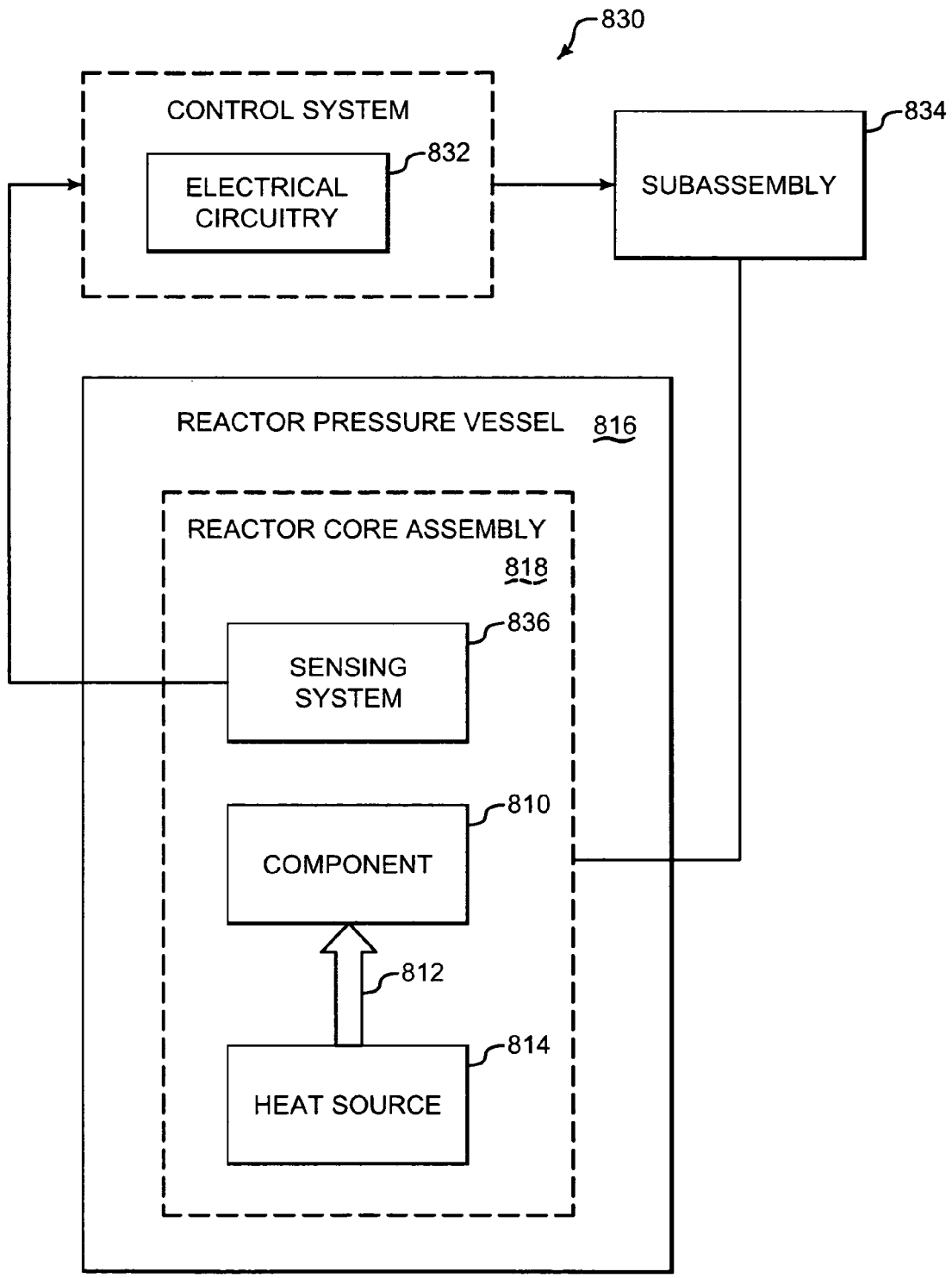

In some embodiments systems and apparatuses are provided for annealing at least a portion of at least one component. Referring to FIG. 8F, in some embodiments an illustrative apparatus 830 includes electrical circuitry 832, such as a control system, configured to determine an annealing temperature range for at least a portion of at least one component 810 of a nuclear fission fuel assembly of a nuclear fission reactor. A subassembly 834 is responsive to the electrical circuitry 832 and is configured to establish at least the portion of the nuclear fission fuel assembly within the annealing temperature range.

In some other embodiments, the electrical circuitry 832 may be configured to determine an annealing temperature range for at least the portion of at least one component 810 of the reactor core assembly 818 of a nuclear fission reactor, wherein the annealing temperature range is higher than a predetermined operating temperature range of the reactor core assembly 818. In such an arrangement, the subassembly 834 is responsive to the electrical circuitry 832 and is configured to establish at least the portion of the nuclear fission reactor within the annealing temperature range. It will be appreciated that in some embodiments the electrical circuitry 832 may include a numerical model of material damage and/or annealing/temperature response. In some other embodiments the electrical circuitry 832 may include stored data representing annealing/temperature responses discussed above. The stored data may be determined empirically or analytically, as desired, and may be updated or supplemented with sensor data (e.g. acoustic response of steel showing degradation or restoration, or the like).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

In a general sense, those skilled in the art will also recognize that in the various embodiments described herein the subassembly 834 can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

The apparatus 830 may include a sensing system 836 that provides sensed data to the electrical circuitry 832. In some embodiments the sensing system 836 may be configured to sense conditions, such as temperature, pressure, reactor coolant flow rate, or the like, of the region of the reactor core assembly 818 containing the component 810. As such, the sensing system 836 may include sensors such as temperature sensors, pressure sensors, flow sensors, or the like. In some other embodiments the sensing system 836 may be further configured to test material properties of at least a portion of the component 810 during annealing.

As discussed above, in some embodiments the heat source 814 can include an external heat source, such as at least one electrical heat source and/or a heating fluid, and/or at least one source of residual heat, such as decay heat. In some embodiments the subassembly 834 can be further configured to adjust operational parameters of the nuclear fission reactor to establish operating conditions of a region of the nuclear fission reactor containing the at least one component within the determined annealing temperature range for a period of time selected to produce annealing of at least the portion of the at least one component.

Figure 8G:
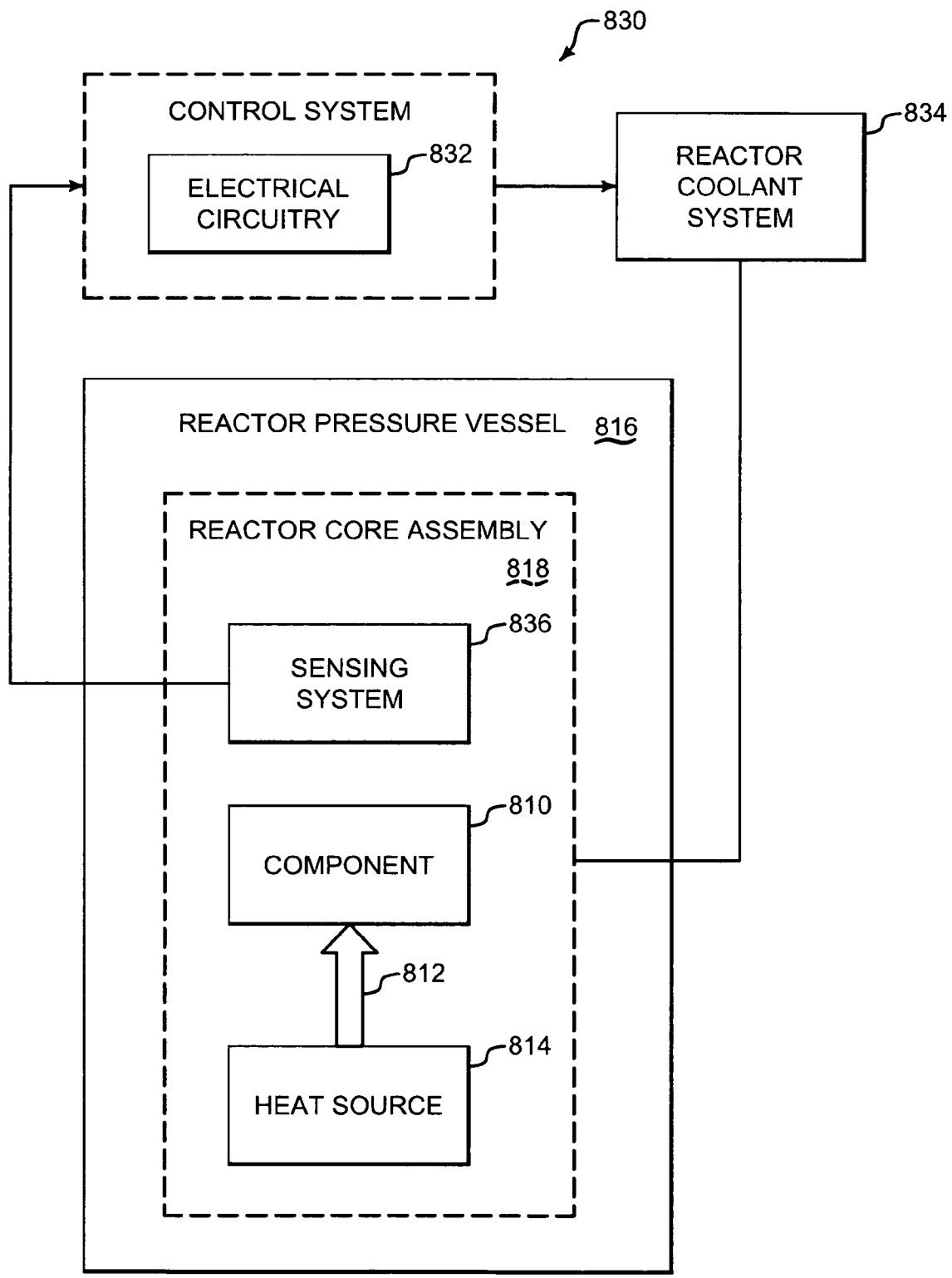
Figure 8H:
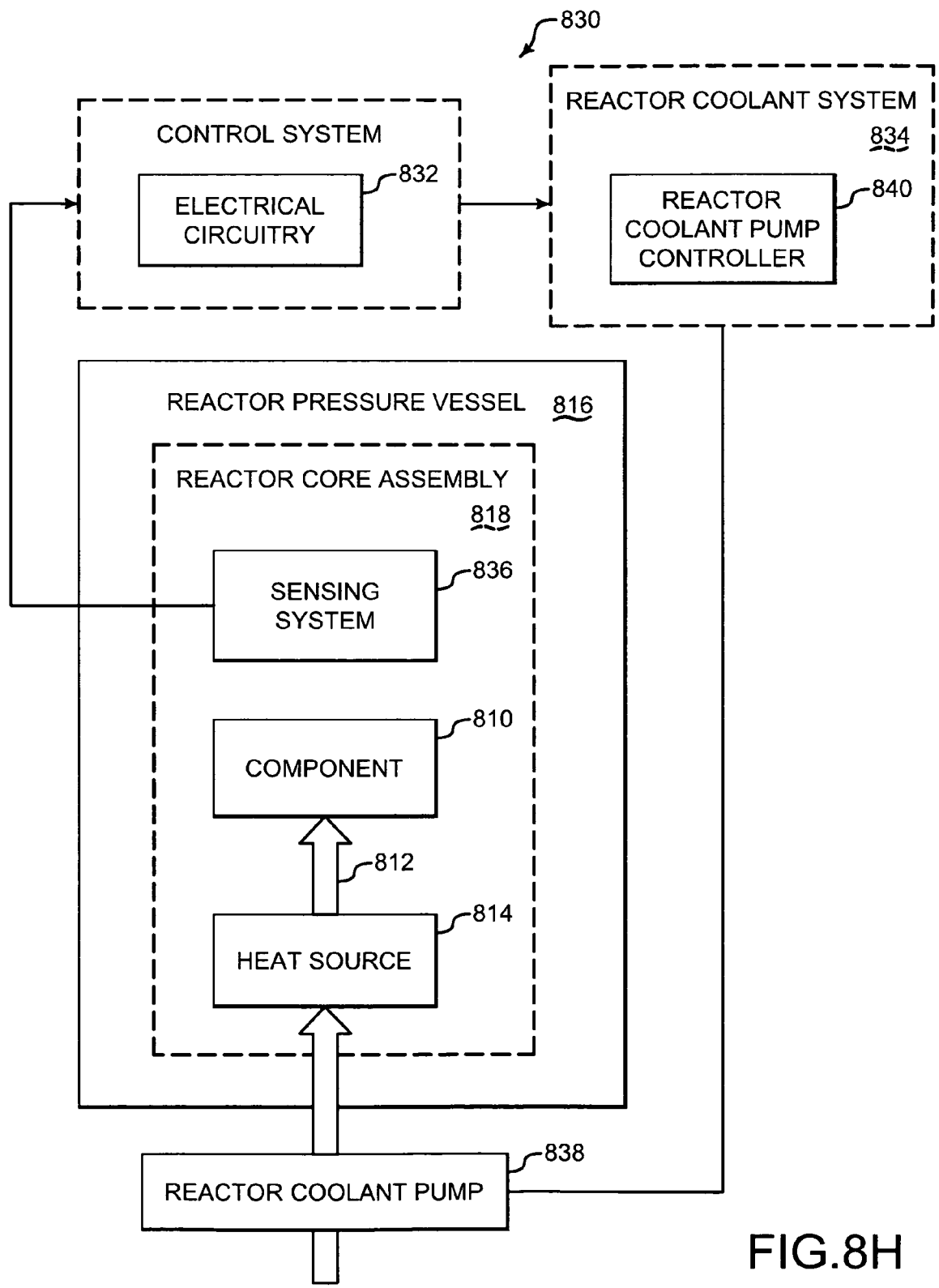
Figure 81:
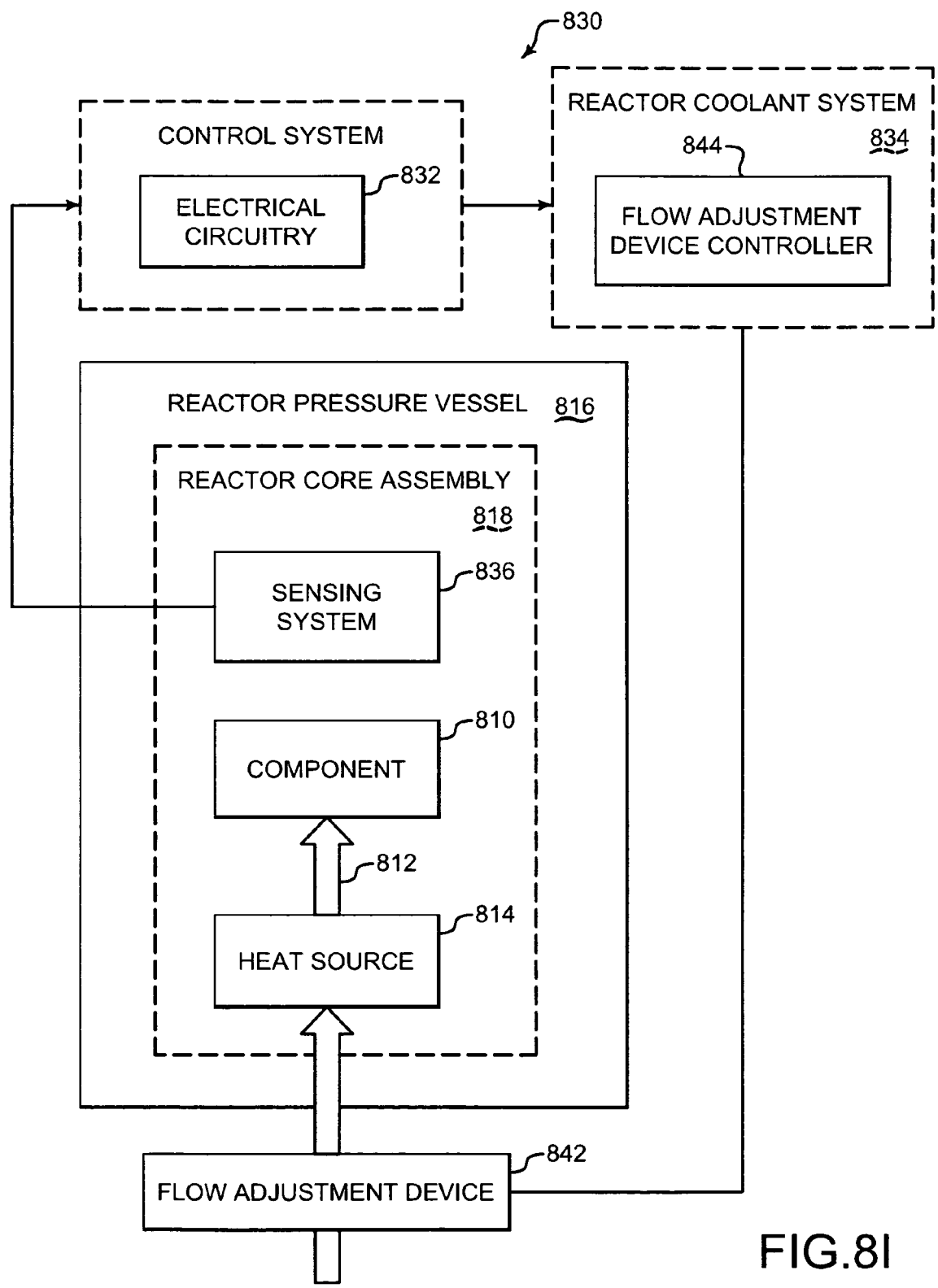

Referring now to FIG. 8G, in some embodiments the subassembly 834 can include a reactor coolant system. Given by way of non-limiting example and referring to FIG. 8H, the reactor coolant system can include at least one reactor coolant pump 838. In some embodiments the at least one reactor coolant pump 838 can be responsive to a reactor coolant pump controller 840, such as for starting, stopping, and/or changing speeds of the reactor coolant pump 838.

In some other embodiments and referring to FIG. 8I, the reactor coolant system can include at least one flow adjustment device 842, such as a valve like an isolation valve, a throttle valve, or the like. The flow adjustment device 842 can be a mechanical device with mechanical actuation, a mechanical device with electrical actuation, or an electrical device that can electrically control flow of electrically-conductive liquid reactor coolant, such as liquid metals. In some embodiments the at least one flow adjustment device 842 can be responsive to a flow adjustment device controller 844.

Figure 8J:
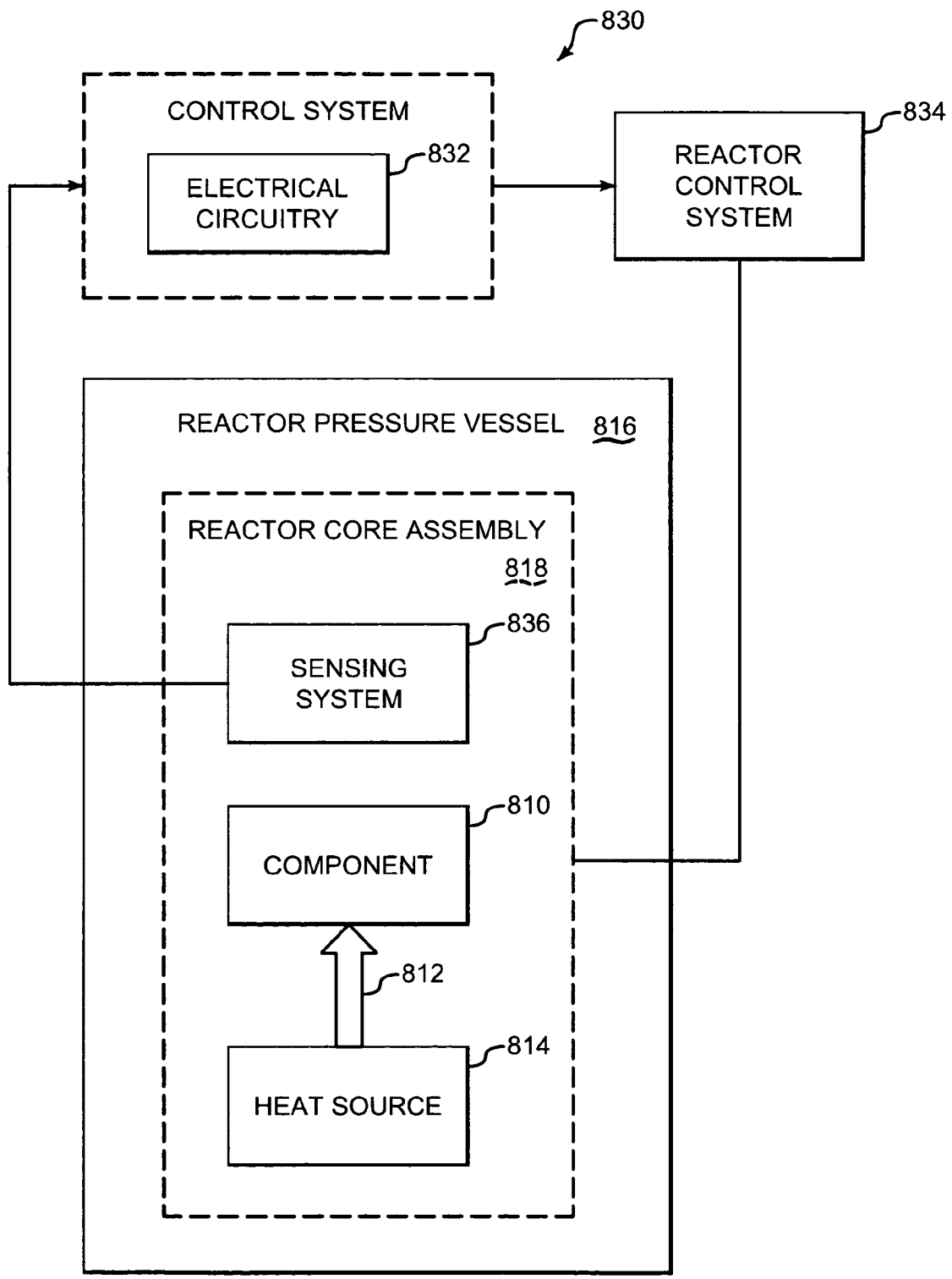

Referring now to FIG. 8J, in some other embodiments the subassembly 834 can include a reactor control system. Given by way of non-limiting example, the reactor control system can control reactivity within the reactor core assembly 818, such as by inserting or withdrawing control rods or otherwise inserting or removing neutron absorbing material or the like.

Figure 8K:
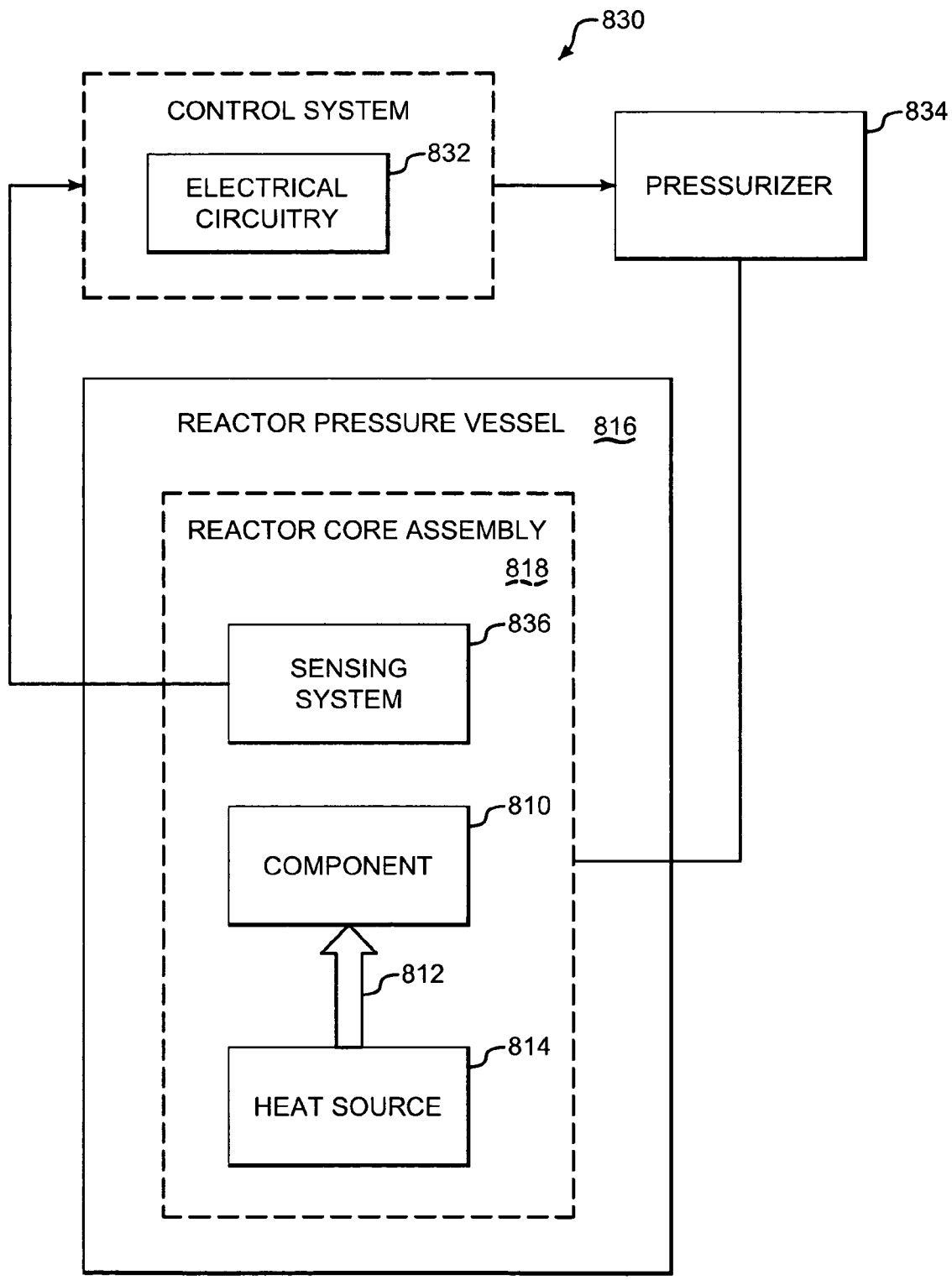

Referring to FIG. 8K, in some embodiments the subassembly 834 can include a pressurizer. Given by way of non-limiting example, the pressurizer can control pressure by turning on or turning off pressurizer heaters, as desired. One skilled in the art will recognize that the herein described components (e.g., blocks), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., blocks), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for annealing at least a portion of at least one metallic component of a nuclear fission fuel assembly of a nuclear fission reactor, the method comprising:

determining an annealing temperature range for at least a portion of at least one metallic component of a nuclear fission fuel assembly of a nuclear fission reactor;

in a reactor core of the nuclear fission reactor, annealing at least the portion of the at least one metallic component of the nuclear fission fuel assembly within the annealing temperature range by, responsive to determining an annealing temperature range, establishing at least the portion of the nuclear fission fuel assembly within the annealing temperature range by adjusting operational parameters of the nuclear fission reactor to establish operating conditions of a region of the nuclear fission reactor containing the at least one metallic component within the determined annealing temperature range for a period of time selected to produce annealing of at least the portion of the at least one metallic component;

stopping annealing at least the portion of the at least one metallic component of the nuclear fission fuel assembly within the annealing temperature range; and post-anneal treating at least the portion of the at least one metallic component of the nuclear fission fuel assembly by lowering temperature from the annealing temperature range to a quenching temperature range.

2. The method of claim 1, wherein the at least one metallic component includes at least one component chosen from cladding, a cooling component, a structural member, a thermally conductive member, and nuclear fission fuel material.

3. The method of claim 2, wherein metal of the metallic component includes at least one metal chosen from steel, refractory metal, a refractory metal alloy, a non-ferrous metal, and a non-ferrous metal alloy.

4. The method of claim 1, wherein the annealing temperature range is greater than an operating temperature range of the nuclear fission fuel assembly.

5. The method of claim 1, further comprising moving the nuclear fission fuel assembly to a location within a reactor core of the nuclear fission reactor after annealing.

6. The method of claim 1, wherein adjusting operational parameters includes raising temperature of the region of the nuclear fission reactor containing the at least one metallic component from a operating temperature range of the reactor core toward the annealing temperature range.

7. The method of claim 1, wherein adjusting operational parameters includes maintaining temperature of the region of the nuclear fission reactor containing the at least one metallic component substantially within the annealing temperature range.

8. The method of claim 1, wherein adjusting operational parameters includes providing heat from an external heat source.

9. The method of claim 1, wherein adjusting operational parameters includes:
providing coolant to the reactor core at a coolant flow rate;
substantially maintaining the coolant flow rate; and
reducing an amount of heat transferred from the coolant.

10. The method of claim 1, wherein adjusting operational parameters includes:
providing coolant to the reactor core at a coolant flow rate;
substantially maintaining the coolant flow rate; and
reducing an amount of heat transferred to the coolant.

11. The method of claim 1, wherein adjusting operational parameters includes:
providing coolant to the reactor core at a coolant flow rate; and
lowering the coolant flow rate into the region of the nuclear fission reactor containing the at least one metallic component.

12. The method of claim 1, wherein adjusting operational parameters includes:
providing coolant to the reactor core at a coolant flow rate; and
reversing direction of coolant flow into the region of the nuclear fission reactor containing the at least one metallic component.

13. The method of claim 1, wherein adjusting operational parameters includes:
providing coolant to the reactor core at a coolant flow rate; and
raising temperature of coolant entering the region of the nuclear fission reactor containing the at least one metallic component.

14. The method of claim 1, wherein adjusting operational parameters includes replacing at least a portion of a first coolant having first heat transfer characteristics with second coolant having second heat transfer characteristics.

15. The method of claim 1, wherein adjusting operational parameters includes raising pressure in the region of the nuclear fission reactor containing the at least one metallic component.

16. The method of claim 1, wherein adjusting operational parameters includes lowering pressure in the region of the nuclear fission reactor containing the at least one metallic component.

17. The method of claim 1, wherein a number of the at least one nuclear fission fuel assemblies is fewer than all nuclear fission fuel assemblies of a reactor core of the nuclear fission reactor.

18. The method of claim 1, wherein a number of the at least one nuclear fission fuel assemblies is substantially all nuclear fission fuel assemblies of a reactor core of the nuclear fission reactor.

19. The method of claim 1, further comprising:
during annealing, testing material properties of at least a portion of the at least one metallic component of the nuclear fission fuel assembly; and
wherein annealing is stopped responsive to testing material properties of at least a portion of the at least one metallic component of the nuclear fission fuel assembly.

20. The method of claim 1, further comprising post-anneal treating at least the portion of the at least one metallic component of the nuclear fission fuel assembly by raising temperature from the quenching temperature range to a tempering temperature range.

21. The method of claim 1, wherein annealing is performed after commencement of transition of reactivity condition of at least a portion of the nuclear fission reactor from a first state to a second state.

22. The method of claim 21, wherein:
the first state includes power range operation; and
the second state includes a shut-down state.

* * * * *